(12) United States Patent
Laskaris et al.

(10) Patent No.: US 12,385,591 B2
(45) Date of Patent: Aug. 12, 2025

(54) VOLATILE CORROSION INHIBITOR DETECTION DEVICE

(71) Applicant: GENERAL AIR PRODUCTS, INC., Exton, PA (US)

(72) Inventors: Mark A. Laskaris, Collegeville, PA (US); Ron E. McClellan, Oxford, PA (US); Richard A. West, Montgomery, TX (US)

(73) Assignee: GENERAL AIR PRODUCTS, INC., Exton, PA (US)

( * ) Notice: Subject to any disclaimer, the term of this patent is extended or adjusted under 35 U.S.C. 154(b) by 472 days.

(21) Appl. No.: 17/752,194

(22) Filed: May 24, 2022

(65) Prior Publication Data

US 2022/0282822 A1 Sep. 8, 2022

Related U.S. Application Data

(62) Division of application No. 17/113,192, filed on Dec. 7, 2020, now Pat. No. 11,371,643.

(Continued)

(51) Int. Cl.
   *C23F 11/00* (2006.01)
   *A62C 35/62* (2006.01)
   (Continued)

(52) U.S. Cl.
   CPC .............. *F16L 58/02* (2013.01); *A62C 35/62* (2013.01); *A62C 35/68* (2013.01); *C23F 11/00* (2013.01); *E03B 7/09* (2013.01)

(58) Field of Classification Search
   CPC .......... F16L 58/02; F16L 58/00; A62C 35/62; A62C 35/68; C23F 11/00; C23F 11/02; E03B 7/09; G01N 31/223
   See application file for complete search history.

(56) References Cited

U.S. PATENT DOCUMENTS 1,146,531 A * 7/1915 Smyly ................. G01N 21/783
                                                    422/86
4,078,893 A * 3/1978 Gilman .................... B01J 23/40
                                                    429/57

(Continued)

FOREIGN PATENT DOCUMENTS

| KR | 20060033895 A | 4/2006 |
| KR | 20140027655 A | 3/2014 |

OTHER PUBLICATIONS

Cracauer et al., "A New Method for Corrosion Control in Dry Fire Protection Systems", Materials Performance, Jun. 2014, pp. 14-17 (Year: 2014).*

(Continued)

*Primary Examiner* — Elizabeth A Robinson
*Assistant Examiner* — Sophia Y Lyle
(74) *Attorney, Agent, or Firm* — Panitch Schwarze Belisario & Nadel LLP

(57) ABSTRACT

A volatile corrosion inhibitor detection device includes a coupling configured to couple to a system configured to be closed, and a housing in fluid communication with the coupling and containing an indicator element configured to visually change upon contact with volatile corrosion inhibitor. A bendable and crushable portion of the housing contains the indicator element and further contains an indicator capillary, the indicator capillary contains indicator fluid, and the indicator element and the indicator capillary are arranged such that, upon breaking of the indicator capillary by bending or crushing a portion of the housing, the indicator fluid is released from the indicator capillary and reaches the indicator element to render the indicator element sensitive to volatile corrosion inhibitor, thereby providing an indication upon contact with the volatile corrosion Inhibitor.

15 Claims, 72 Drawing Sheets

Related U.S. Application Data

(60) Provisional application No. 63/090,965, filed on Oct. 13, 2020.

(51) Int. Cl.
  *A62C 35/68* (2006.01)
  *E03B 7/09* (2006.01)
  *F16L 58/02* (2006.01)

(56) References Cited

U.S. PATENT DOCUMENTS

| | | | |
|---|---|---|---|
| 4,308,168 | A | 12/1981 | Sato et al. |
| 4,533,640 | A * | 8/1985 | Shafer .................... G01K 3/04 |
| | | | 374/102 |
| 5,417,204 | A * | 5/1995 | Moesle, Jr. .......... G01N 21/783 |
| | | | 422/86 |
| 6,841,125 | B1 | 1/2005 | Chartier et al. |
| 8,377,531 | B2 | 2/2013 | Lyublinski et al. |
| 9,144,700 | B2 | 9/2015 | Burkhart et al. |
| 9,303,382 | B2 | 4/2016 | Cassidy |
| 9,435,037 | B2 | 9/2016 | Kharshan et al. |
| 9,556,635 | B2 | 1/2017 | Lyublinski et al. |
| 9,656,201 | B2 | 5/2017 | Gencer et al. |
| 10,420,970 | B2 | 9/2019 | Burkhart et al. |
| 11,097,139 | B1 * | 8/2021 | Shen .................... G01M 3/2807 |
| 2003/0087451 | A1 * | 5/2003 | Scaringe ............ G01N 31/221 |
| | | | 436/100 |
| 2006/0147341 | A1 * | 7/2006 | Jahngen ................. A61K 31/05 |
| | | | 422/400 |
| 2007/0000560 | A1 | 1/2007 | Jaworowski |
| 2008/0118419 | A1 | 5/2008 | Lyublinski et al. |
| 2010/0263882 | A1 | 10/2010 | Bodemann |
| 2014/0205496 | A1 * | 7/2014 | Kharshan ................ C23F 11/02 |
| | | | 422/9 |
| 2016/0206907 | A1 | 7/2016 | O'leary et al. |
| 2021/0031060 | A1 * | 2/2021 | Belyaev .................. A62B 7/02 |
| 2022/0112977 | A1 | 4/2022 | Laskaris et al. |

OTHER PUBLICATIONS

"Digital Hand-held "Pocket" Meter for Corrosion Inhibitor Solutions PAL-AntiRust", ATAGO, one page, retrieved from the internet on Nov. 11, 2020.

Notification of Transmittal of the ISR and the Written Opinion of the International Searching Authority issued Jan. 10, 2022, by the Korean Intellectual Property Office in corresponding International Application No. PCT/US2021/054089. (13 pages).

VpCI (Vapor Phase Corrosion Inhibitor), "What are VpCI Powders and why are they used?", CORTEC, 4 pages, date unknown.

Cracauer, et al., "A New Method for Corrosion Control in Dry Fire Protection Systems", Materials Performance, Jun. 2014, pp. 14-17.

Lambert, et al., "Corrosion Control of the Severn Bridge Main Suspension Cables", Materials Performance, vol. 53, No. 11, Nov. 2014, pp. 46-51.

* cited by examiner

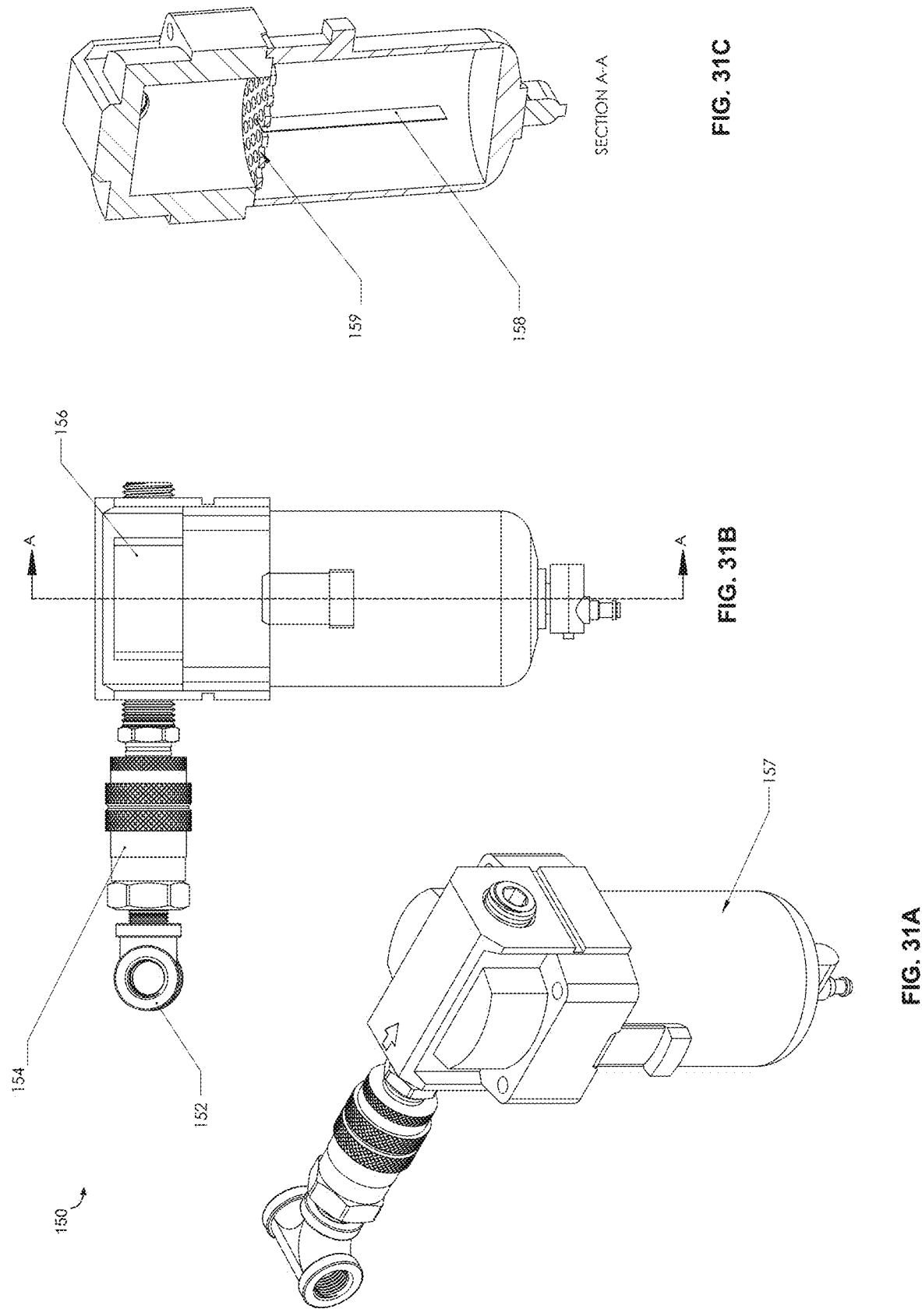

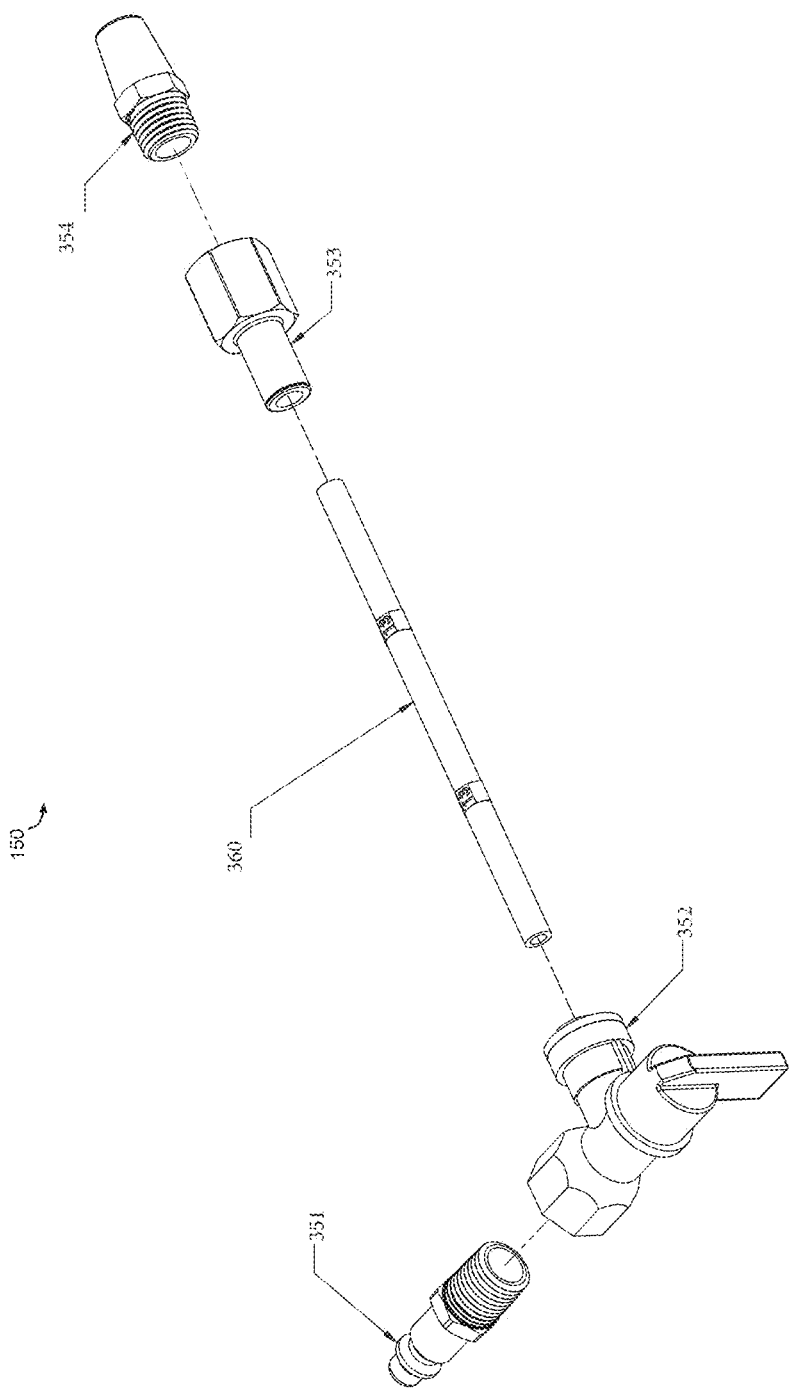
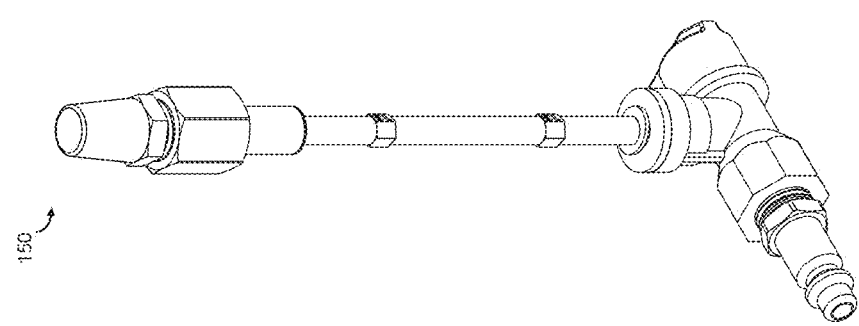
FIG. 33B
FIG. 33A

VOLATILE CORROSION INHIBITOR DETECTION DEVICE

CROSS REFERENCE TO RELATED APPLICATION

This application is a divisional of U.S. application Ser. No. 17/113,192 filed on Dec. 7, 2020, which claims the benefit of U.S. Provisional Patent Application Ser. No. 63/090,965 filed on Oct. 13, 2020, the entire content of each of which is incorporated herein by reference in their entireties for all purposes.

TECHNICAL FIELD

The present disclosure relates to a corrosion risk reduction apparatus, a corrosion risk reduction detection device, and corrosion risk reduction systems and methods involving the same.

BACKGROUND INFORMATION

Corrosion, including oxygen-caused corrosion and/or microbiological-influenced corrosion, can lead to significant problems in various systems including, but not limited to, dry pipe or pre-action piping systems for fire sprinkler systems, heat exchangers and boiler tube assemblies, power plant equipment, steam turbine assemblies, offshore platform piping systems, refineries, double-bottom tanker hulls and above ground storage tanks, or any compressed air piping systems. Water borne microbiological entities, such as bacteria, molds and fungi, brought into a piping network of a sprinkler system with untreated water, feed on nutrients within the piping system and establish colonies in the stagnant water within the system. This may occur even in so-called "dry" sprinkler systems where significant amounts of residual water may be present in the piping network after a test or activation of the system.

Over time, oxygen, and/or the biological activities of living entities can cause significant problems within piping networks. For example, both copper and steel pipes may suffer from pitting corrosion leading to pin-hole leaks. Iron oxidizing bacteria form tubercles, which are corrosion deposits on the inside walls of the pipes that can grow to occlude the pipes. Tubercles may also break free from the pipe wall and lodge in sprinkler heads, thereby blocking the flow of water from the head either partially or entirely. Even stainless steel is not immune to the adverse effects of such corrosion, as certain sulfate-reducing bacteria are known to be responsible for rapid pitting and through-wall penetration of stainless steel pipes.

Other forms of corrosion may include, for example, water and oxygen-caused oxidative corrosion of ferrous materials. Such corrosion can cause leaks as well as foul a network and/or sprinkler heads with rust particles. The presence of water in a piping network having a high mineral content can cause scaling as the various dissolved minerals, such as calcium and zinc, react with the water and the pipes to form mineral deposits on the inside walls which can inhibit flow or break free and clog sprinkler heads, preventing proper discharge in the event of a fire.

SUMMARY

A corrosion risk reduction method comprises introducing volatile corrosion inhibitor into a piping system, and distributing the volatile corrosion inhibitor inside the piping system.

A corrosion risk reduction apparatus comprises at least one corrosion risk reduction module. Each corrosion risk reduction module comprises a housing including an inlet port and an outlet port which are each configured for fluid communication between an inside of the housing and an outside of the housing. The housing contains a volatile corrosion inhibitor. An outlet of the corrosion risk reduction apparatus is configured for fluid communication with a system, and is further configured to direct gas containing volatile corrosion inhibitor from the inside of the housing of the at least one corrosion risk reduction module into the system for distribution inside the system.

A volatile corrosion inhibitor detection device comprises a coupling configured to couple to a system configured to be closed, and a housing in fluid communication with the coupling and containing an indicator element configured to visually change upon contact with volatile corrosion inhibitor.

BRIEF DESCRIPTION OF THE DRAWINGS

Other features and advantages disclosed herein will become more apparent from the following detailed description of illustrative embodiments when read in conjunction with the attached drawings.

FIG. 31A is a schematic representation of a perspective view of an illustrative first embodiment of a detection device.

FIG. 31B is a schematic representation of a side view of an illustrative first embodiment of a detection device.

FIG. 31C is a schematic representation of a cross-sectional view of an illustrative first embodiment of a detection device.

FIG. 33A is a schematic representation of a perspective view of an illustrative third embodiment of a detection device.

FIG. 33B is a schematic representation of an exploded view of an illustrative third embodiment of detection device.

DETAILED DESCRIPTION

Figure 1:
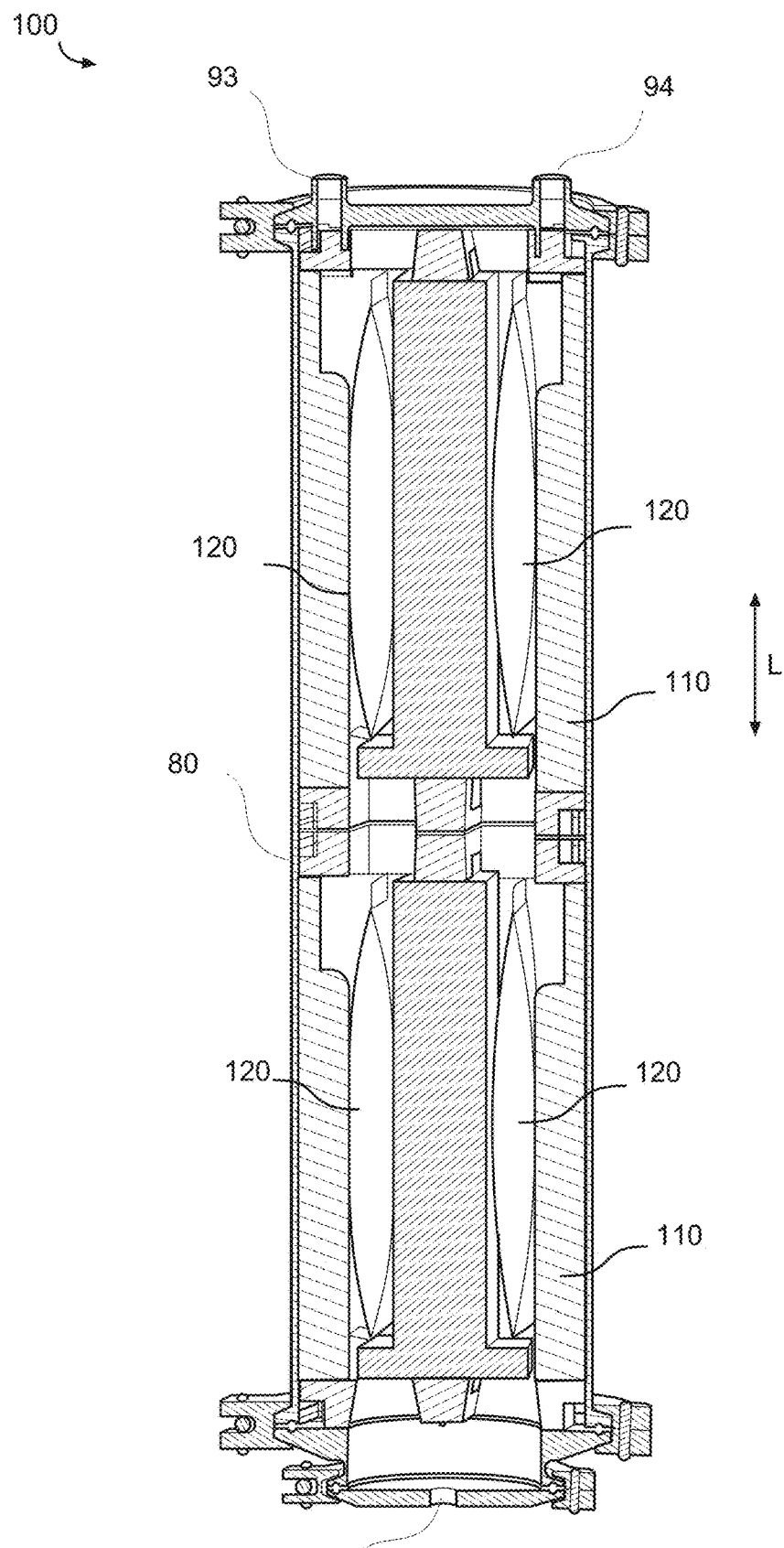
FIG. 1 is a schematic representation of a cross-sectional view of an illustrative embodiment of a corrosion risk reduction module.
Figure 2:
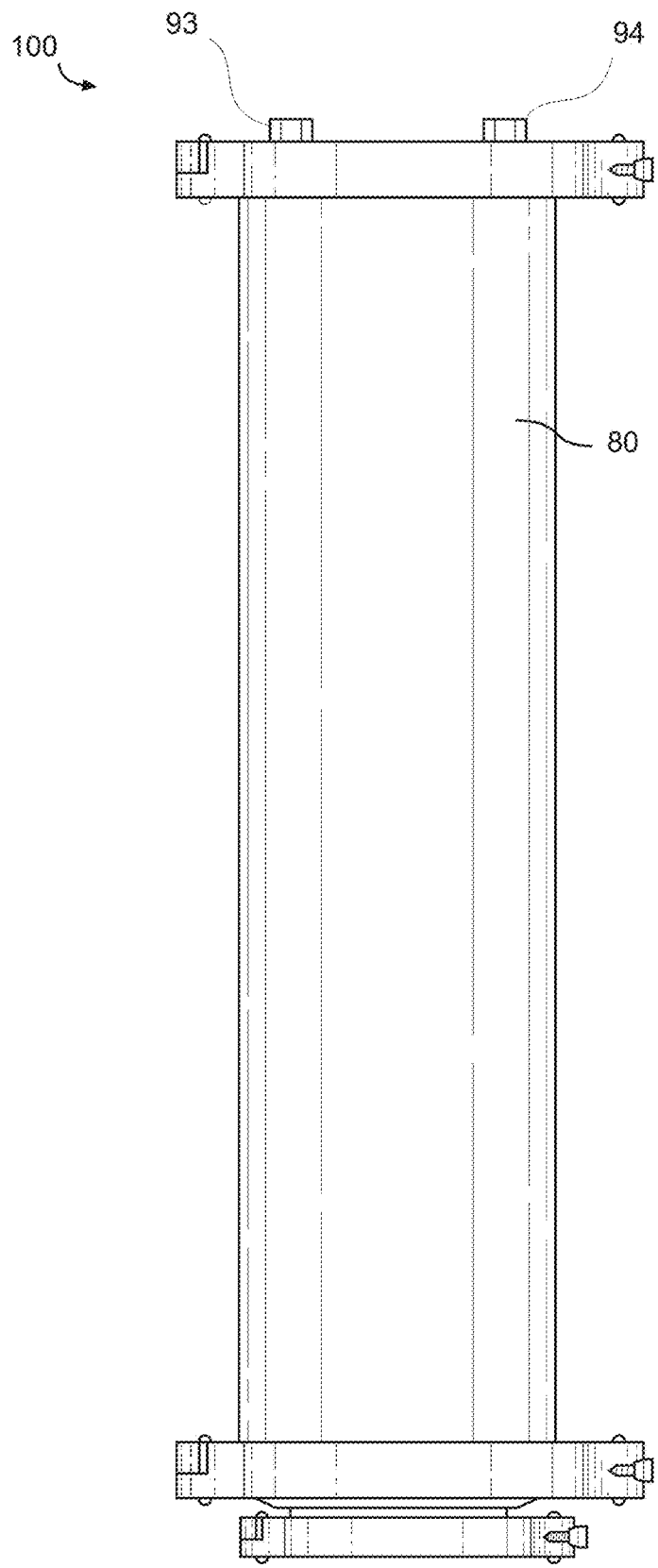
FIG. 2 is a schematic representation of a side view of an illustrative embodiment of a corrosion risk reduction module.

FIGS. 1-4B show an illustrative embodiment of a corrosion risk reduction module 100. The corrosion risk reduction module 100 comprises a housing 80 including an inlet port 93 and an outlet port 94 which are each configured for fluid communication between an inside of the housing 80 and an outside of the housing 80. The corrosion risk reduction module 100 contains corrosion inhibitor (e.g., but not limited to, volatile corrosion inhibitor). In some illustrative embodiments, the corrosion risk reduction module 100 comprises at least one cartridge 110 located inside the housing 80 and removable from the housing 80. The corrosion risk reduction module 100 comprises at least one vapor-permeable container 120 located inside the cartridge 110, and containing a corrosion inhibitor. However, corrosion inhibitor can instead be contained in the corrosion risk reduction module 100 without a cartridge, and/or without a vapor-permeable container 120.

In illustrative embodiments, each cartridge 110 is arranged within the housing 80 and is configured to direct air or any other gas from the inlet port 93 or from an upstream cartridge 110, around and/or through the vapor-permeable container 120, and to the outlet port 94 or to a downstream cartridge 110. While the term "air" is used throughout the present disclosure, it is to be understood that other gases can be used instead of air, without departing from the scope of the present disclosure.

During operation of illustrative embodiments, the corrosion inhibitor can be dispersed from the corrosion risk reduction module 100, so as to interact with and disperse into the surrounding atmosphere, such as the volume inside a system configured to be closed. This system can include, but is not limited to a dry piping system (e.g., but not limited to a dry pipe fire sprinkler system, pre-action fire sprinkler system, or any other piping system that does not store liquid), a heat exchanger or boiler tube assembly, power plant equipment, a steam turbine assembly, an offshore platform piping system, a refinery, a double-bottom tanker hull or an above ground storage tank, or any system containing compressed air, thus providing substantial corrosion control of an internal surface susceptible to corrosion. While the following description of illustrative embodiments may refer to the dispersion of corrosion inhibitor in piping systems, it is to be understood that any of the above-noted systems can be substituted for the piping systems without departing from the scope of the disclosure. In illustrative embodiments, the system is configured to be closed once corrosion inhibitor has been distributed inside the system. Closing the system may involve, for example, closing a valve that is in fluid communication with the system. In illustrative embodiments, volatile corrosion inhibitor can be used in conjunction with nitrogen, and/or dry air, and/or any other additional preventative measure against corrosion.

The Housing

In illustrative embodiments, as noted above and as shown in FIGS. 1-4B, the corrosion risk reduction module 100 comprises a housing 80 including an inlet port 93 and an outlet port 94 which are each configured for fluid communication between an inside of the housing 80 and an outside of the housing 80.

Figure 5:
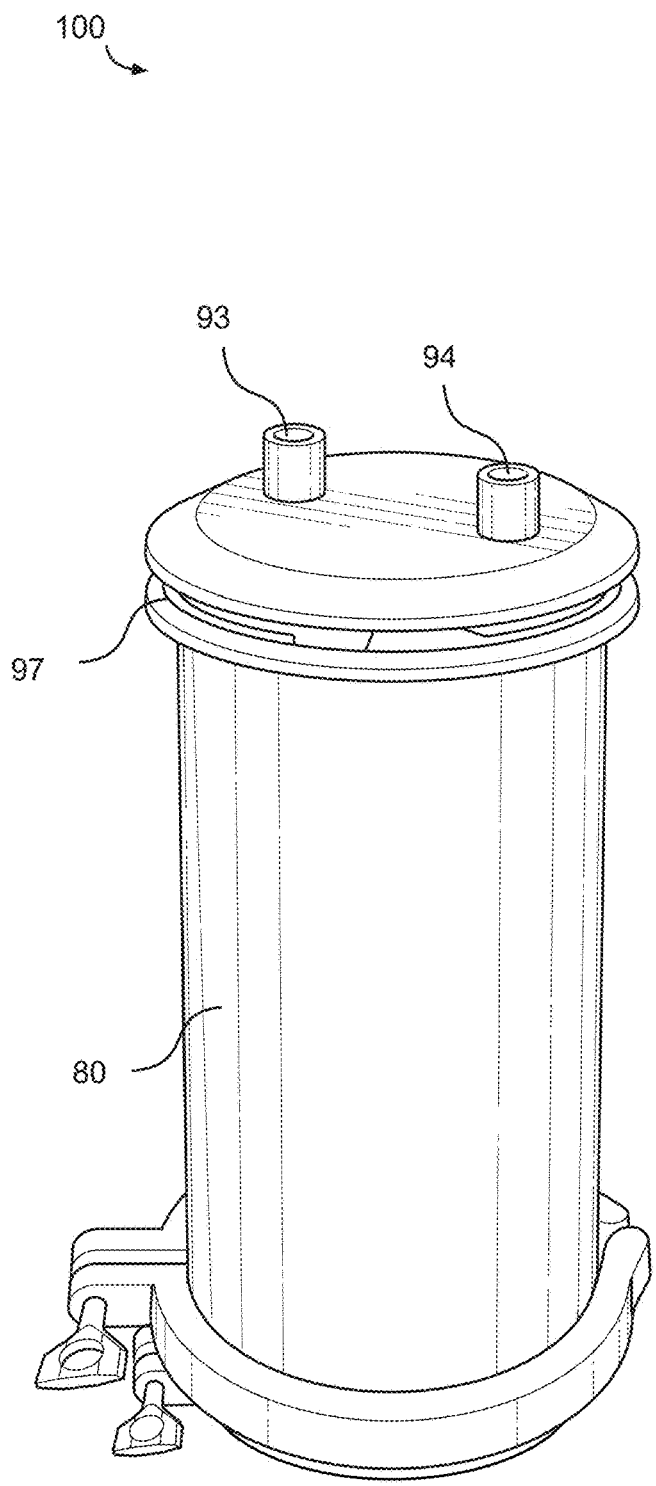
FIG. 5 is a schematic representation of a perspective view of an illustrative embodiment of a corrosion risk reduction module in a closed configuration.
Figure 6:
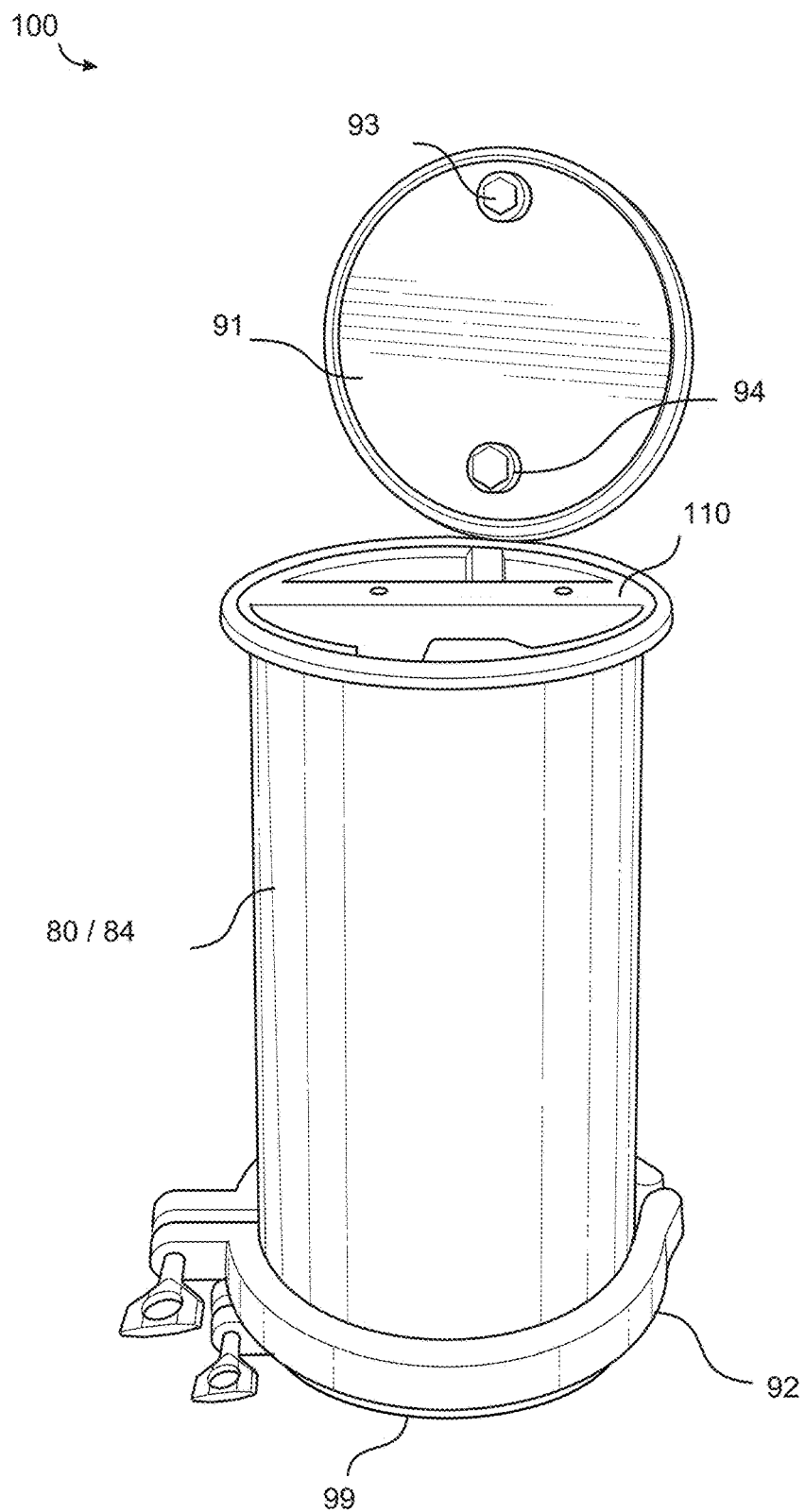
FIG. 6 is a schematic representation of a perspective view of an illustrative embodiment of a corrosion risk reduction module in an open configuration.

FIGS. 5 and 6 show another illustrative embodiment of a corrosion risk reduction module 100. In FIG. 5, the housing 80 is closed, while in FIG. 6 it is open.

In illustrative embodiments, the housing 80 includes a housing body 84, a top housing lid 91 and a bottom cap 99. A clamp 92 connects a housing lid or cap 91, 99 to the housing body 84. As such, the housing 80 can be opened to receive a cartridge 110. Alternatively, in lieu of or in addition to a clamp 92, any binding or sealing device, or contraption can be used for sealing a housing lid or cap 91, 99 to the housing body 84.

Figure 3:
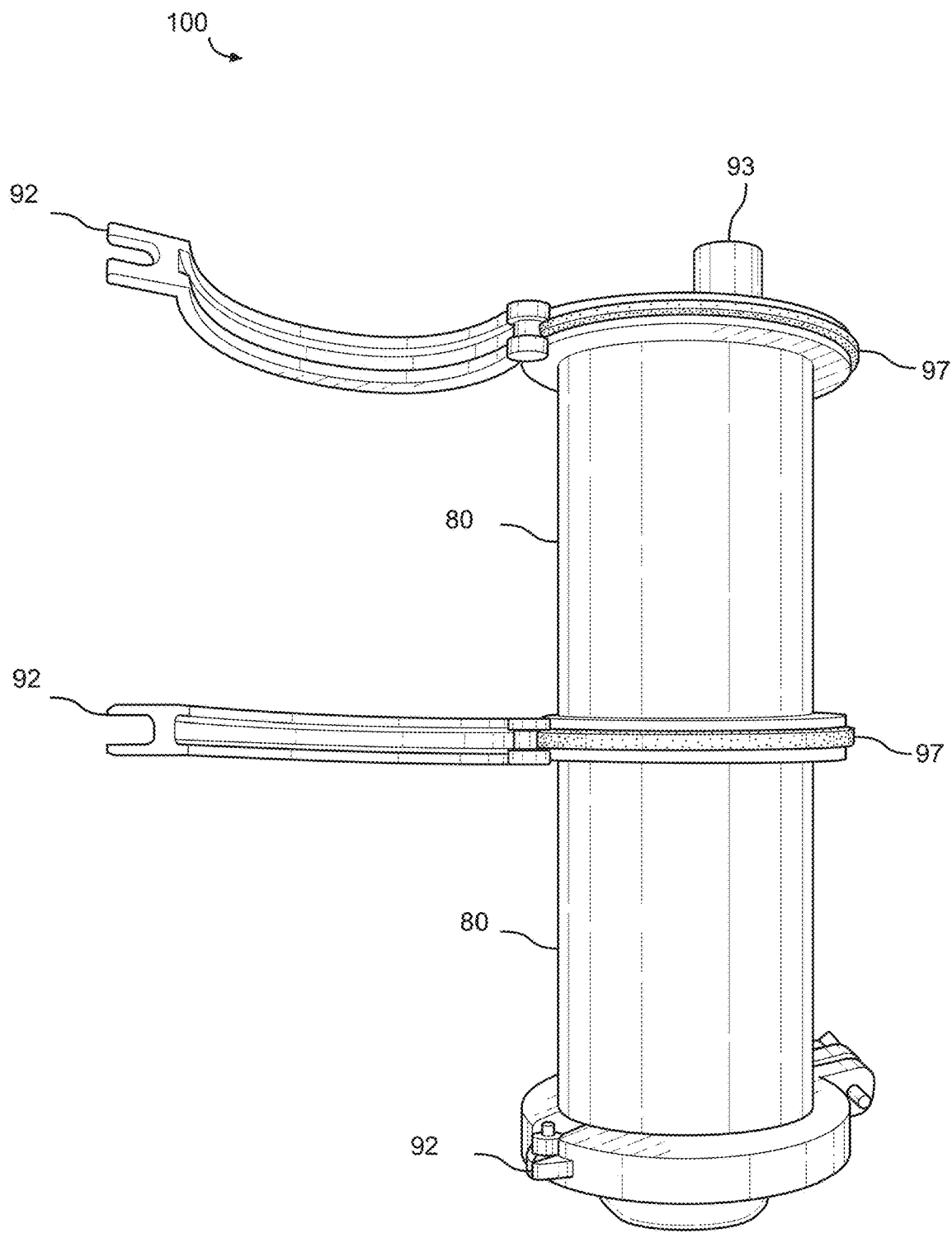
FIG. 3 is a schematic representation of a perspective view of an illustrative embodiment of a corrosion risk reduction module.
Figure 4A:
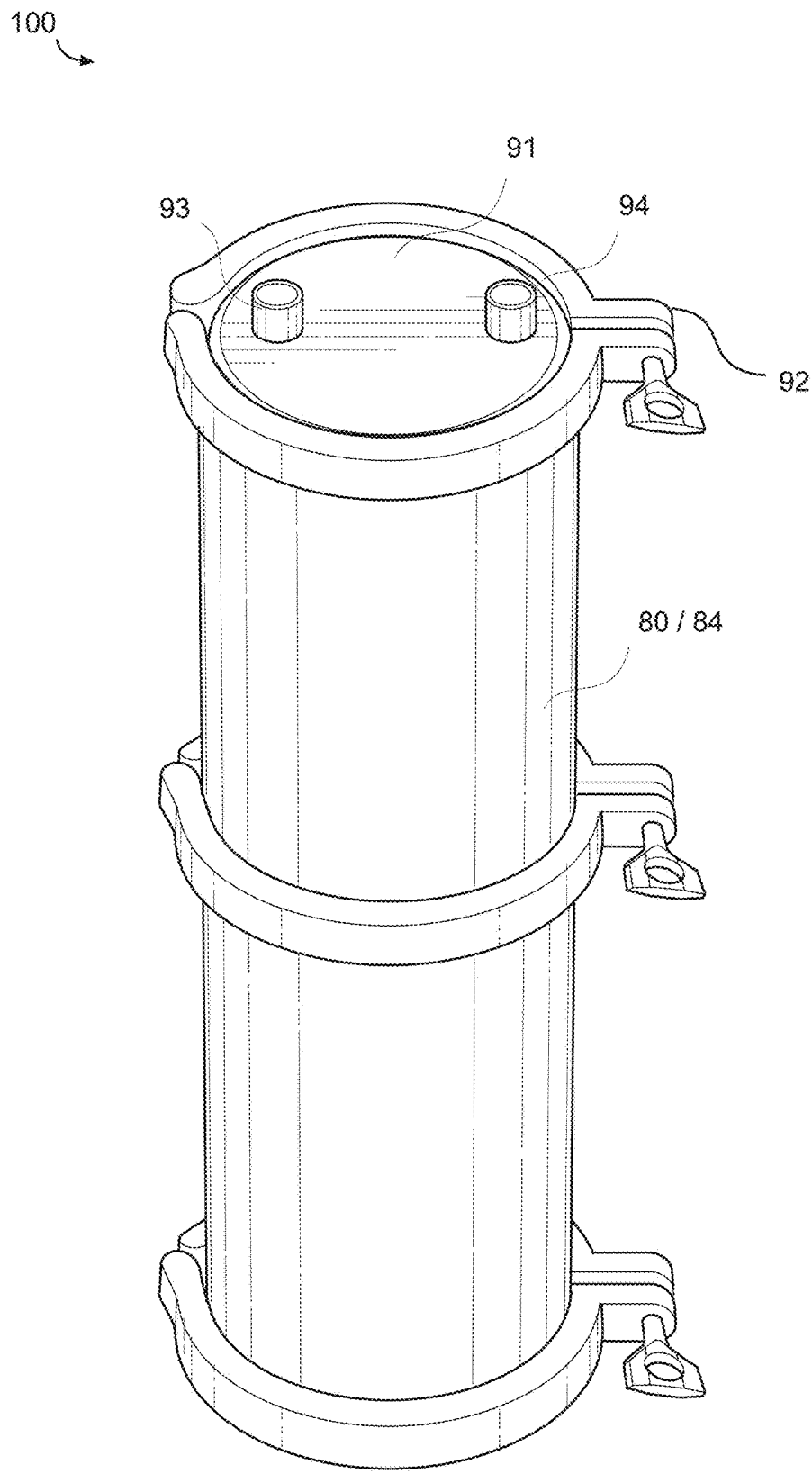
FIG. 4A is a schematic representation of a perspective view of an illustrative embodiment of a corrosion risk reduction module.
Figure 4B:
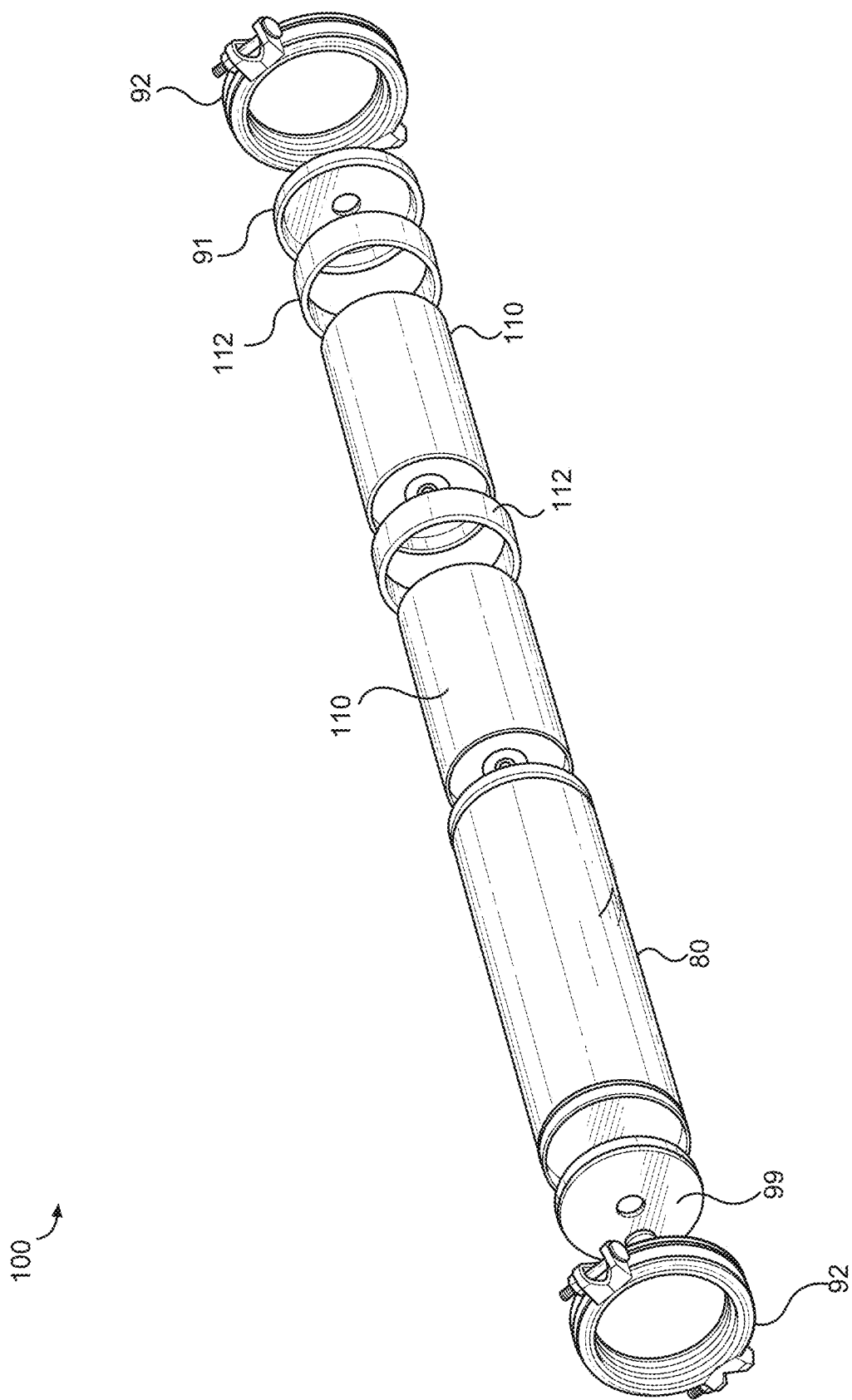
FIG. 4B is a schematic representation of an exploded view of an illustrative embodiment of a corrosion risk reduction module.

In illustrative embodiments, a gasket 97 is positioned between a housing or cap 91, 99 and the housing body 84, and between stacked cartridges 110 (see FIGS. 3 and 5). Cartridges 110 can also be stacked with sock or sleeve seals 112 between cartridges 110, and between the cartridge 110 and a cap 91, 99.

In illustrative embodiments, the housing 80 includes a longitudinal axis L, and two opposite ends along the longitudinal axis L, and the inlet port 93 and the outlet port 94 are both located at one of the two ends of the housing 80. This configuration may be preferable if the housing 80 is to be disposed with its longitudinal axis L oriented vertically, as it may allow for condensation collection at the bottom of the housing 80.

As shown in FIG. 1, in illustrative embodiments, the housing 80 further includes a drain port 88 at the other one of the two ends of the housing 80. A drain port 88 may be desirable for condensation collection, and may include a moisture drain valve.

Figure 7A:
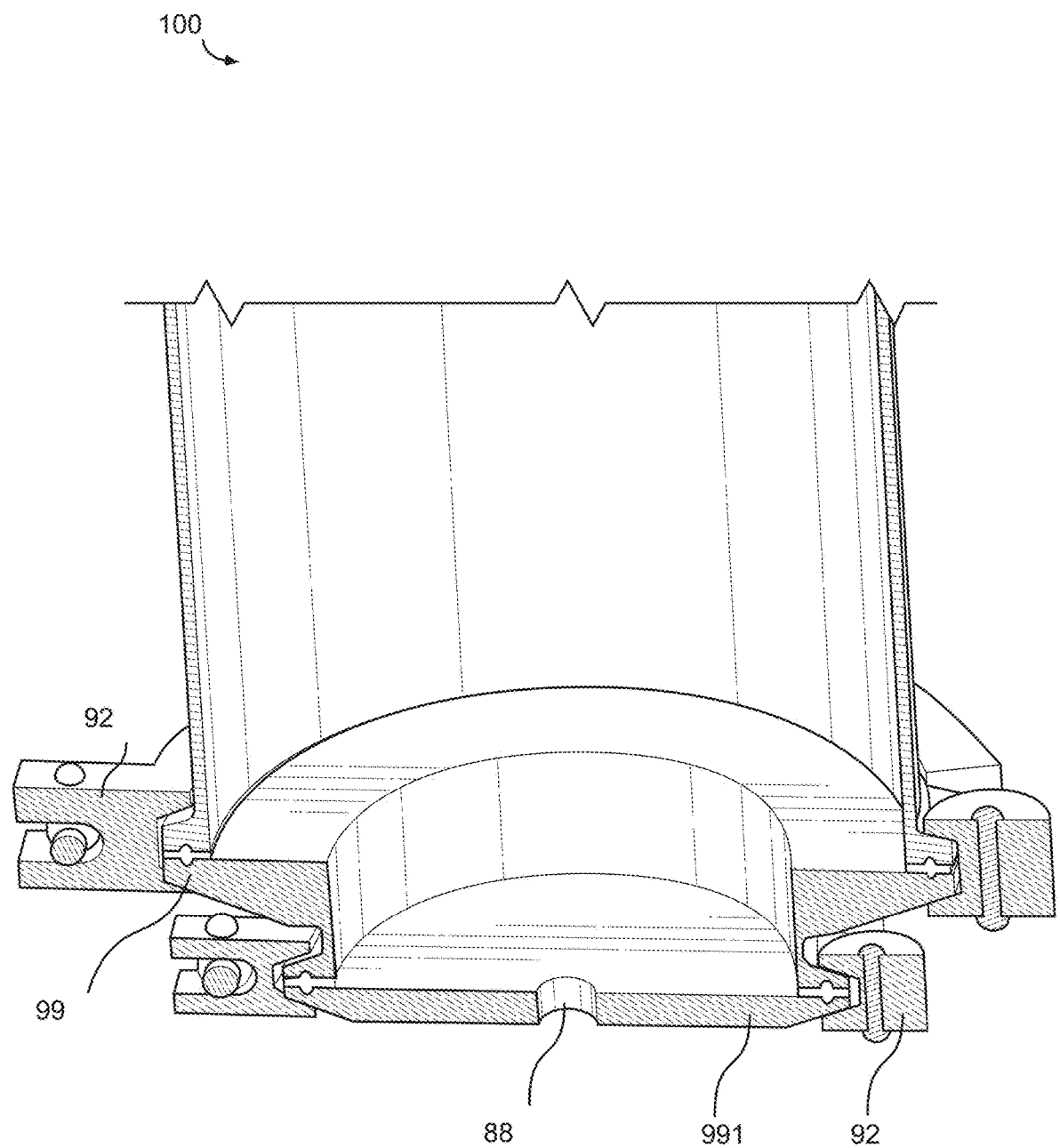
FIG. 7A is a schematic representation of a cross-sectional view of an illustrative embodiment of a corrosion risk reduction module.
Figure 7B:
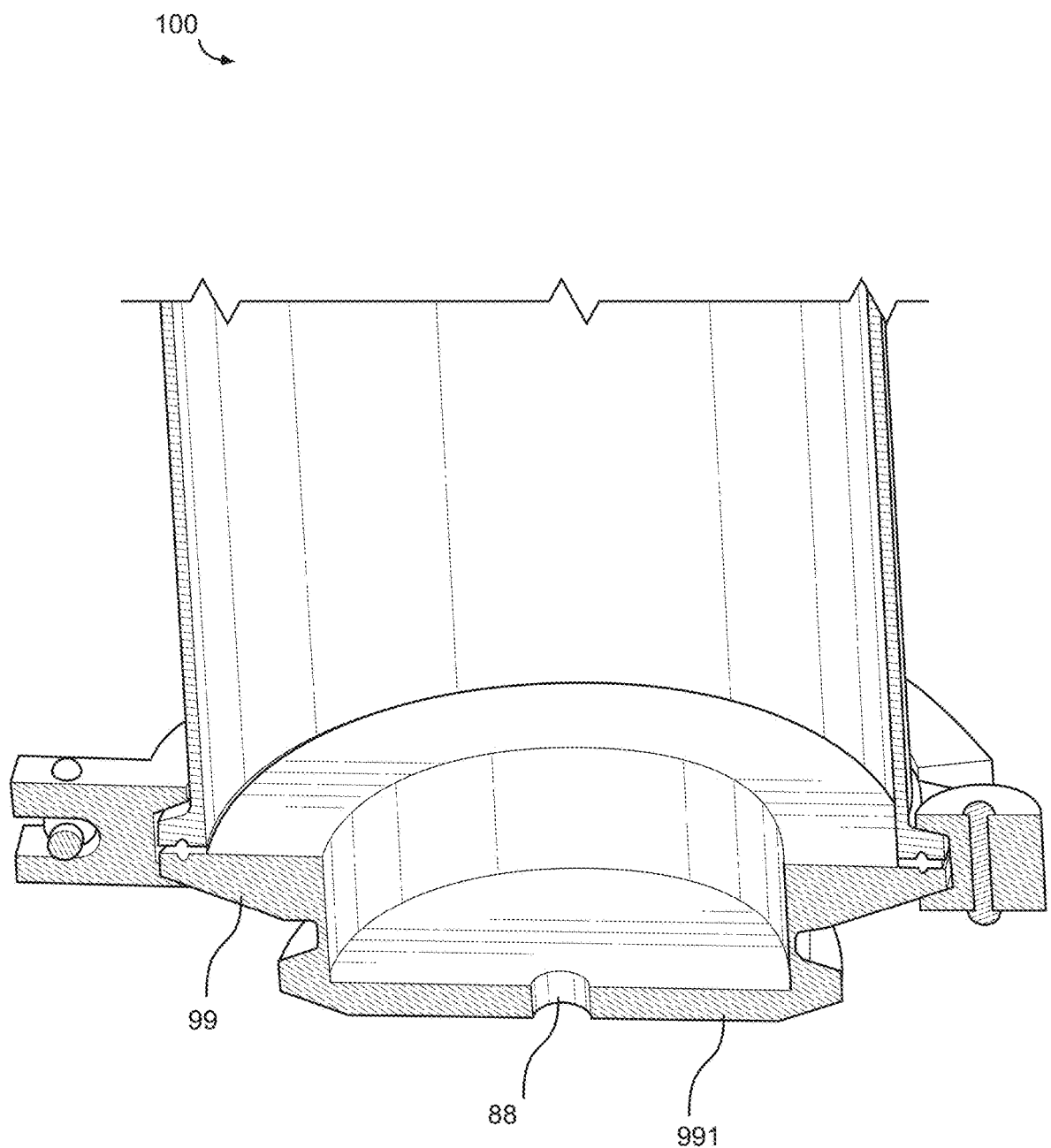
FIG. 7B is a schematic representation of a cross-sectional view of an illustrative embodiment of a corrosion risk reduction module.

FIGS. 7A and 7B show illustrative embodiments of a corrosion risk reduction module 100 including a drain port 88. The housing 80 further includes a drain port 88 at the other one of the two ends of the housing 80. A drain port 88 may be desirable for condensation collection. In FIG. 7A, the drain port 88 is formed in a removable section 991 of the bottom housing cap 99 which is attached to the bottom housing cap 99 by a clamp 92. Alternatively, as shown in FIG. 7B, the drain port 88 can be formed in a section 991 of the bottom housing cap 99 which is not separable from the bottom housing cap 99. With further reference to FIGS. 7A and 7B, the space above the section 991 allows for air flow between chambers of the cartridge, which are described below.

Figure 8A:
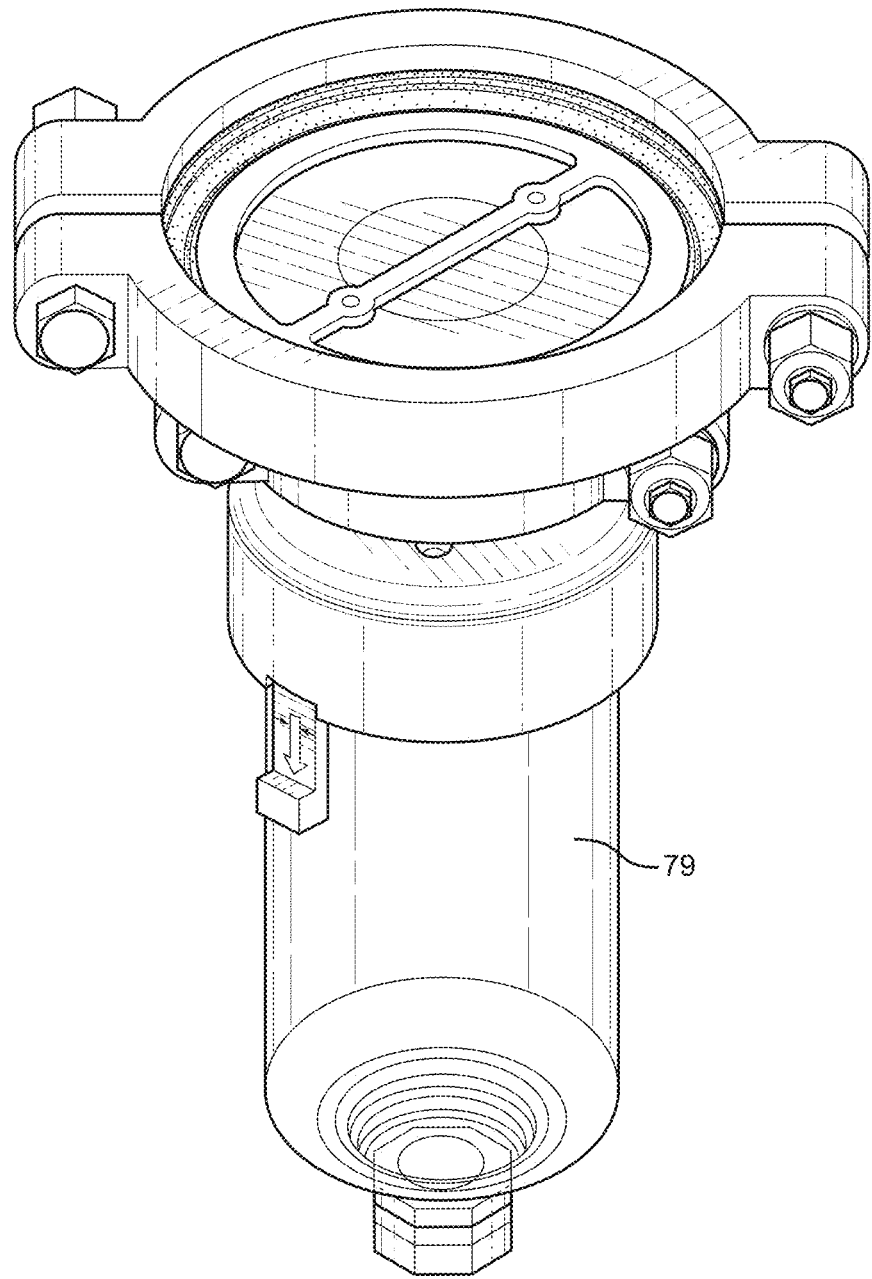
FIGS. 8A and 8B show schematic representations of corrosion risk reduction modules including a filtering system.
Figure 8B:
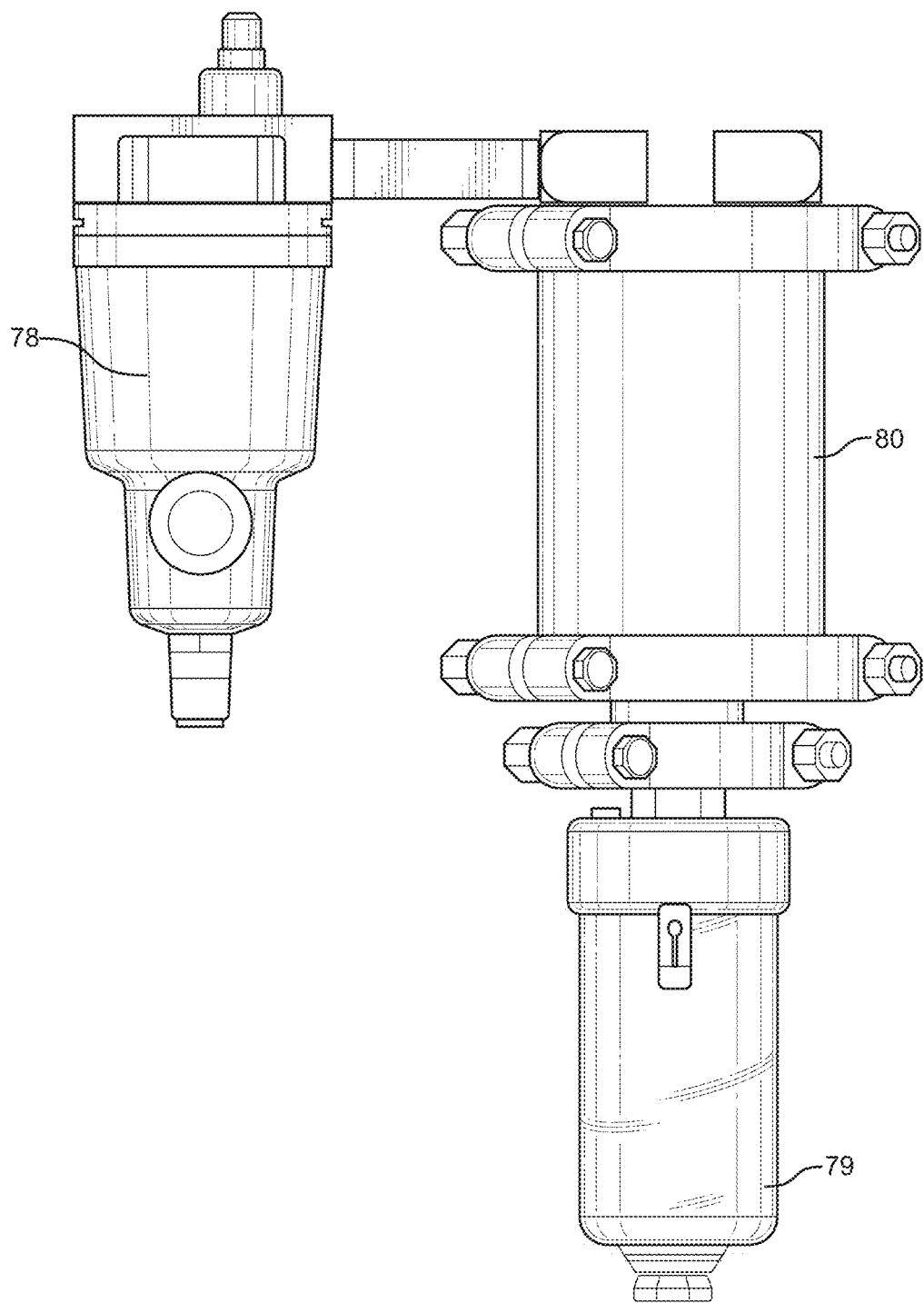

In illustrative embodiments, as shown in FIGS. 8A and 8B, a drain baffle 79 can be configured to collect and drain away condensation from the housing 80, and a coalescing or particulate filter 78 for filtering out impurities may be positioned between a source of compressed air and the inlet or outlet of the housing 80. In yet another embodiment a manual valve, actuated valve, a plug, or nothing at all (by implementation of a solid cap) can be used.

In illustrative embodiments, the housing 80 includes two opposite ends along the longitudinal axis L, and the inlet port and the outlet port are respectively located at the two opposite ends of the housing (as shown for example in FIG.

4B). This configuration may be preferable if the housing 80 is to be disposed with its longitudinal axis L oriented horizontally.

The Cartridge

In illustrative embodiments, as noted above, the corrosion risk reduction module 100 comprises at least one cartridge 110 located inside the housing 80 and removable from the housing 80. To "feed" or allow corrosion inhibitor to flow through pipes, a cartridge 110 can hold a vapor-permeable container 120. Air flowing around and/or through the vapor-permeable container 120 can then carry vapor through the piping system.

FIGS. 9A-9G show examples of a cartridge 110, which includes an outer wall 73 between two end caps 3, 4. In illustrative embodiments, the end caps 3, 4 are made of plastic or nylon plastic. In illustrative embodiments, the outer wall 73 and/or the end caps can be sized and configured to withstand the flow of corrosive inhibiting gases. Alternatively, or in addition, the cartridge 110 can include other materials, including, but not limited to, rubber, metals, ceramics, and/or combinations thereof. The size of the end caps 3, 4 can be chosen based on the size of the cartridge 110, and based on the intended application. The end caps 3, 4 can be round (as shown for example in FIGS. 9A and B), or be of other geometric shapes, depending on the shape of the openings at either end of the cartridge 110. For instance, if the openings at either end of the cartridge 110 are rectangular or square, the end caps 3, 4 can be rectangular or square.

In illustrative embodiments, two openings 5, 6 are formed in at least one of the end caps 3, 4. These openings 5, 6 can allow for the circulation of air, which carries vapors to piping. In one embodiment, these openings 5, 6 span equal approximately, but not limited to, one third to half of the surface area of each of the caps 3, 4. Larger openings 5, 6 can serve to allow better airflow and reduced pressure drop. In an illustrative embodiment, the material or surface or geometric area of the material of the end caps 3, 4 is kept to a minimum, with enough surface and material to provide sufficient support for the end caps 3, 4. Alternatively, a single opening at each end cap 3, 4 can be configured for input and/or output of air, as shown for example in FIGS. 12A-12B.

In illustrative embodiments, the two end caps 3, 4 are connected by a center wall 12 having outwardly-facing feet 10, 11 configured to contact and support a vapor-permeable container 120. Vapor-permeable containers 120 can rest on top of the outwardly-facing feet 10, 11.

In illustrative embodiments, one or opposite sides of the center wall 12 has/have a ridge 67 which may span a portion of or the entire length of the center wall 12. A ridge 67 can help secure a vapor-permeable container 120 while allowing for passage of air over and around the vapor-permeable container 120.

Figure 9A:
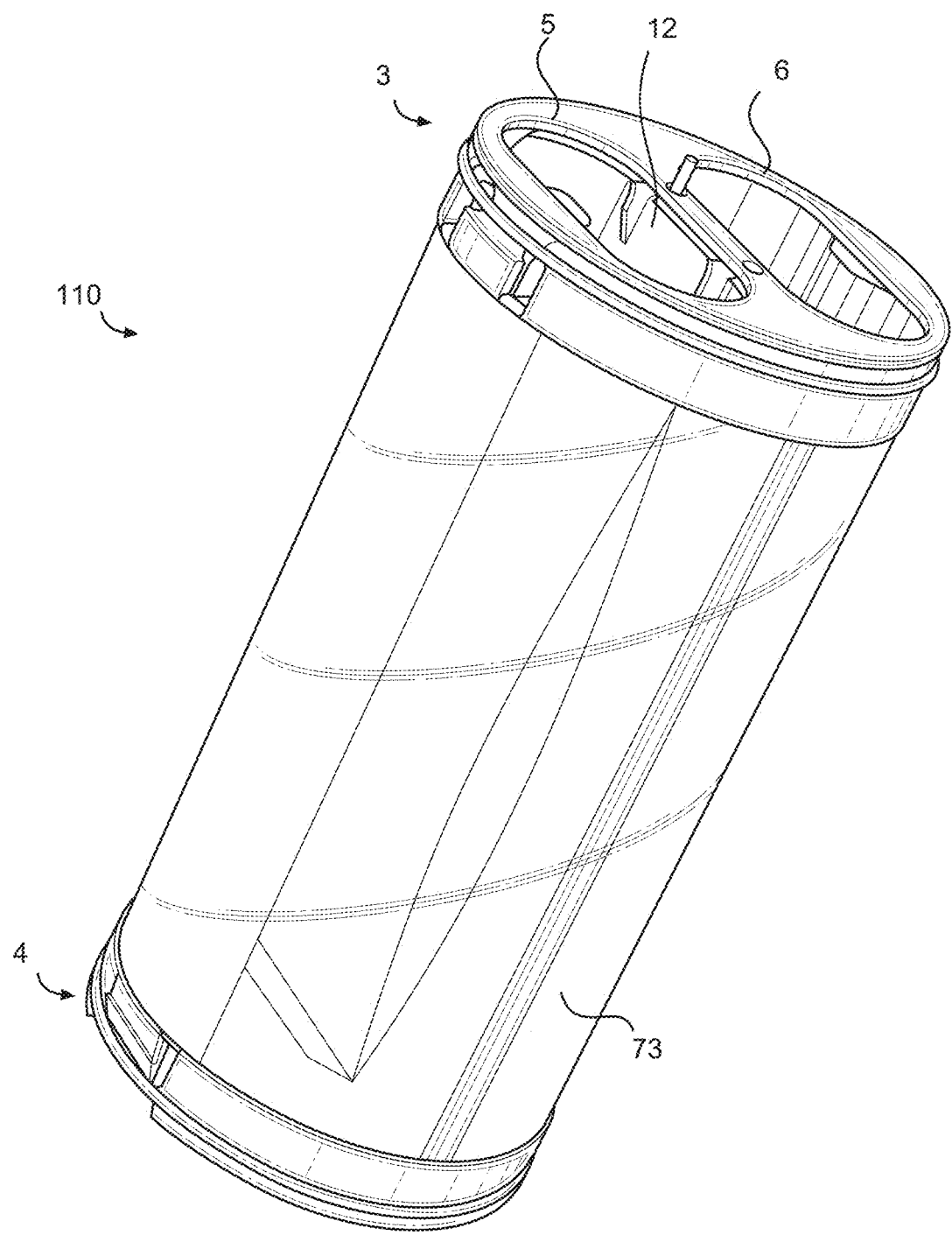
FIG. 9A is a schematic representation of a perspective view of an illustrative cartridge.
Figure 9B:
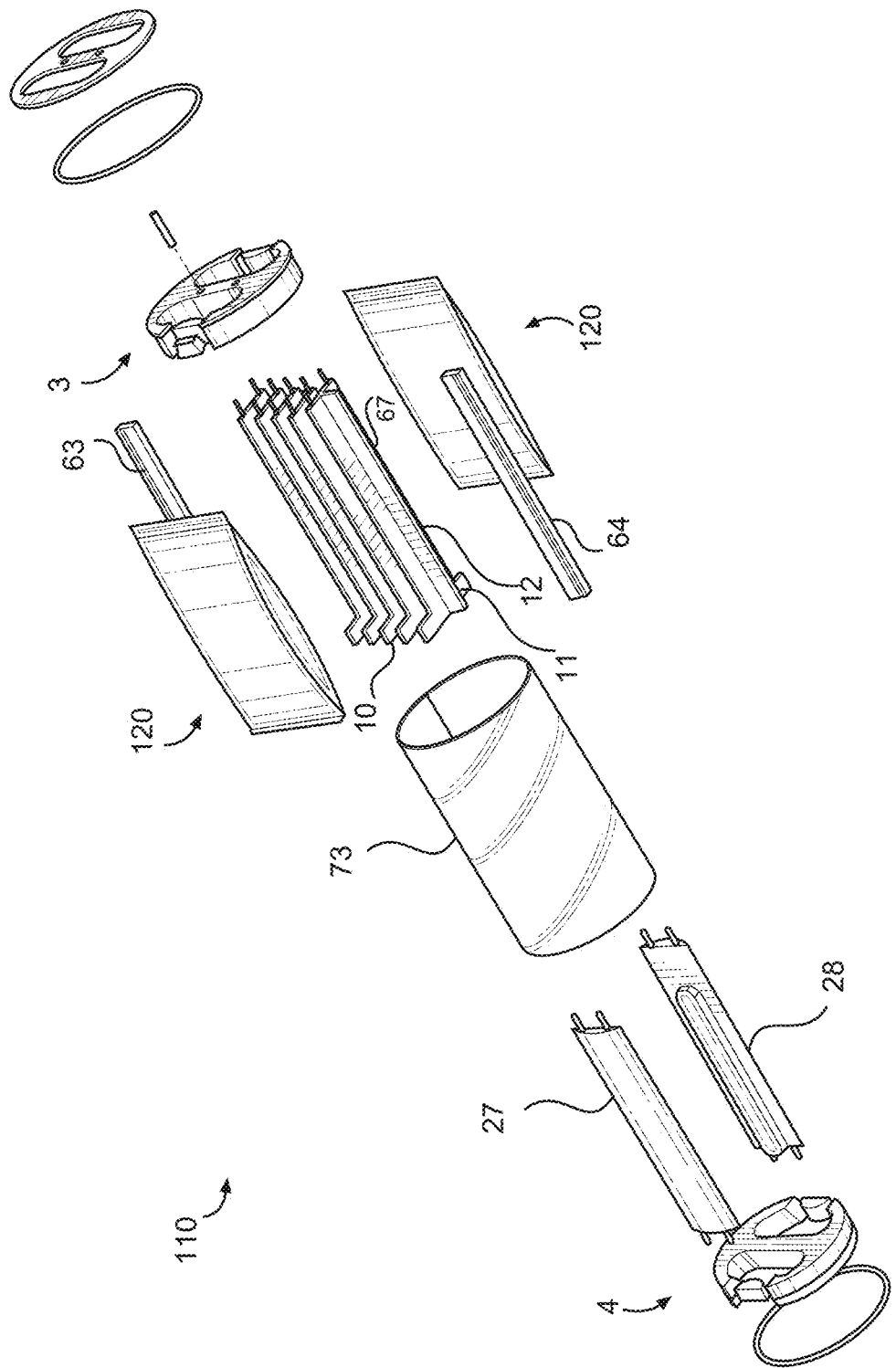
FIG. 9B is a schematic representation of an exploded view of an illustrative cartridge.
Figure 9C:
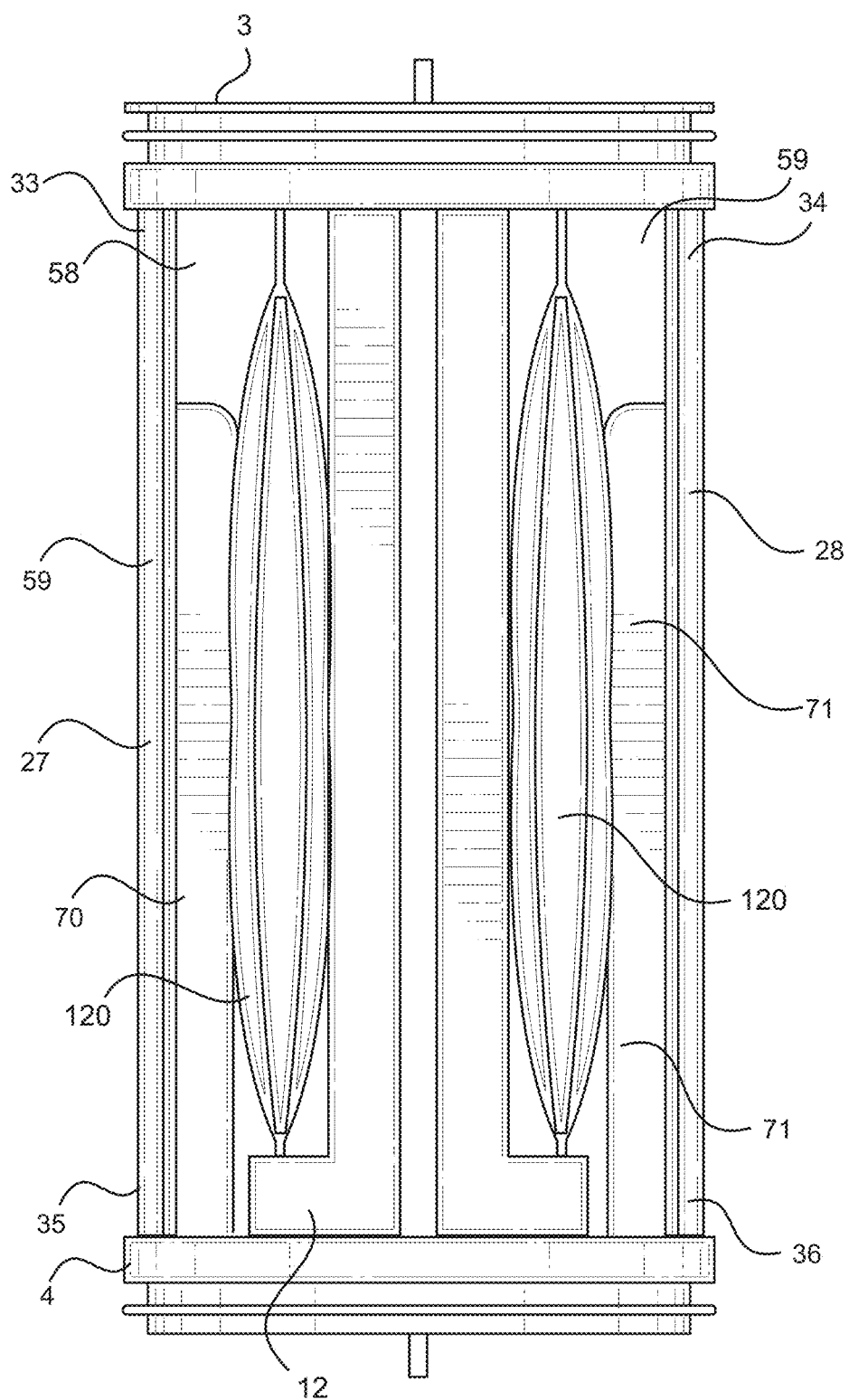
FIG. 9C is a schematic representation of a cross-sectional view of an illustrative cartridge.
Figure 9E:
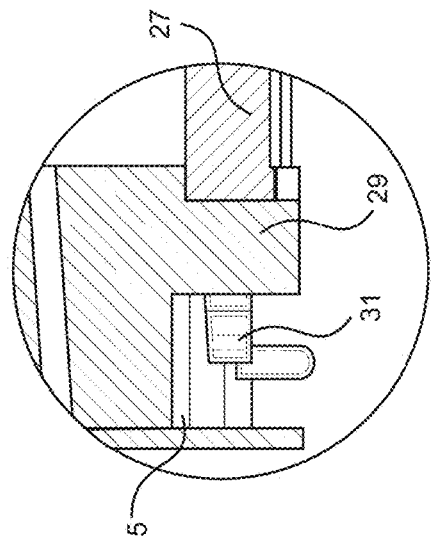
FIG. 9E is a schematic representation of an enlargement of the cross-sectional view of FIG. 9D.
Figure 9G:
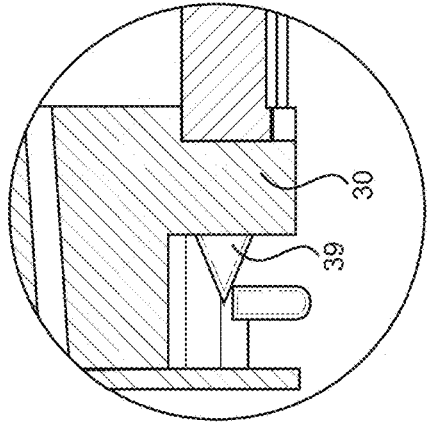
FIG. 9G is a schematic representation of an enlargement of a cross-sectional view of an alternative illustrative cartridge.
Figure 9D:
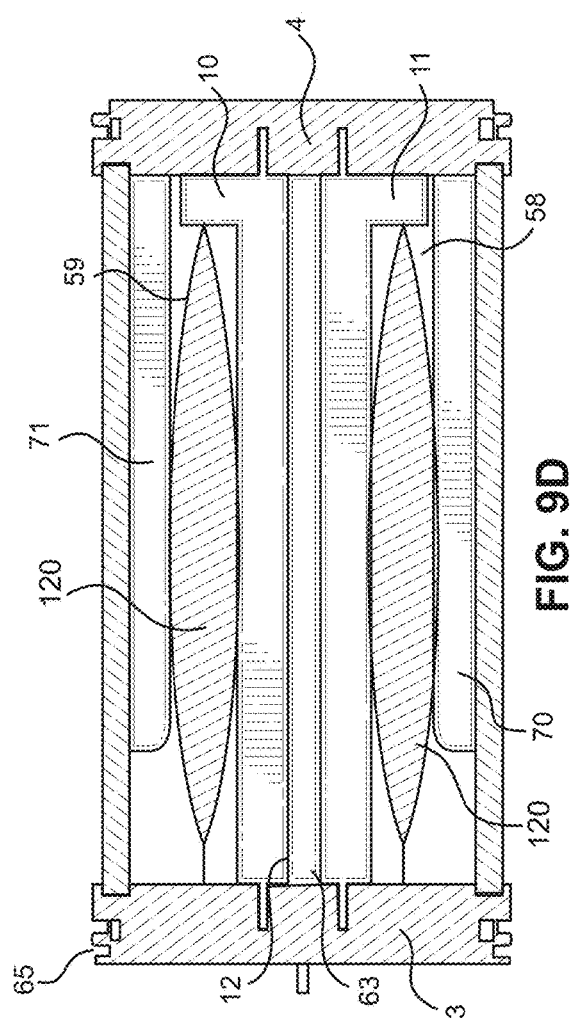
FIG. 9D is a schematic representation of another cross-sectional view of an illustrative cartridge.
Figure 9F:
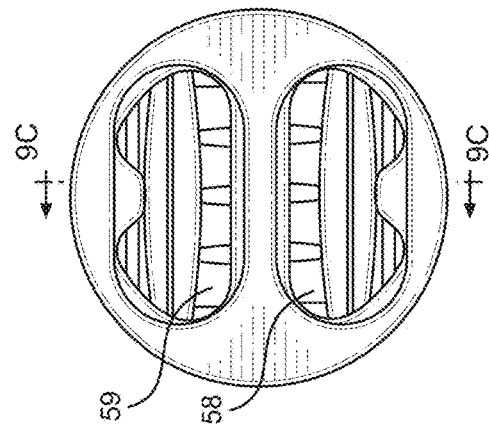
FIG. 9F is a schematic representation of a top view of an illustrative cartridge.
Figure 10:
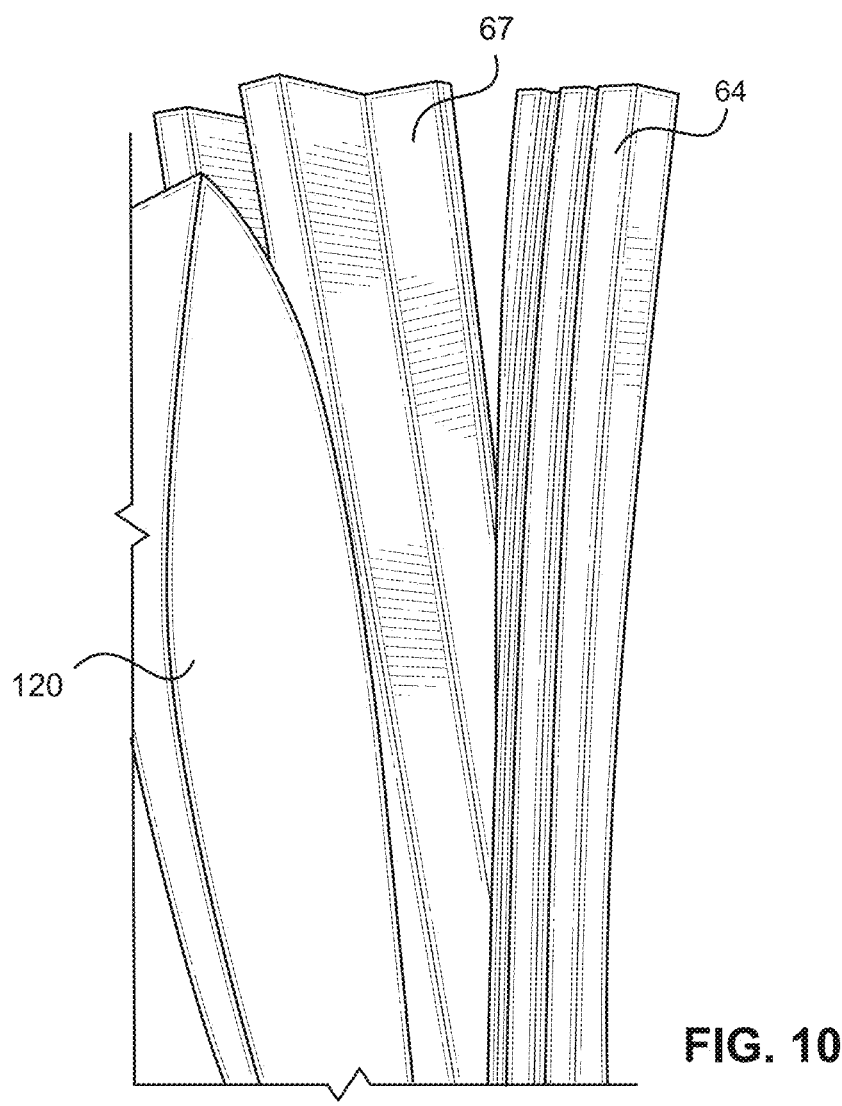
FIG. 10 is a schematic representation showing the connection of the rubber gasket to the center wall of a cartridge.

In illustrative embodiments, elongated rubber gaskets 63, 64 fit on outside edges of the center wall 12 (as shown in FIG. 10), for example, to help prevent rattling as well as unwanted leak paths between chambers 58, 59 (illustrated in FIGS. 9C-9D) formed on either side of the center wall 12.

In illustrative embodiments, two arms 27, 28 also connect the top cap 3 with the bottom cap 4. These two arms are positioned and attached at or near the edge or rim 29 of the end cap 3 and at or near the edge or rim of the end cap 4. In an illustrative embodiment, each end of the arms 27, 28, those being the arm tops 33, 34, and the arm bottoms 35, 36 have a flexible arrow point 39 (see FIG. 9G) or clip 31 (see FIG. 9E) that squeezes through a hole in the underside of the end caps 3, 4. In yet another illustrative embodiment, the arms 27, 28 are glued or welded into position. In another illustrative embodiment, one or both of the caps 3, 4 can be removably attached.

In illustrative embodiments, the outer wall 73 is made of a material selected from the group consisting of metal or plastic, and can be a corrugated metal. In one embodiment the outer wall 73 is attached to the arms 27, 28. In another embodiment, the outer wall 73 is taped to the top and bottom caps 3, 4. In yet another embodiment, the outer wall 73 is glued to the arms and end caps. Any number of means of attachment may be used. In another embodiment, no outer wall 73 is used.

In illustrative embodiments, there are no arms on the cartridge.

In illustrative embodiments, the vapor-permeable containers 120 inside the cartridge 110 are held in place to keep from blowing around and possibly tearing when compressed air passes through the cartridge 110, thus giving them a level of rigidity. In an illustrative embodiment, the inside walls of the arms 27, 28 have bumpers 70, 71 that push the vapor-permeable container 120 against the plurality of ridges 67 of the center wall 12. In one embodiment, the bumpers 70, 71 are integral with the arms 27, 28. In another embodiment, the bumpers 70, 71 are placed inside of the cartridge 110 next to the arms 27, 28. In one embodiment, the bumpers 70, 71 are firm, and made out of a rubber. In another embodiment, the bumpers 70, 71 are soft and air permeable. In another embodiment, the bumpers 70, 71 are not air permeable. In another embodiment, the bumpers 70, 71 are an extension of metal or plastic arms 27, 28. In another embodiment, other materials can be used, or existing parts can extend, with gaps filled, thereby preventing short-circuiting of the air flow between chambers 58, 59.

Figure 11:
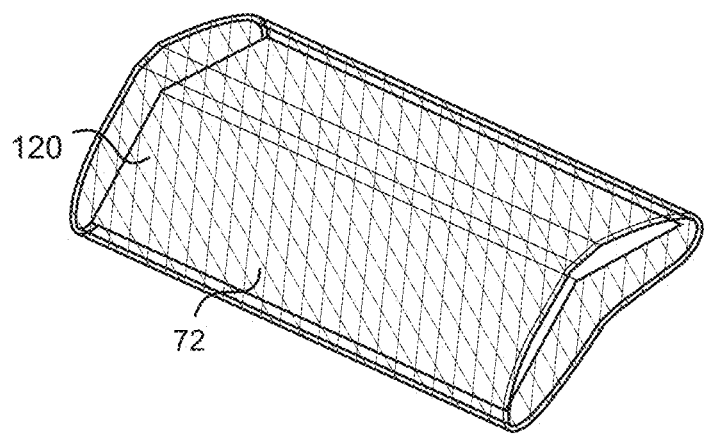
FIG. 11 is a schematic representation showing an illustrative metal mesh configured to help secure a vapor-permeable container.

In illustrative embodiments, as shown for example in FIG. 11, a metal or plastic webbing or mesh 72 is configured to hold a vapor-permeable container 120 in place. In one embodiment, the mesh 72 is used instead of or in conjunction with the bumpers 70, 71. In another embodiment, the ridges 67, 68 also help secure the pouch or container in place. In one embodiment, the mesh 72 is wrapped around the vapor-permeable container 120 before being placed in the openings in the cartridge 110. In another embodiment, the mesh 72 is positioned around the center wall 12 with enough room left to insert a vapor-permeable container 120 on each side of the center wall 12. In another embodiment, a pocket formed by the mesh 72 is inserted on each side of the center wall 12, into which the vapor-permeable container 120 is inserted.

In illustrative embodiments, parts of the cartridge 110 can be snap-fit, attached to each other by screws, attached by glue, welding, snap-hooks, press-fit, or by any other suitable method.

In illustrative embodiments, cartridges can be tubular, or of any polygonal or irregular shape.

In illustrative embodiments, as illustrated in FIG. 1, a plurality of cartridges 110 inside the housing 80 are adjacent to one another along the longitudinal axis L of the housing 80.

In illustrative embodiments, a plurality of cartridges 110 inside the housing 80 are adjacent to one another along a direction perpendicular to the longitudinal axis L of the housing 80.

Figure 12A:
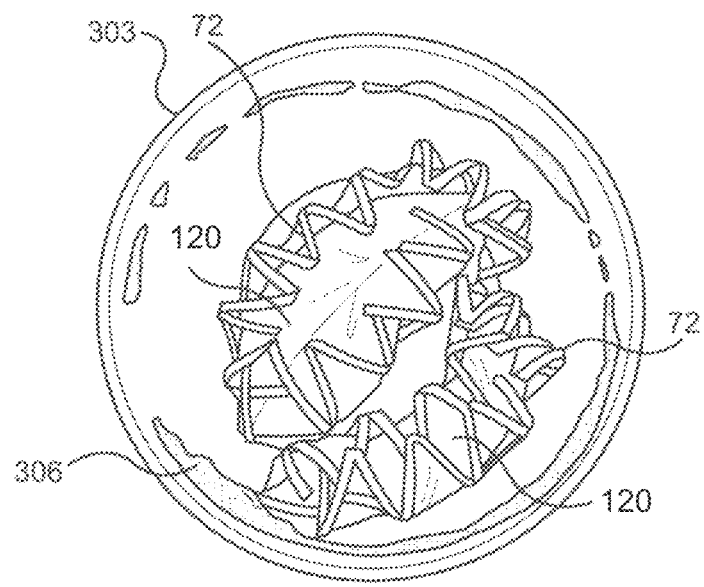
FIG. 12A is a schematic representation showing an arrangement of vapor-permeable containers inside an illustrative cartridge.
Figure 12B:
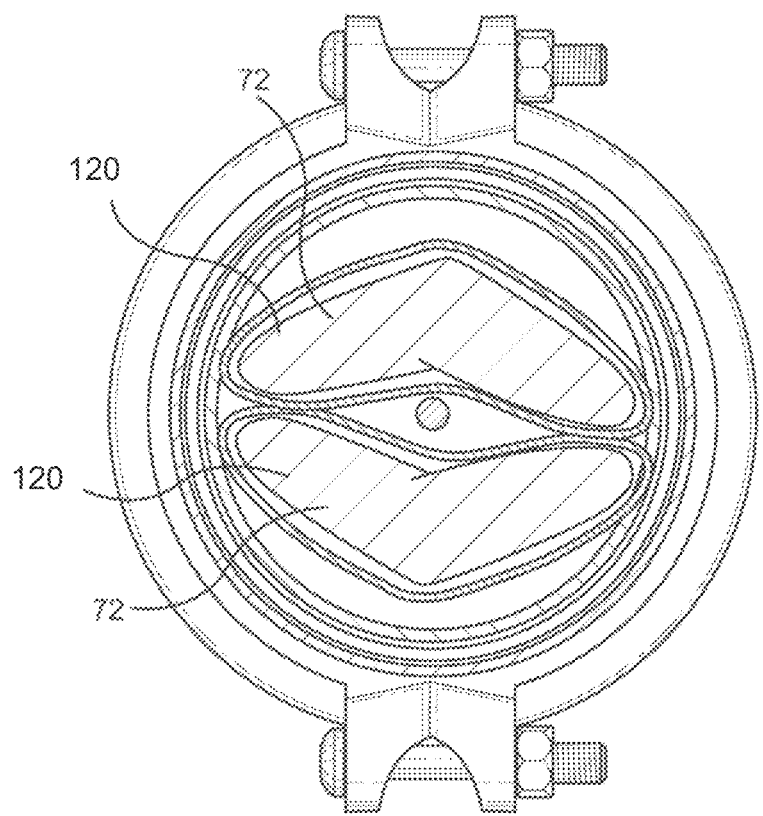
FIG. 12B is a schematic representation showing another arrangement of vapor-permeable containers inside an illustrative cartridge.

In illustrative embodiments, there is a metal or plastic center wall 12, as shown in FIG. 9D previously described, or any material suitable to maintain cartridge integrity, with a securing mesh 72 securing the vapor-permeable containers 120 to the center wall 12. In another embodiment, as shown in FIG. 12A, there is no dividing wall, and instead there are just two vapor-permeable containers 120, each wrapped in mesh to give them rigidity.

Figure 13A:
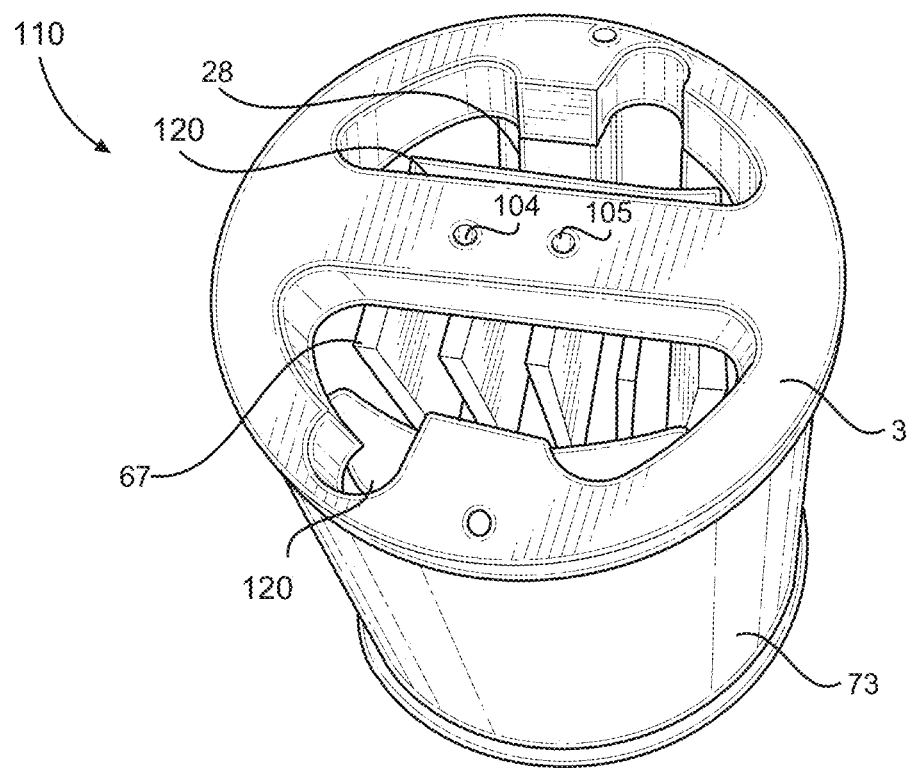
FIG. 13A is a schematic representation showing details of an end cap of an illustrative cartridge.
Figure 13B:
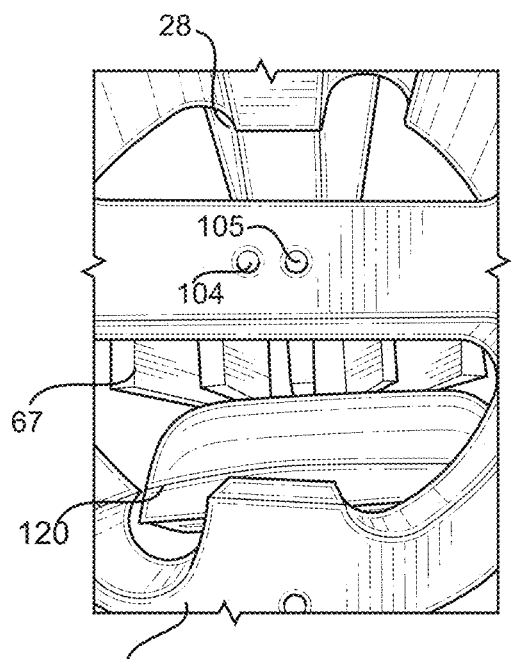
FIG. 13B is a schematic representation showing details of an end cap of another illustrative cartridge.
Figure 13C:
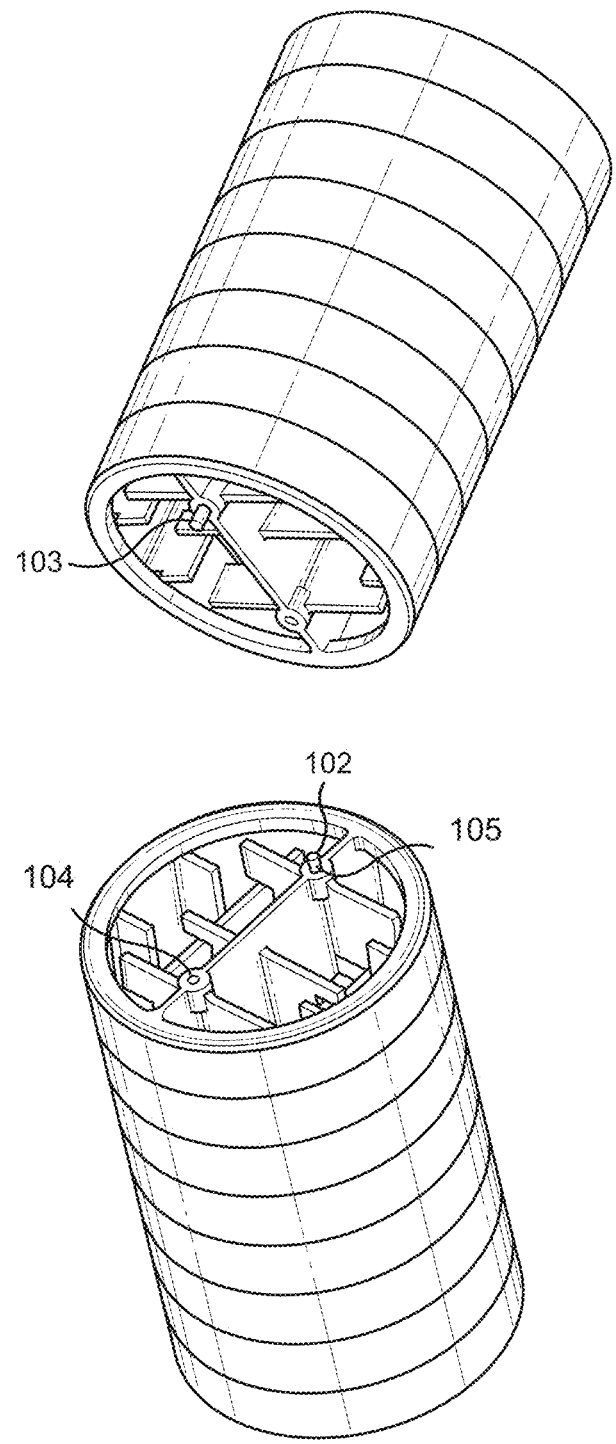
FIG. 13C is a schematic representation showing details of alignment pins and holes of another illustrative cartridge.

In illustrative embodiments, to connect the cartridges 110 to one another, end to end, a clamp can be used, with gaskets on top of the ends of the housings. In illustrative embodiments, as illustrated in FIGS. 13A-13C, stacking pins 102, 103 can fit through stacking holes 104, 105 of one cartridge, and through stacking holes 104, 105 of the next cartridge. Once the cartridges 110 are stacked to the desired length, stacking pins 102, 103 on each end of the stacked cartridges are withdrawn to provide a smooth sealing surface on the assembly ends. Alternatively, stacking pins may not be needed.

In illustrative embodiments, the piping system being treated to prevent corrosion will need only one cartridge at a time, with the cartridge lasting weeks or months, or up to 1-2 years or more. In other situations the system being protected can be quite large and may need more than one cartridge at a time. In such a system, the cartridges 110 can be stacked.

In illustrative embodiments, the cartridge 110 can use one or multiple vapor-permeable containers 120. In another embodiment, multiple vapor-permeable containers 120 can reside on each side of the cartridge 110 with the vapor-permeable containers 120 in alignment on either side.

In illustrative embodiments, once the vapor-permeable containers 120 are determined to be used up, or are used for a known period of time, the entire cartridge 110 can be returned to the manufacturer for the multiple vapor-permeable containers 120 to be replaced, or the vapor-permeable containers 120 may be replaced by the user, or the cartridge 110 with vapor-permeable containers 120 may be disposed of following all local guidelines and laws.

Figure 14A:
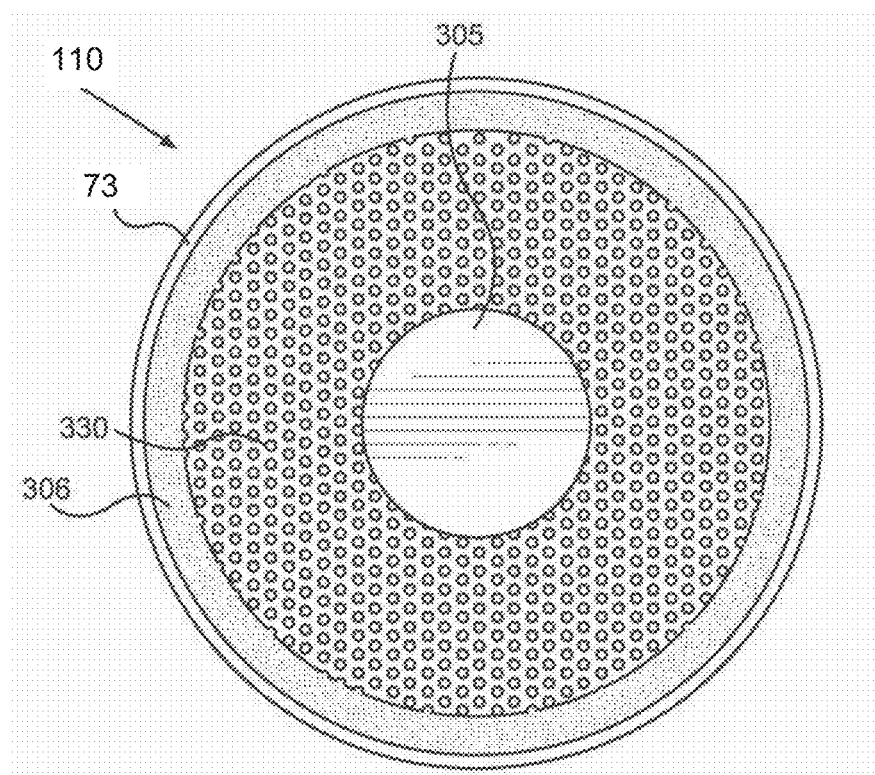
FIGS. 14A and 14B are schematic representations of webbing at the end of a cartridge.
Figure 14B:
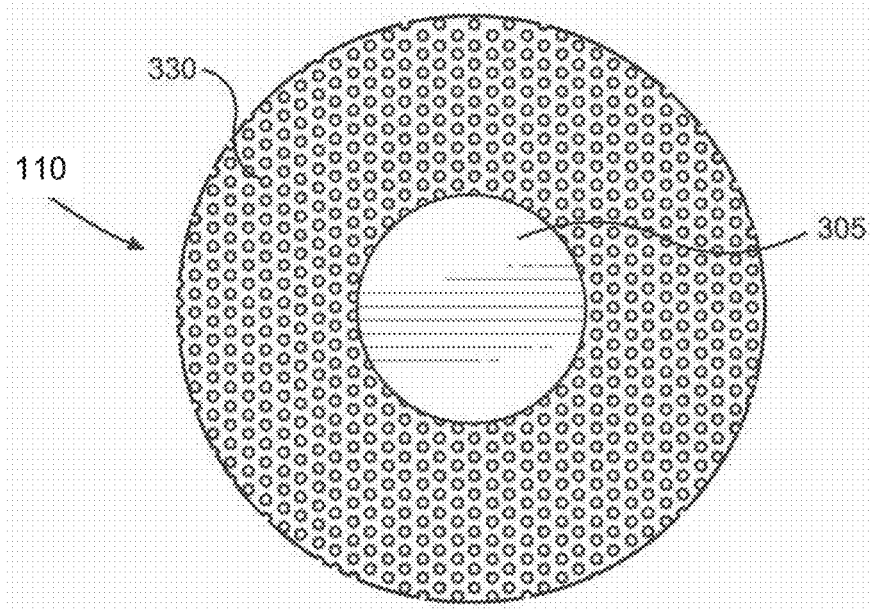
Figure 15:
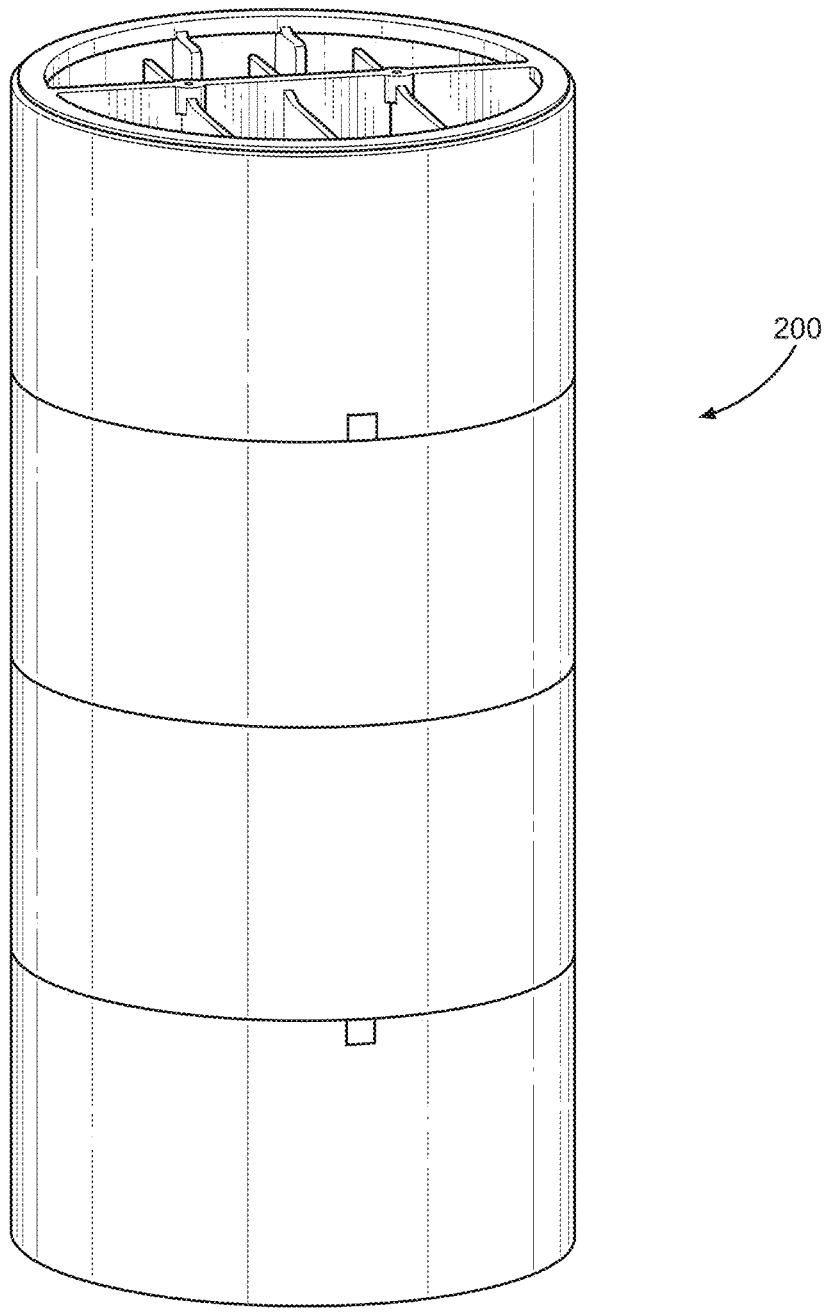
FIG. 15 is a schematic representation of a perspective view of another embodiment of the cartridge.
Figure 16:
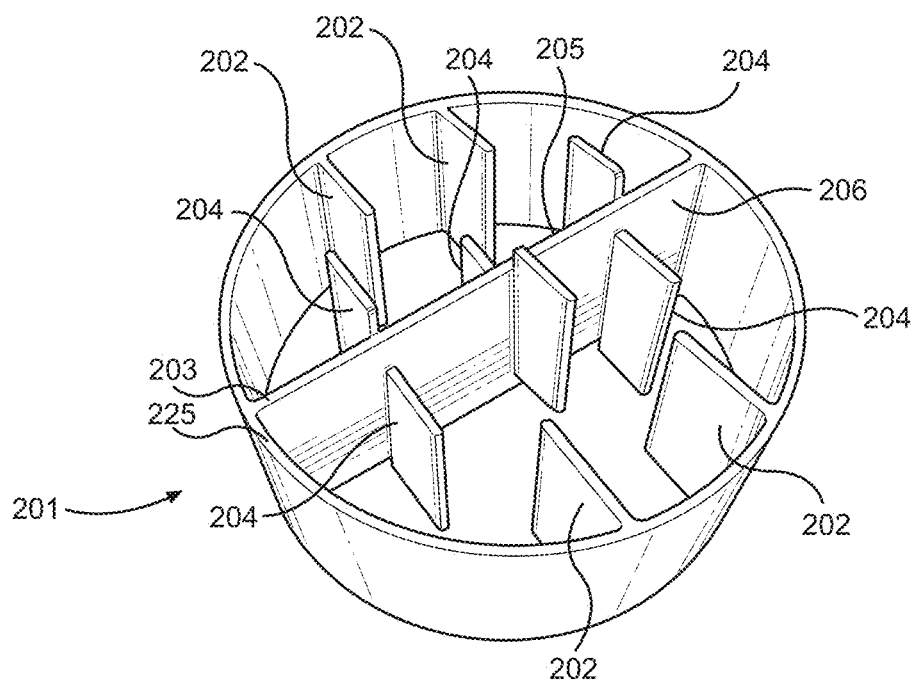
FIG. 16 is a schematic representation of a middle section of the cartridge of FIG. 15.
Figure 17:
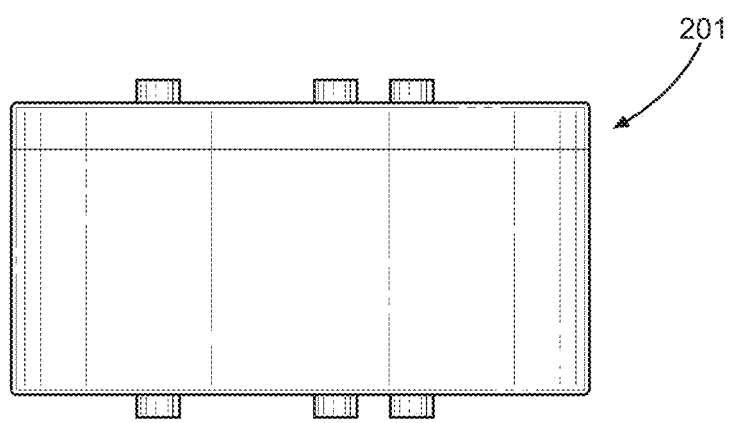
FIG. 17 is a schematic representation of a side perspective view of the middle section of the cartridge of FIG. 15.
Figure 18:
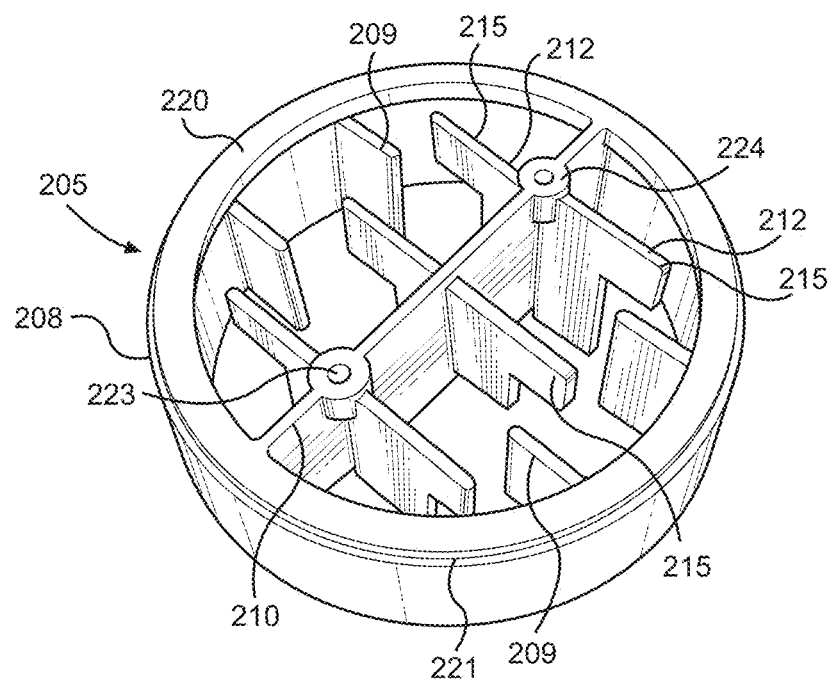
FIG. 18 is a schematic representation of an overhead perspective view of the end sections of the cartridge of FIG. 15.
Figure 19:
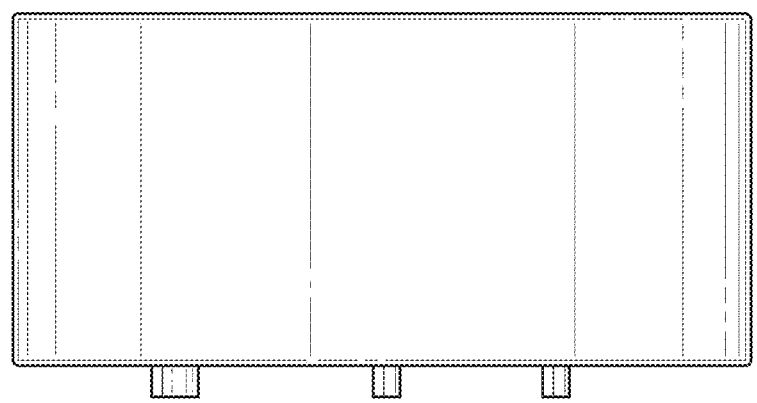
FIG. 19 is a schematic representation of a side view of the outside of the end section end the cartridge of FIG. 15.
Figure 20:
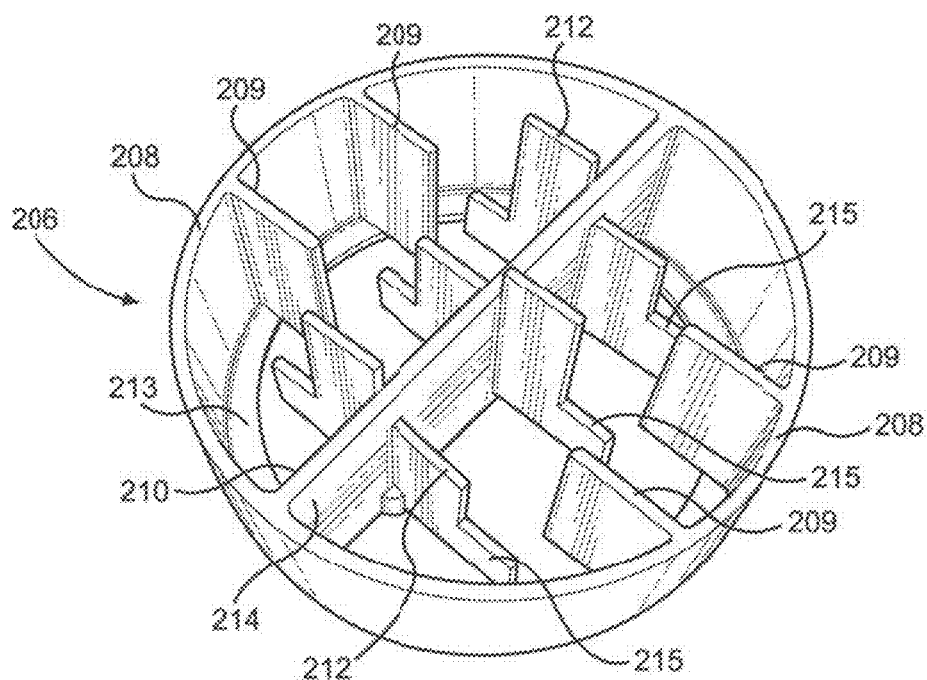
FIG. 20 is a schematic representation of an overhead view of the underside of the end section of the cartridge of FIG. 15.
Figure 21:
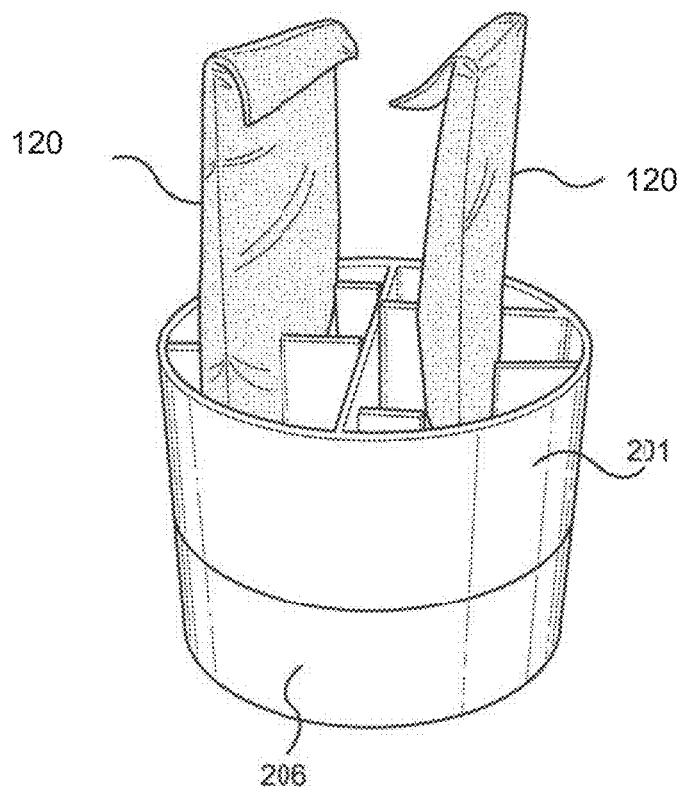
FIG. 21 is a schematic representation of a perspective view of a partial assembly of the cartridge of FIG. 15.
Figure 22:
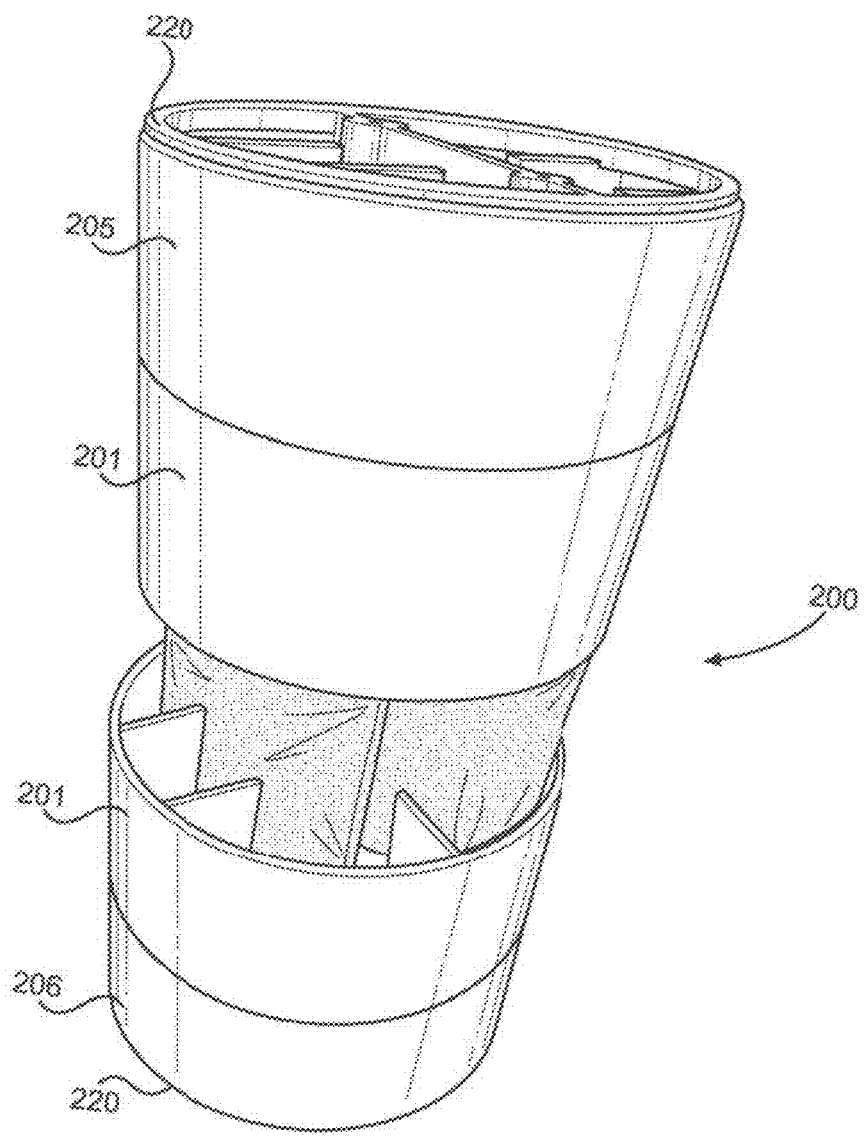
FIG. 22 is a schematic representation of a perspective view of assembly of the entire cartridge of FIG. 15 before attachment of the sections.
Figure 23:
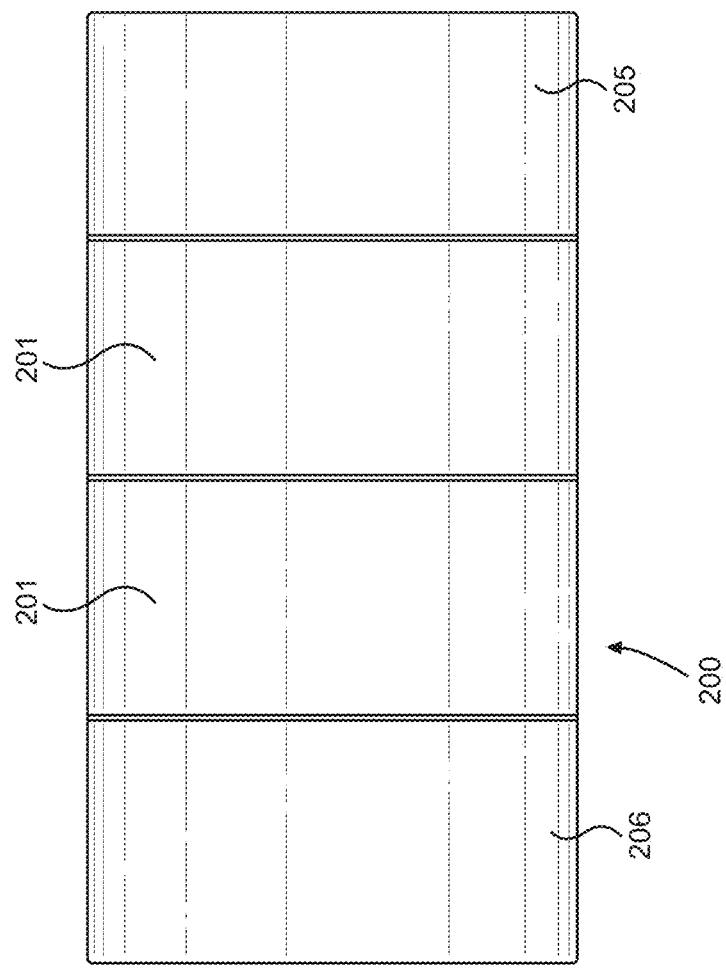
FIG. 23 is a schematic representation of a side view of the assembly of the cartridge of FIG. 15.
Figure 24:
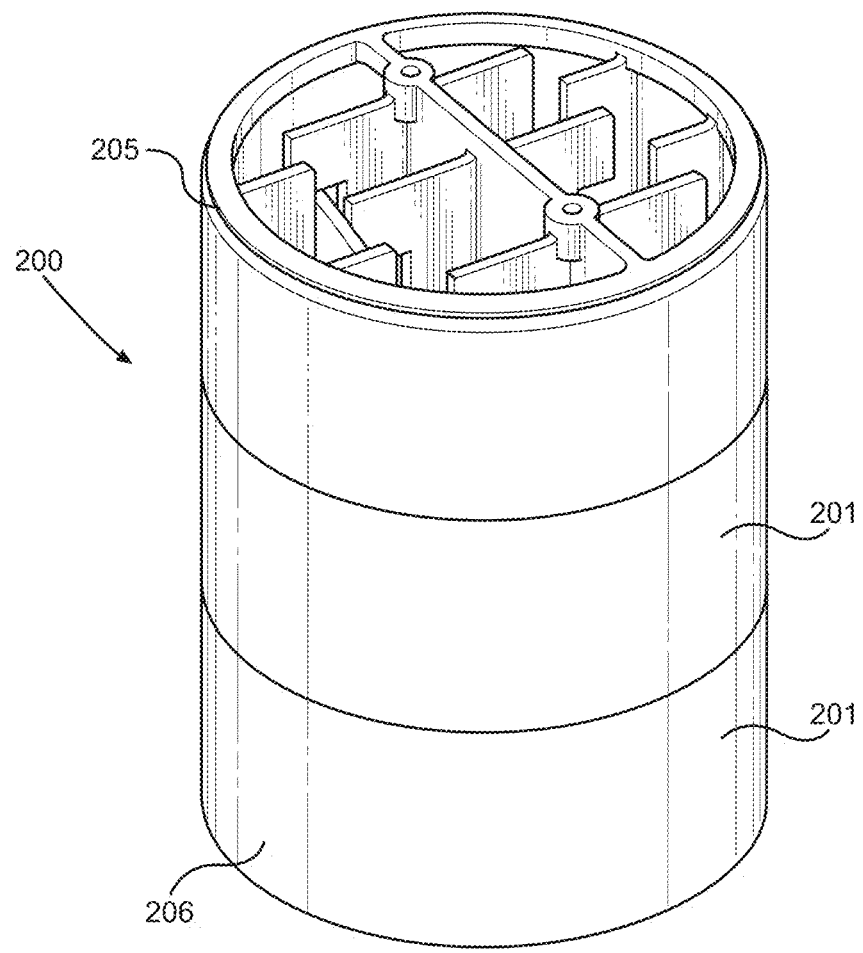
FIG. 24 is a schematic representation of a perspective view showing the fully assembled cartridge of FIG. 15.
Figure 25:
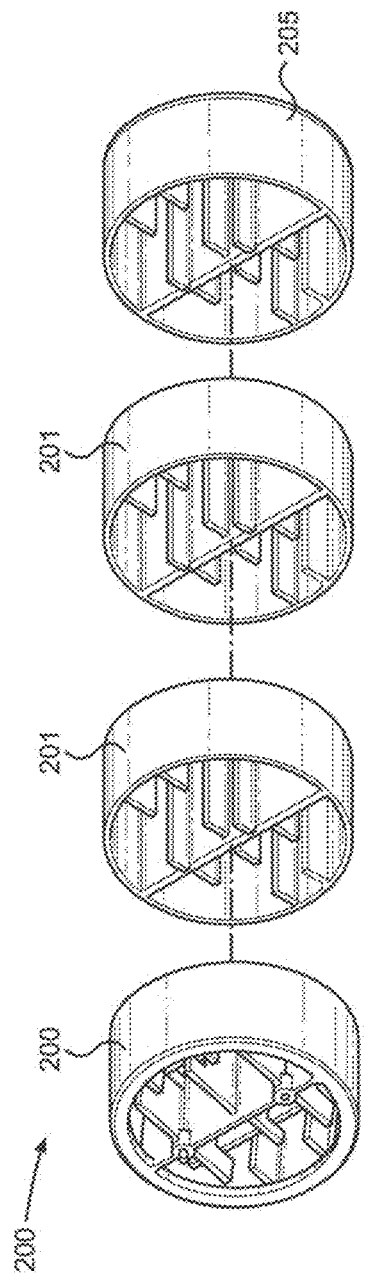
FIG. 25 is a schematic representation of an exploded view of the cartridge of FIG. 15.
Figure 26:
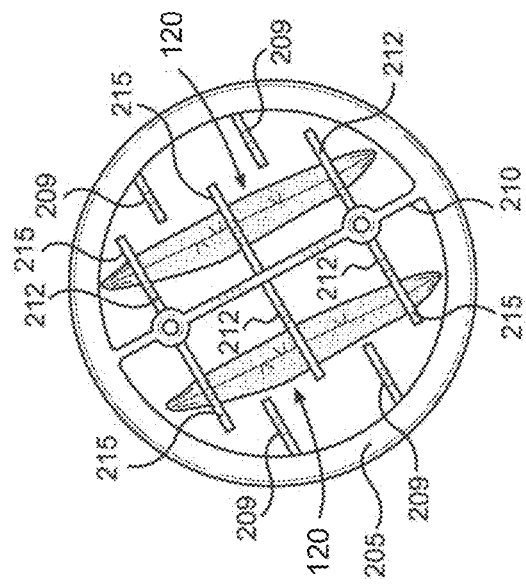
FIG. 26 is a schematic representation of an overhead view of the assembled cartridge of FIG. 15.
Figure 27:
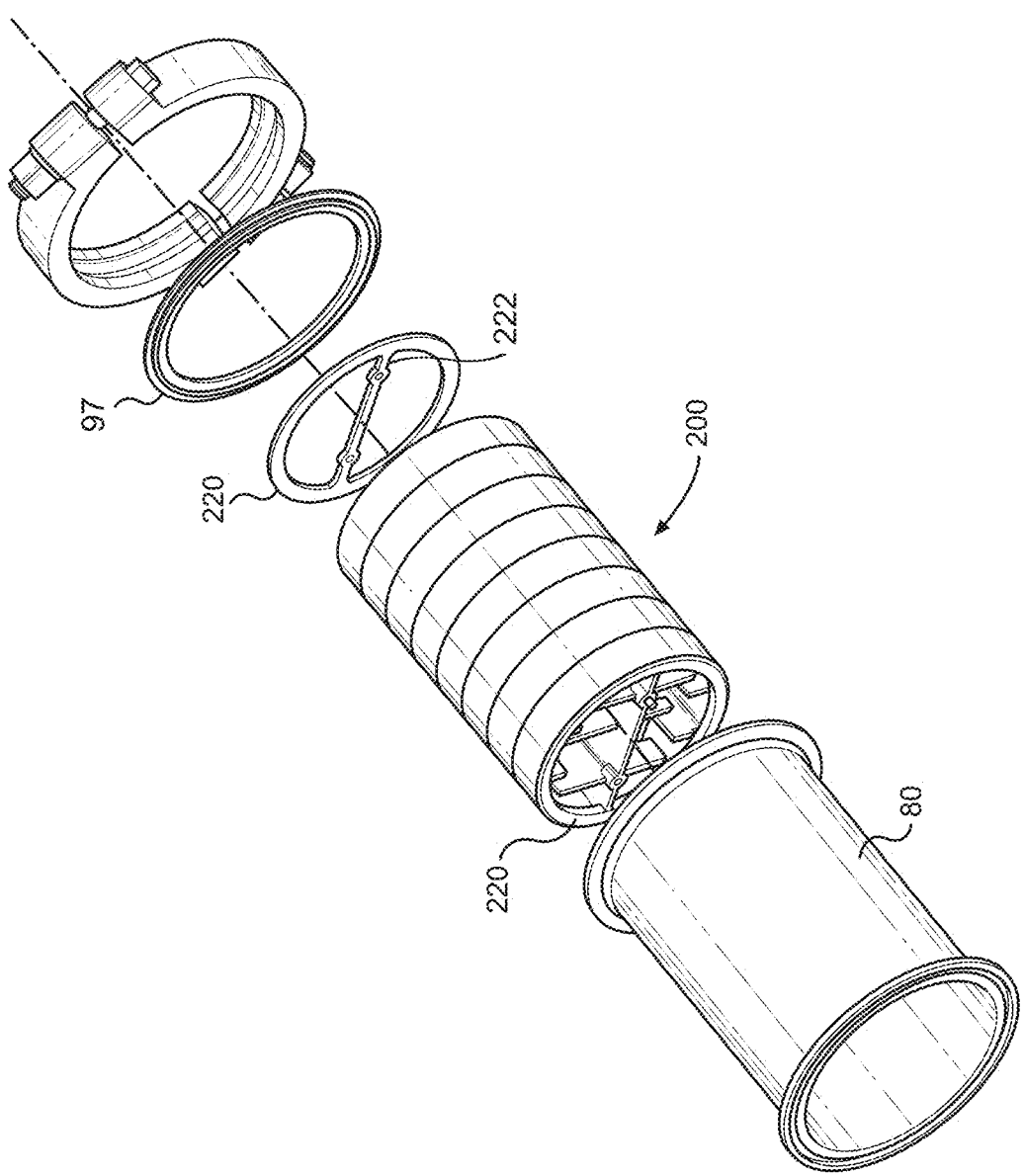
FIG. 27 is a schematic representation of an exploded view of the module section of the housing with the cartridge of FIG. 15 inserted.
Figure 28:
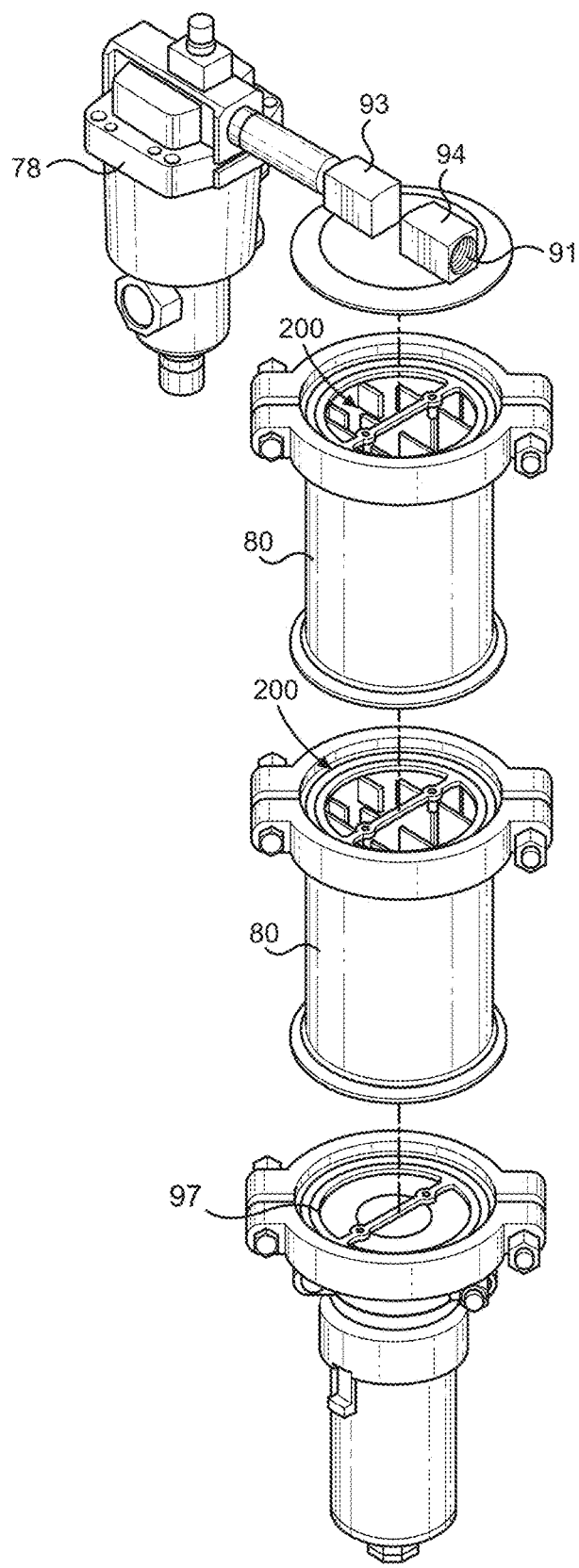
FIG. 28 is a schematic representation of an exploded view of the stacking of the housings of FIG. 15 in a housing assembly.

In illustrative embodiments, the cartridges 110 are disposable by conventional means or sent to the manufacturer for replacement or reloading. In an illustrative embodiment, as shown in FIGS. 14A and 14B, there is a mesh end comprised of a diffuser or binding disc 330 positioned and attached at both ends of the cartridge 110. The center area of the mesh end has a block 305 to redirect airflow to where it is desired. Caulk or epoxy 306 can attach the mesh end to the outer wall 73 of the disposable cartridge. The outer wall 73 itself may be a plastic, poly(methyl methacrylate) (PMMA), a metal wrap or a wire mesh. In illustrative embodiments, the mesh can be metal, plastic, ceramic or any other material.

In other illustrative embodiments, as shown for example in FIGS. 15-28, a cartridge 200 is comprised of sections. The middle section 201 has a plurality of fins or baffles 202 extending inward from the circular wall 201 (as the other cartridges usually do), There is also a plurality of baffles 204 extending from both sides 205, 206 of a center wall 203, which is the length of the diameter of the opening of the cartridge 200. In one embodiment, the baffles extending from the center wall 203 are positioned at different heights, such that a baffle may be positioned higher than the top of the center wall but consequently does not extend all the way down to the bottom of the center wall. There are also baffles positioned such that they extend below (or beyond) the bottom of the center wall 203. The tops of these baffles do not extend all the way to the top of the center wall, with the space being equal to that extending below the bottom of the center wall 203. There is a space between the baffles 204 and 202 into which the multiple vapor-permeable container 120 can fit. In one embodiment, there is one middle section 201.

In another embodiment, there are two middle sections 201, for easier manufacturing. For larger multiple vapor-permeable containers 120, there may be taller or shorter middle sections 201, or there may be two or more middle sections 201.

In illustrative embodiments, a sectional cartridge 200 also has a top section and a bottom section 240, 241. In one embodiment, each of the end caps has baffles 209 extending inwardly from the circular wall 208. A center wall 210 has a plurality of baffles 212 extending from both sides 213, 214 of the central wall 210. As in the middle section 201, the center wall 210 runs the length of the diameter of the opening of the cartridge 200. A plurality of arms 215 extend from the plurality of baffles 212. As such, the arms 215 hold the multiple vapor-permeable containers 120 in place, so they do not slide around when air passes through the cartridge. As above, there is a space positioned between the baffles 212 of the central wall 210 and the baffles 209. Additionally, the height of the baffles complements the height of the baffles 204 of the middle section such that they can fit on top of one another, allowing for placement and alignment of the sections. In another embodiment, the top section and the bottom section are identical.

In illustrative embodiments, the bottom cap 206 and the first middle section 201 are first assembled. Once the middle section 201 is positioned onto the bottom cap 206, the multiple vapor-permeable containers 120 can be inserted into the spaces described above. Next, any number of additional middle sections can be added, depending on the size of the vapor-permeable containers 120 to be used. At the end of the cartridge 200, the top cap 205 is the added.

In illustrative embodiments, the cartridge 200, or multiple such stacked cartridges 200, once assembled, can fit into a housing 80. For example, the cartridge 200 fits into the open top of the housing 80. A clamp 92 connects the top housing lid 91 to the body 84 of the housing 80.

In illustrative embodiments, on top of the top cap 205 and on the bottom of the bottom cap 206 is a sealing gasket 220. The sealing gasket 220 fits on top of the top cap and on top of the bottom cap, and has a centered diameter 222 which corresponds to the center wall 210. In another embodiment, there are two holes 223, 224 in the sealing gasket 220 to allow for alignment or stacking pins when the cartridges are stacked. In another embodiment, there is a regular gasket 97 to seal the housing 80 and the top housing lid 91.

The Vapor-Permeable Container

In illustrative embodiments, as noted above, the corrosion risk reduction module 100 comprises at least one vapor-permeable container 120 containing a corrosion inhibitor located inside the cartridge 110.

Figure 29:
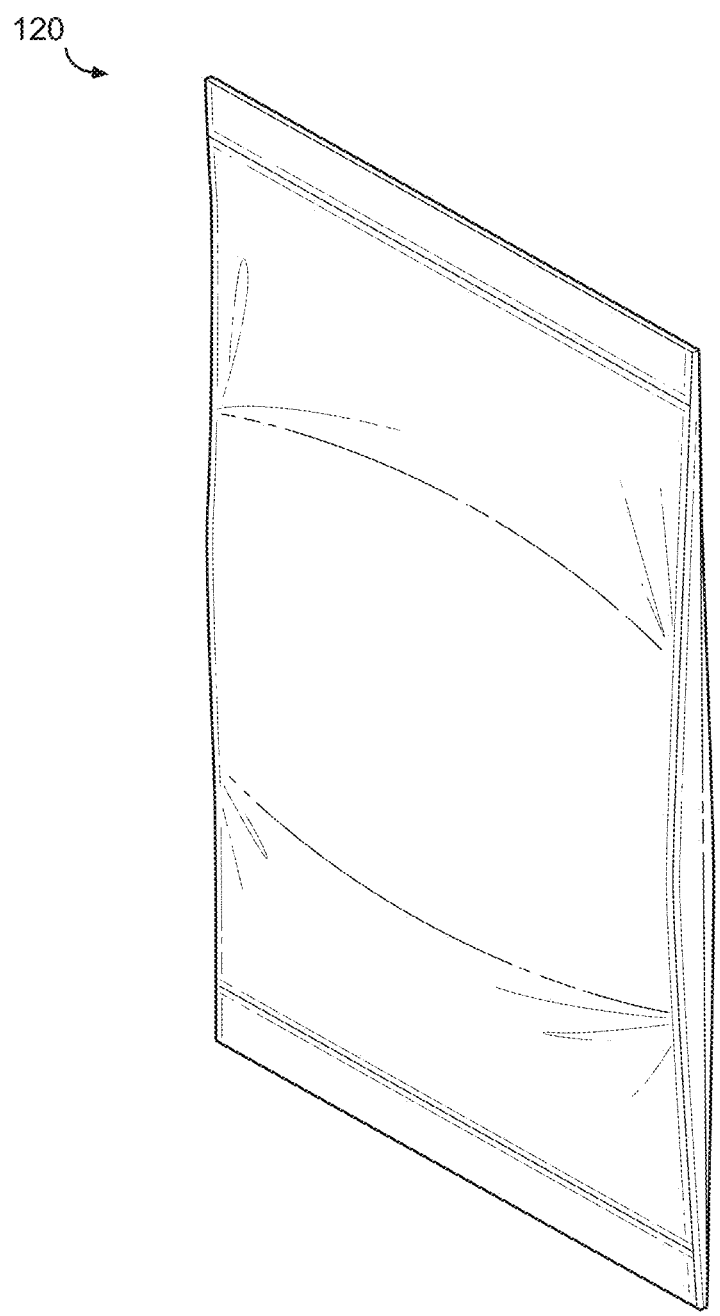
FIG. 29 is a schematic representation of a perspective view of an illustrative embodiment of a vapor-permeable container.

FIG. 29 shows an illustrative embodiment of a vapor-permeable container 120. In illustrative embodiments, a vapor-permeable container 120 can include a sachet or pouch containing a corrosion inhibitor having the ability to protect against corrosion. The corrosion inhibitor can comprise inorganic nitrite salts, organic nitrite salts, anhydrous sodium molybdate, an anhydrous ammonia dimolybdate, or anhydrous amine molybdates, amine benzoate, amine nitrate, benzotriazole, cyclohexylamine benzoate, ethylamine benzoate, dicyclohexylamine nitrate, tolytriazole and salts thereof, or $C_{13}H_{26}O_2N$, and any combination thereof. A more specific combination of substances includes ammonium benzoate and an inorganic salt. Other possible additives or substances that may be used include but are not limited to aerogel, activated alumina, benzophenone, clay, calcium chloride, lithium bromide, lithium chloride, magnesium perchlorate, molecular sieve, or silica gel, or any combination thereof; wherein said corrosion inhibitor comprises a triazole or a derivative thereof, benzoate or a derivative therein, a salt of benzoic acid, carbamate, alkali metal molybdate, dimolybdate, an amine molybdate or a salt thereof, an organic nitrite, an alkali metal nitrite, or alkali dibasic acid salt, or any combination thereof; and wherein said soluble vapor phase corrosion inhibitor comprises an organic nitrite, borate, organic aminophosphite, phosphate, polyphosphate, silicate, potassium hydroxide, sodium hydroxide, an amine base compound, a sulfonate, zinc sulfate, or calcium bicarbonate, or any combination thereof. See U.S. Pat. No. 9,656,201, issued May 23, 2017; U.S. Pat. No. 9,556,635 issued May 23, 2017; U.S. Pat. No. 9,303,382 issued Apr. 5, 2016, and U.S. Pat. No. 8,377,531, issued Feb. 19, 2016, all incorporated herein by reference for their disclosure of volatile corrosion inhibitors. Other sublimating compounds and compound mixtures include but are not limited to morpholine, benzylamine, cyclohexylammonium carbonate, diisopropylammonium nitrite, morpholine nitrite, dicyclohexylammonium nitrite, dicyclohexylammonium caprylate, guanidine chromate, hexamethyleneimine benzoate, hexamethyleneimine nitrobenzoate, dicyclohexylammonium benzoate and combinations thereof in varying amounts (See U.S. Pat. No. 9,435,037, issued Sep. 6, 2016, herein incorporated by reference for its disclosure of volatile corrosion inhibitors). In illustrative embodiments, other compounds such as hydrogen fluoride and/or a pH detection compound can be added to the corrosion inhibitor.

In illustrative embodiments, the vapor-permeable container 120 can be a flexible fine mesh screen-like container or a perforated rigid material such as a plastic or metal that contains the corrosion inhibitor. The vapor-permeable container 120 can be any number of materials that are vapor permeable.

In illustrative embodiments, the corrosion inhibitor may alternatively exist by itself in the form of a solid mass, or a porous mass, or as a powder, where air can pick up inhibitor by stagnant contact, flowing around it, or flowing through it.

The Discharge Gas Vent

Figure 30:
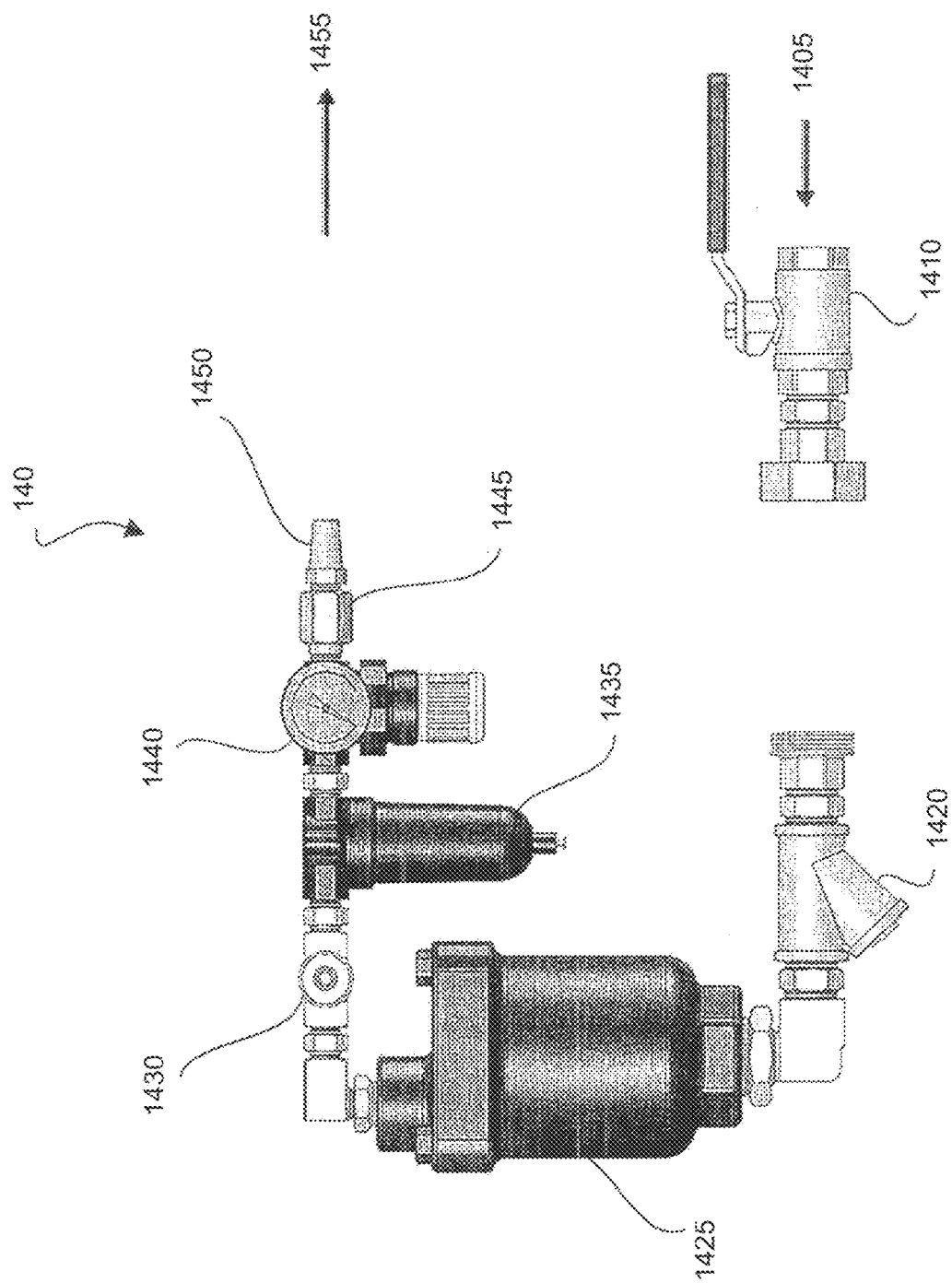
FIG. 30 is a schematic representation of an illustrative discharge gas vent.
Figure 32B:
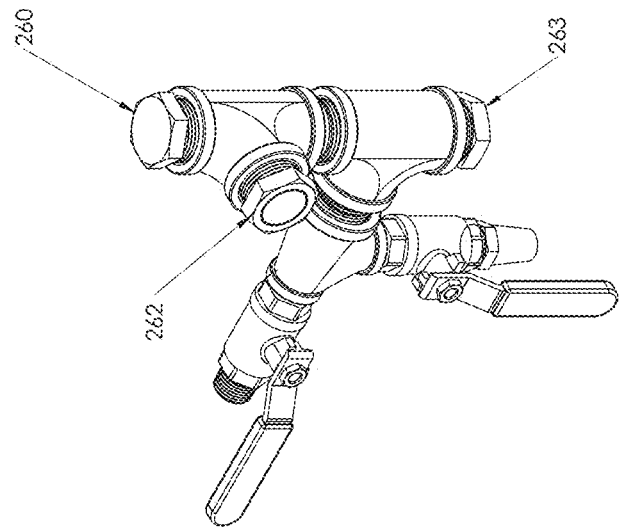
FIG. 32B is a schematic representation of a perspective view of an illustrative second embodiment of a detection device.
Figure 32A:
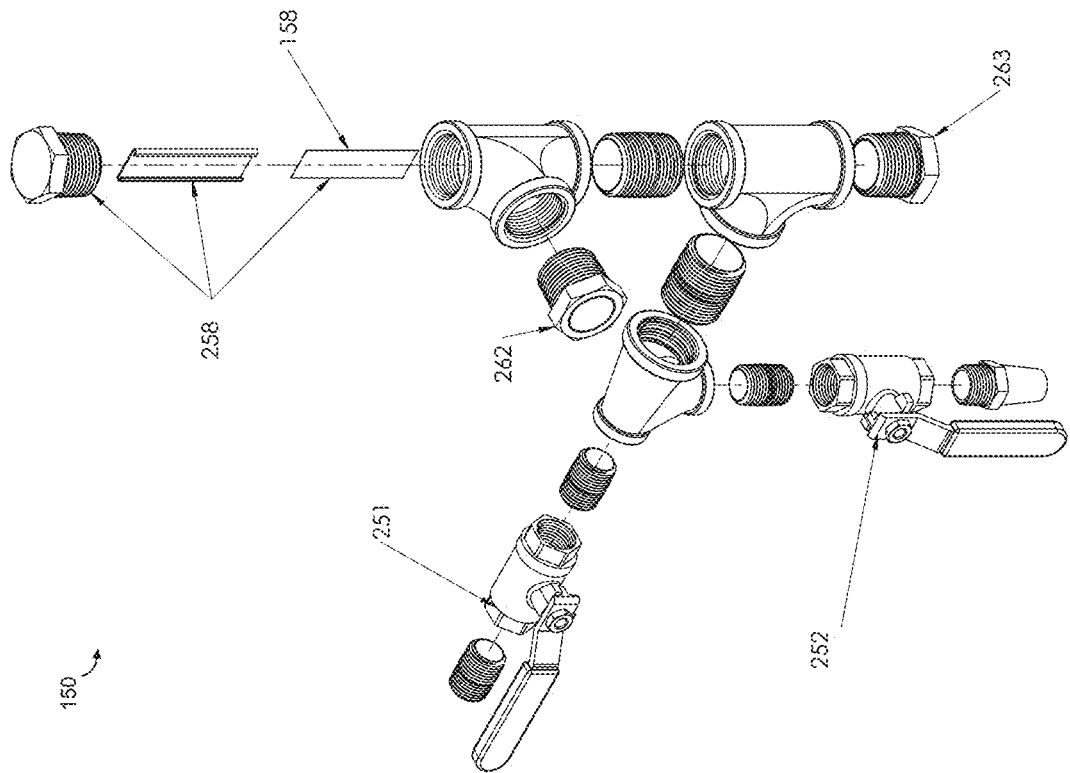
FIG. 32A is a schematic representation of an exploded view of an illustrative second embodiment of a detection device.
Figure 32D:
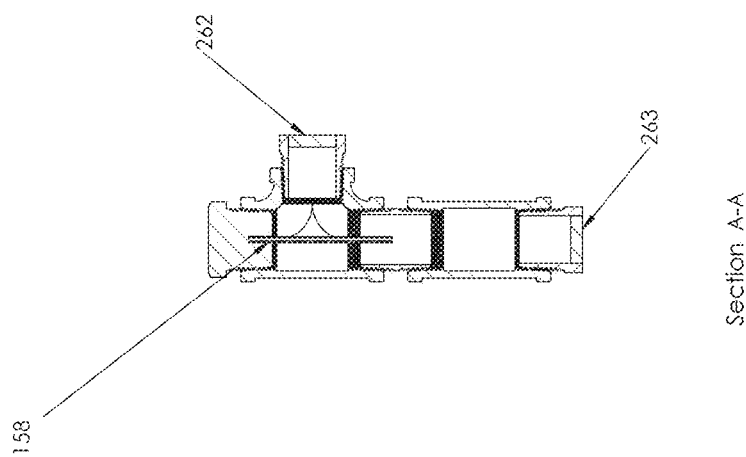
FIG. 32D is a schematic representation of a cross-sectional view of an illustrative second embodiment of a detection device.
Figure 32C:
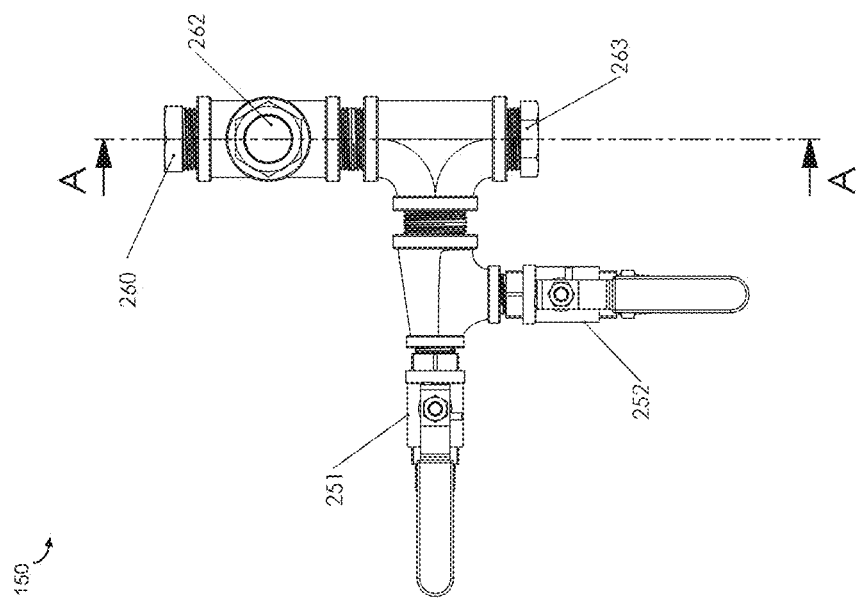
FIG. 32C is a schematic representation of a side view of an illustrative second embodiment of a detection device.

In illustrative embodiments, a corrosion risk reduction system includes a discharge gas vent 140, shown for example in FIG. 30, and described in U.S. Pat. No. 10,420,970, issued on Sep. 24, 2019, incorporated herein for reference for its description of a "discharge gas vent 100."

In an illustrative embodiment, a ball valve 1410 provides isolation of the controlled discharge gas vent 140 from a sprinkler system piping, which is pressurized and provides the gas flow 1405. A Y-strainer type filter 1420 protects a metallic orifice 1445 at the discharge of a levered float valve 1425 from plugging with pipe debris. The levered float valve 1425 or equivalent electric liquid sensing control unit allows gas discharge from the piping system but not liquid discharge; water can be prevented from flowing out of the vent 1400 location if the float activates when liquid enters the valve 1425 by sealing the discharge orifice. A gas sampling port 1430 allows for gas analysis using a manual or automatic gas sampling device. An in-line filter 1435 protects the end-of-line metallic orifice 1445 from plugging with debris. An adjustable back pressure regulator 1440 with a gauge can prevent complete depressurization of the fire sprinkler system piping by automatically closing the vent if the system pressure falls below a preset minimum pressure on the regulator 1440. The preset minimum pressure can be set at a pressure above the trip pressure of the pipe valve by setting a minimum closing pressure that is above the trip pressure of the pipe valve. The end of line metallic orifice 1445 provides for the controlled release of gas from the pressurized piping system. An end of line muffler 1450 may be used to deaden the sound of the gas exhaust 1455.

The Detection Device

In illustrative embodiments, a corrosion risk reduction system includes a detection device 150 configured to detect the presence of corrosion inhibitor. In exemplary embodiments, chemical sensitive to corrosion inhibitor is disposed on a stem inside a housing. In use, a detection device 150 can removably connect to the end of a discharge gas vent 140. The chemical changes color when corrosion inhibitor is present, e.g., from blue to red, where red may indicate saturation. Upon such an indication of saturation, a user may be alerted that a valve from the corrosion risk reduction module 100 may be turned off. Optionally, a photo-detector may detect such color change and automatically turn off the valve.

FIGS. 31A-31C show a first illustrative embodiment of a detection device 150, including a pipe coupling 152 for coupling to a piping system, a fluid conduit 154 and a housing 156, the fluid conduit 154 providing air flow from the pipe coupling 152 to the housing 156. The housing 156 includes an indicator element 158 bonded to a perforated disk 159. In illustrative embodiments, the indicator element 158 includes, but is not limited to, an indicator strip, a pH probe, a refractometer. The indicator element 158 is configured to provide an indication of the presence of corrosion inhibitor upon contact therewith. For example, the indication could be visual, auditory and/or tactile. For example, the indicator element 158 could be a litmus strip 158 which contains chemical sensitive to corrosion inhibitor, and is configured to be pH-specific and indicate acidity or alkalinity, and thus to change color when inhibitor is detected. The indicator element 158 is located behind a filter housing portion 157 of the housing 156. The filter housing portion 157 can include a transparent material to facilitate visibility of an indicator change when corrosion inhibitor is present.

In the following descriptions of alternative illustrative embodiments of detection devices, it is to be understood that the indicator element 158 can be an indicator element which changes color upon contact with corrosion inhibitor, or any indicator element known in the art.

FIGS. 32A-32D show a second illustrative embodiment of a detection device 150, including an inlet valve 251 configured to connect to a source of pressurized air including corrosion inhibitor (e.g., a compressor/corrosion risk reduction module combination), a pressure release valve 252 configured for releasing pressure to the outside, and an indicator module 258 including an indicator element 158 which slides onto a carrier and is bonded to a plug 260. The plug 260 can be unscrewed from the housing to pull out and replace a used indicator element 158. A lateral sight glass 262 on the housing can be used to provide a line of sight from an outside of the housing to the indicator element 158 to enable a user to observe visual changes (e.g., but not limited to color changes) on an indicator element 158. A bottom sight glass 263 can allow a user to shine light into the housing for additional visibility. In use, the system is first pressurized using the inlet valve 251. A change in the indicator element 158 is then observed through the lateral sight glass 262. Optionally, a light is shone into the housing through the bottom sight glass 263 for additional visibility. If such a change is observed, the indicator element 158 is accessed by unscrewing the plug 260 and then changed. The system is then depressurized using the pressure release valve 252.

FIGS. 33A-33D show a third illustrative embodiment of a detection device 150, including a pipe coupling 351, a valve 352, a replaceable indicator cartridge 360, an adapter 353 and a muffler 354.

In illustrative embodiments, the pipe coupling 351 can be a male (or female) industrial-style quick disconnect configured to connect to a female (or male) port on a piping system. The valve 352 is configured to enable/disable flow through the detection device 150. The replaceable indicator cartridge 360 (shown in detail in FIG. 33C) is configured to provide a one-time use indicator test which is disposable via conventional means. The adapter 353 connects the replaceable indicator cartridge 360 to the muffler 354, which is configured to aerate/vaporize excess fluid to the atmosphere.

Figure 33C:
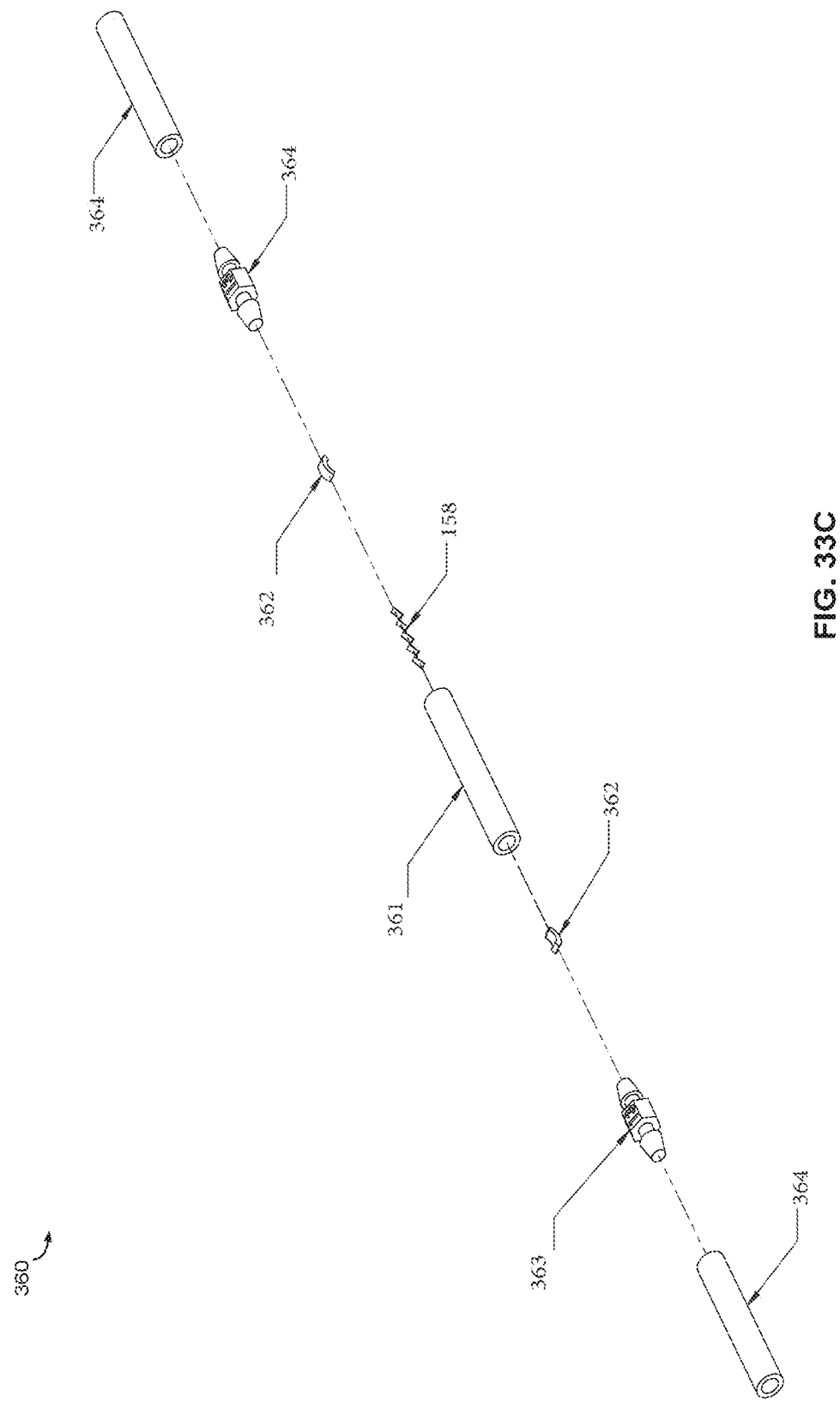
FIG. 33C is a schematic representation of an exploded view of a replaceable indicator cartridge for an illustrative third embodiment of a detection device.

In illustrative embodiments, as shown in FIG. 33C, the replaceable indicator cartridge 360 includes an indicator chamber 361 which houses and allows airflow across an indicator element 158. The indicator element 158 is configured to undergo a visual change to indicate the presence of corrosion inhibitor. The indicator element 158 is insulated from brass orifices 363 on both ends by negative catalysts 362, thereby preventing a false positive reaction. The brass orifices 363 control flow entering or exiting the indicator chamber 361. Connectors 364 are configured to connect to the valve 352 or to the adapter 353 or muffler 354, and connect to the brass orifices 363.

Figure 33D:
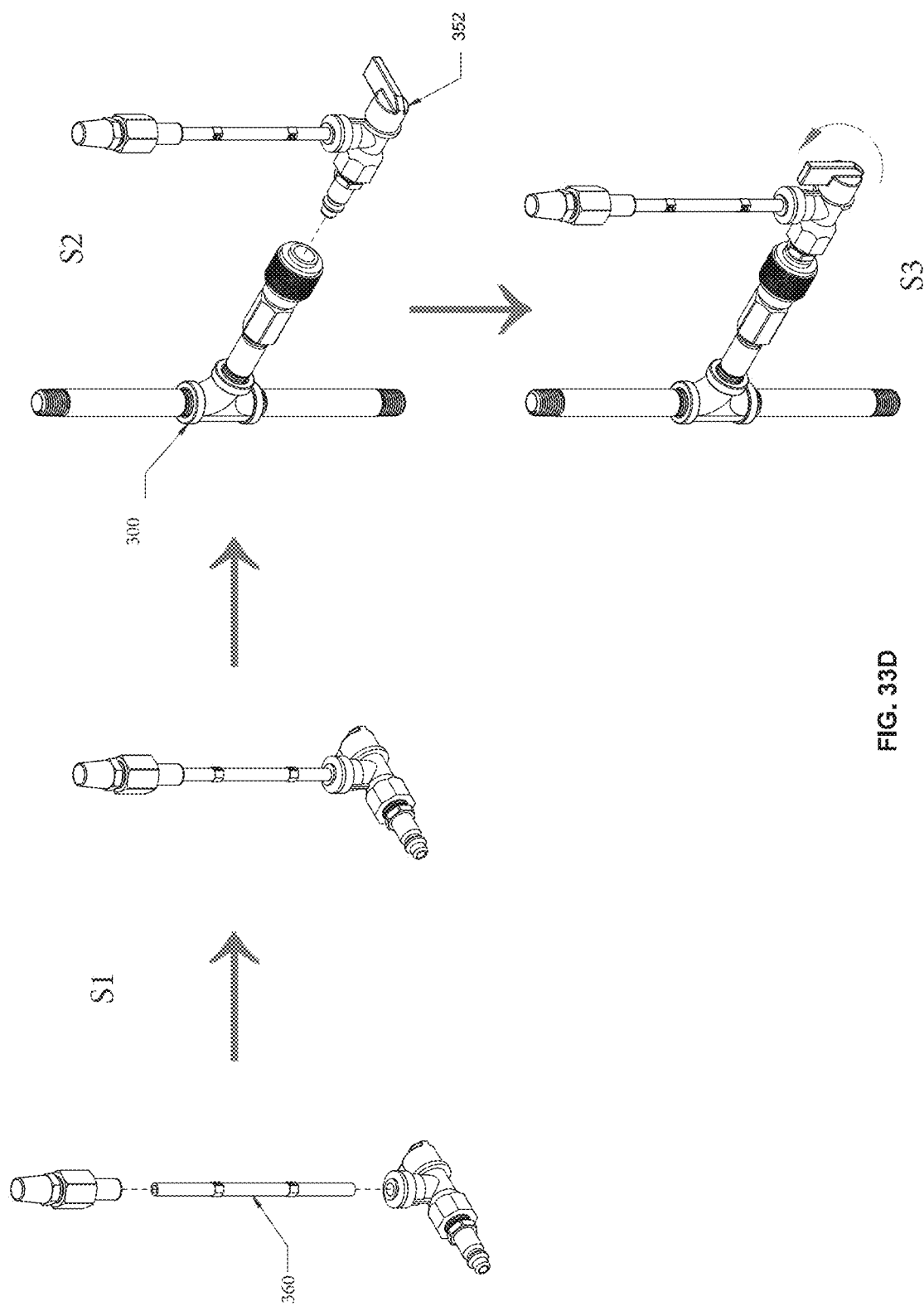
FIG. 33D is a schematic representation of a method of use of an illustrative third embodiment of a detection device.

In illustrative embodiments, in use, and as shown in FIG. 33D, the detection device 150 is first assembled at step S1 and is then connected to a piping system 300 at step S2, for example to any industrial-type quick disconnect downstream from a compressor. The valve 352 is then open at step S3 to allow flow across the indicator element 158. The element 158 is then checked for visual change.

Figure 34A:
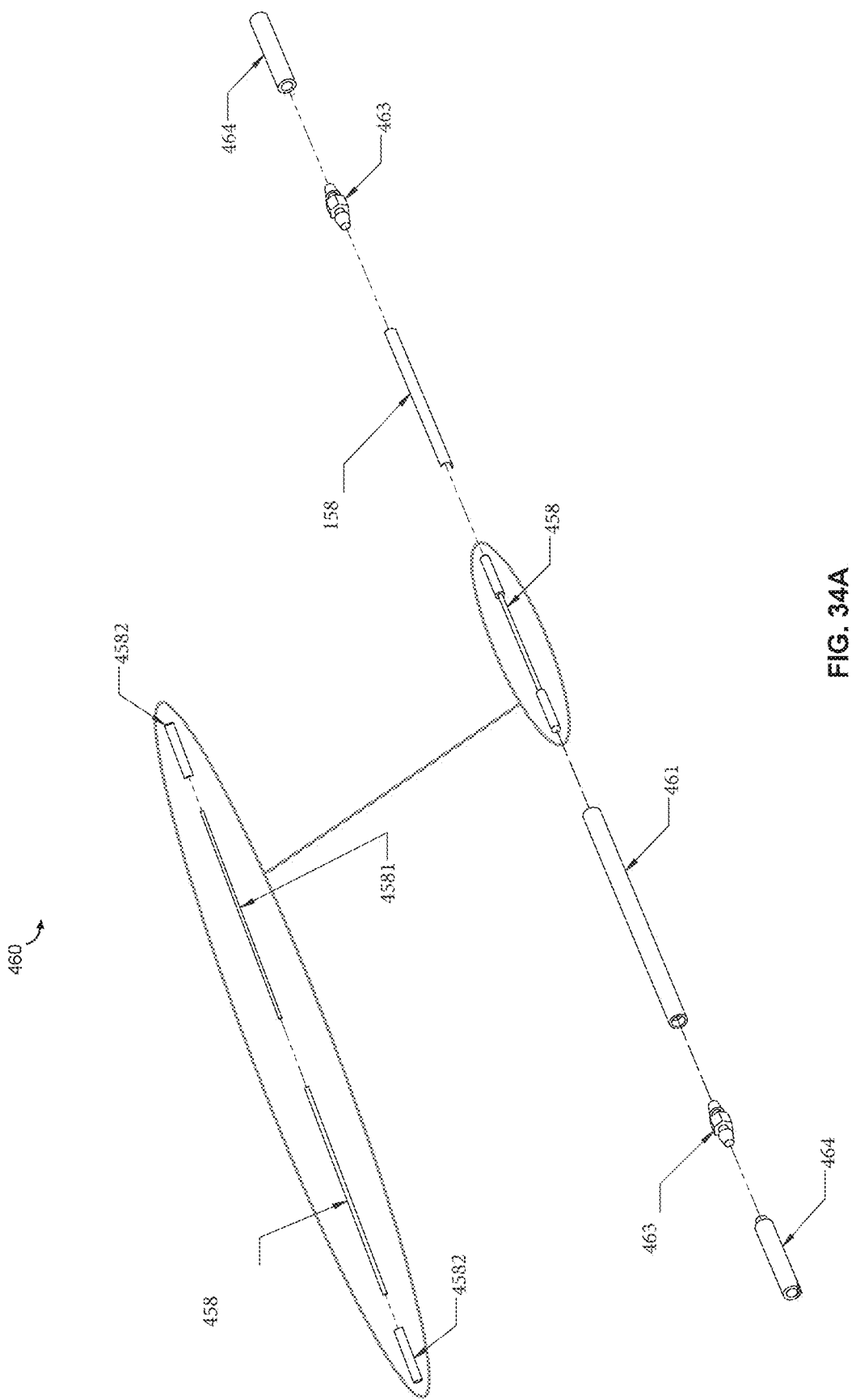
FIG. 34A is a schematic representation of an exploded view of a replaceable indicator cartridge for an illustrative fourth embodiment of a detection device.
Figure 34B:
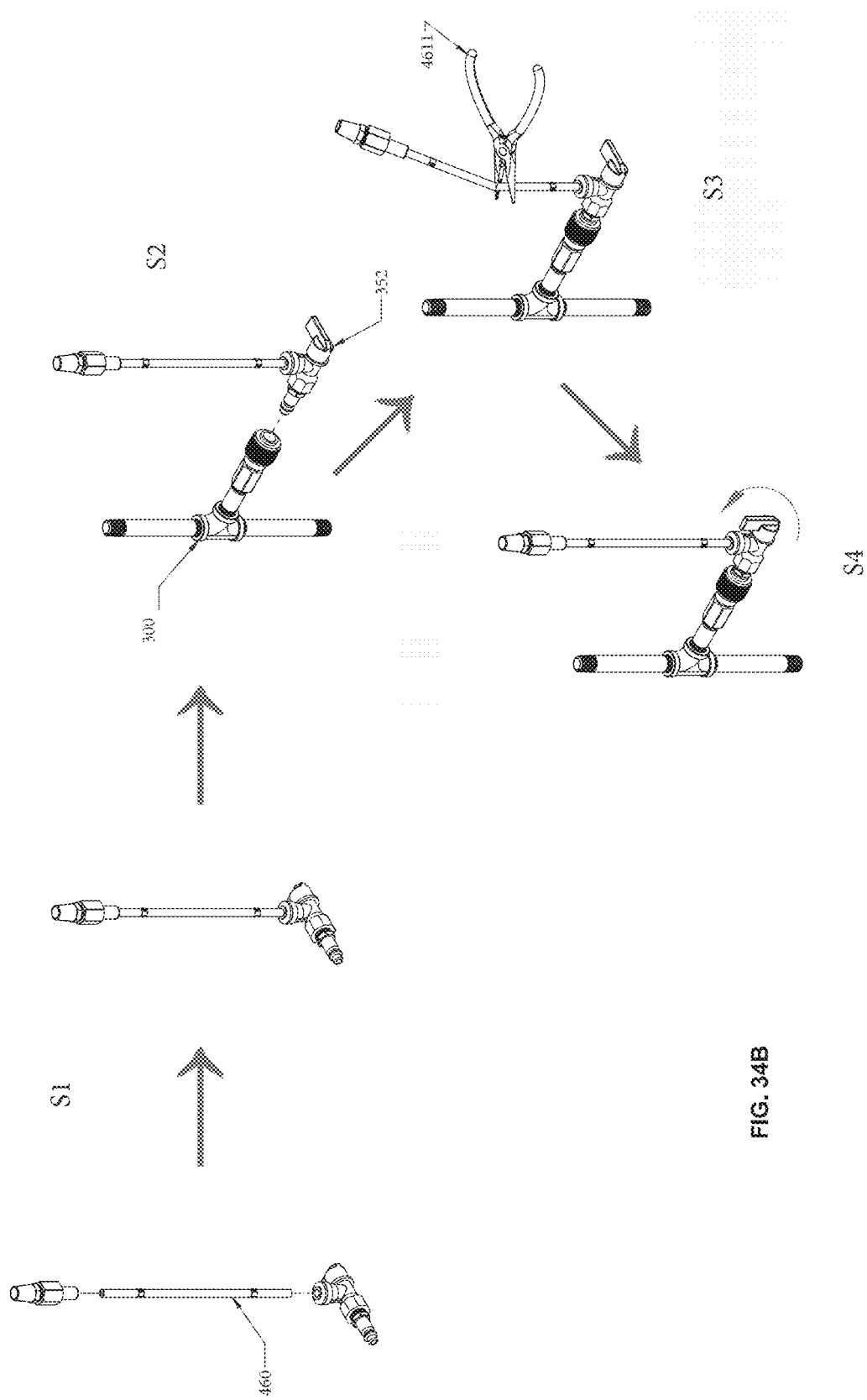
FIG. 34B is a schematic representation of a method of use of an illustrative fourth embodiment of a detection device.

FIGS. 34A-34B show aspects of a fourth illustrative embodiment of a detection device 150, which differs from the third embodiment in that it includes a different replaceable indicator cartridge 460.

In illustrative embodiments, as shown in FIG. 34A, the replaceable indicator cartridge 460 includes an indicator chamber 461 which houses and allows airflow across an indicator element 158. The indicator chamber 461 further includes an indicator capillary 458 holding and keeping indicator fluid 4581 wet. In the case of a litmus strip, the indicator fluid can be litmus fluid. The indicator capillary 458 is sealed by epoxy or cap seals 4582 on both ends to lock in the indicator fluid 4581. When cracked, the indicator capillary 458 releases indicator fluid 4581, which is then deposited onto the indicator element 158. The indicator element 158, once wetted by indicator fluid 4581, is configured to provide a visual indication of the presence of corrosion inhibitor. For example, the indicator element 158 can be a litmus strip which, once wetted by litmus fluid, is configured to change color based on pH values, or some other indicator value, of the air flowing across it to determine the presence of corrosion inhibitor. The indicator element 158, as it is stored in dry condition, does not need to be flanked by negative catalysts preventing false positive reactions. Brass orifices 463 control flow entering or exiting the indicator chamber 461. Connectors 464 are configured to connect to the valve 352 or to the adapter 353 or muffler 354, and connect to the brass orifices 463.

In illustrative embodiments, in use, and as shown in FIG. 34B, the detection device 150 is first assembled at step S1 and is then connected to a piping system 300 at step S2, for example to any industrial-type quick disconnect downstream from a compressor. The indicator chamber 461 is then bent and crushed (e.g., using pliers 4611), at step S3, to crack the indicator capillary 458 and release the indicator fluid 4581 so that it can be collected on the indicator element 158 and so that the indicator element 158 can become sensitive to corrosion inhibitor. For example, the indicator capillary 458 can be broken by bending or crushing a portion of the housing. The valve 352 is then open at step S4 to allow flow across the indicator element 158. The indicator element 158 is then checked for visual change.

The Corrosion Risk Reduction System

Figure 35:
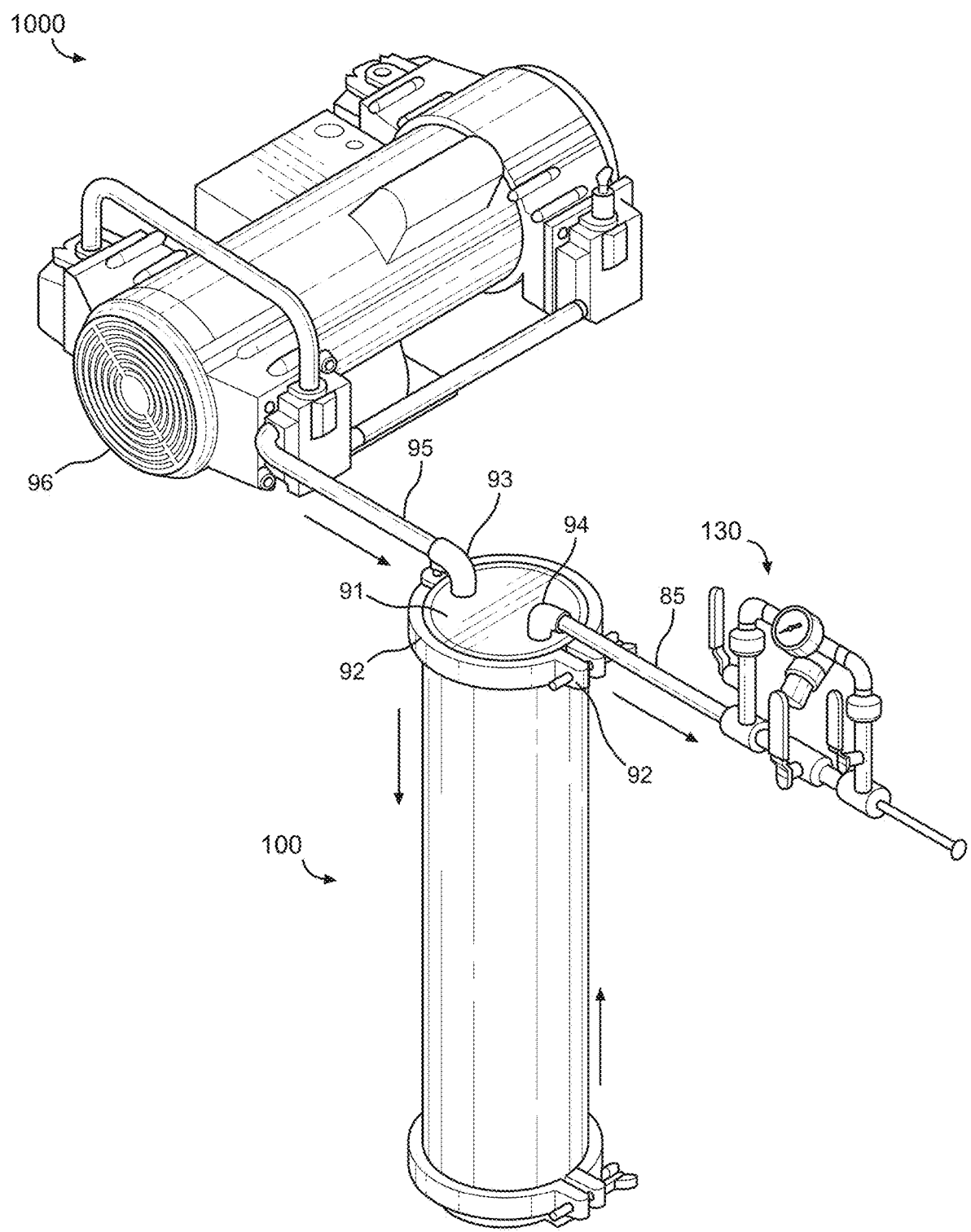
FIG. 35 is a schematic representation of a perspective view of an illustrative corrosion risk reduction system.

FIG. 35 shows an illustrative corrosion risk reduction system 1000 installed in a dry pipe or pre-action sprinkler system, which includes a corrosion risk reduction module 100 configured for fluid communication with a piping network including one or more pipes, and a source of compressed air 96 in fluid communication with the corrosion risk reduction module 100 and positioned downstream of the source of compressed air 96. The source of compressed air 96 can be a compressor or any other suitable source of compressed air, and is configured to provide compressed air to the inlet 93 of the corrosion risk reduction module 100 through an inflow pipe 95, to drive corrosion inhibitor out through the outlet 94 of the corrosion risk reduction module 100, though an output pipe 85, and into the piping network. The corrosion risk reduction system 1000 further includes an air maintenance device 130 connected to the output pipe 85. The air maintenance device 130 can be configured to regulate pressure and compensate for fluctuations in air pressure generated by the source of compressed air. The beginning of a piping network is shown as a pipe end downstream of the air maintenance device 130.

Figure 36:
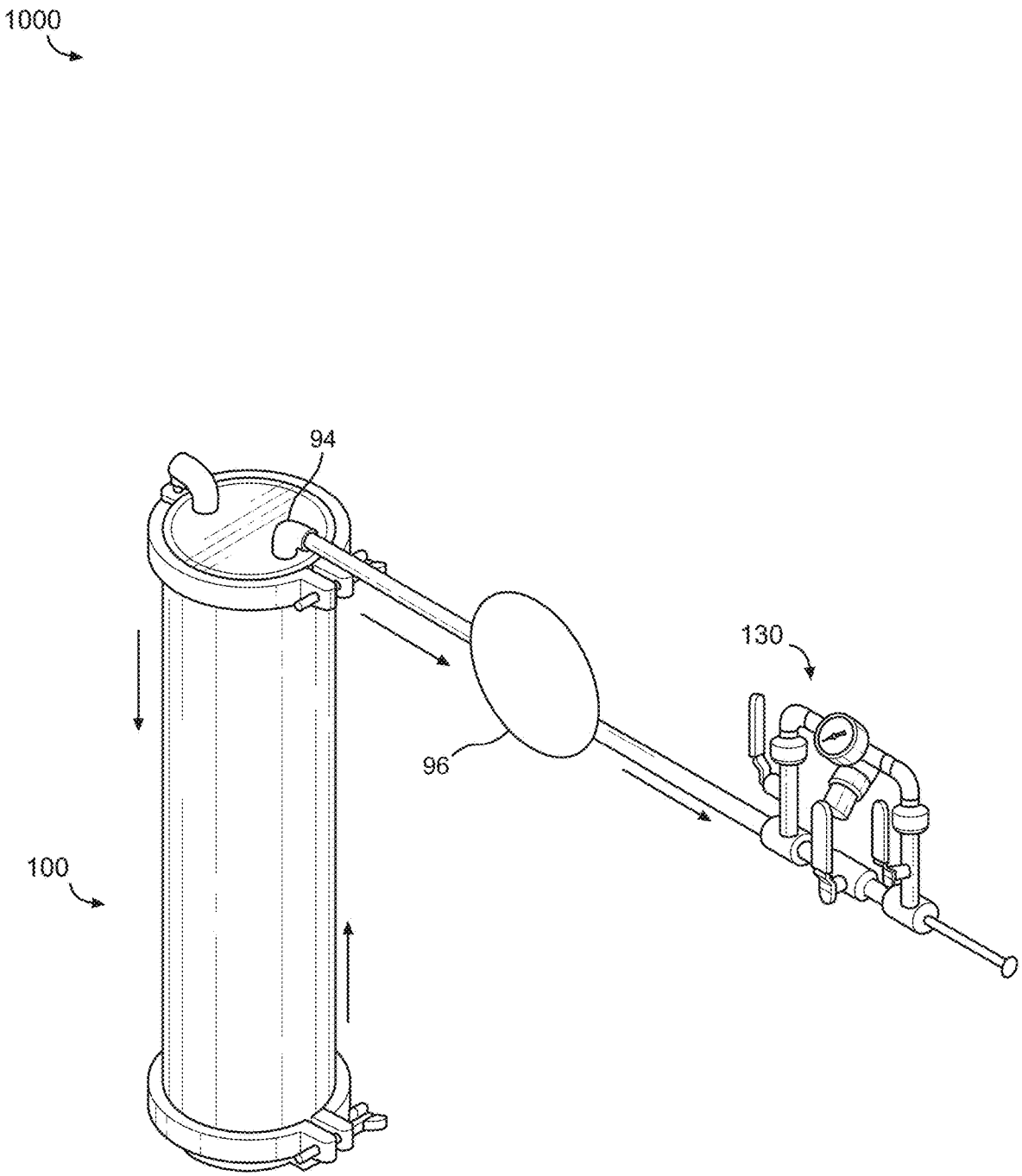
FIG. 36 is a schematic representation of an illustrative corrosion risk reduction system.

FIG. 36 shows an alternative illustrative corrosion risk reduction system 1000, in which the source of compressed air 96 is positioned downstream of the corrosion risk reduction module 100, and configured to pull corrosion treated air from the outlet 94 of the corrosion risk reduction module 100, to drive corrosion inhibitor treated air through the compressed air source 96 and into the piping network. FIG. 45A-D show an illustrative corrosion risk apparatus integrated into the air source intake filter.

Figure 37A:
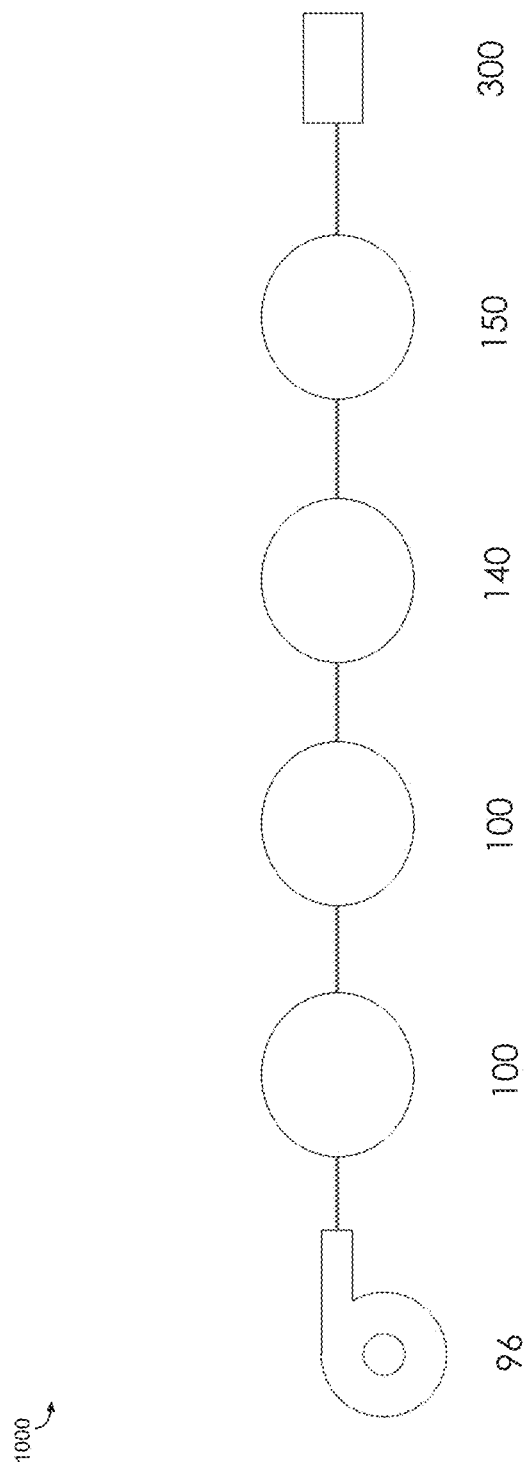
FIGS. 37A-37B are schematic representations of illustrative corrosion risk reduction systems.

FIG. 37A shows an illustrative corrosion risk reduction system 1000 including a source of compressed air 96, a corrosion risk reduction module 100 (or a combination of corrosion risk reduction modules 100 connected in series or in parallel), a discharge gas vent 140, a detection device 150, and a piping system 300, in fluid communication with one another. In illustrative embodiments, the order of elements may be varied. Furthermore, an air maintenance device 130 may be included to regulate pressure from the source of compressed air 96. In illustrative embodiments, either one or both of the discharge gas vent 140 and the detection device 150 may be omitted from the corrosion risk reduction system 1000.

Figure 37B:
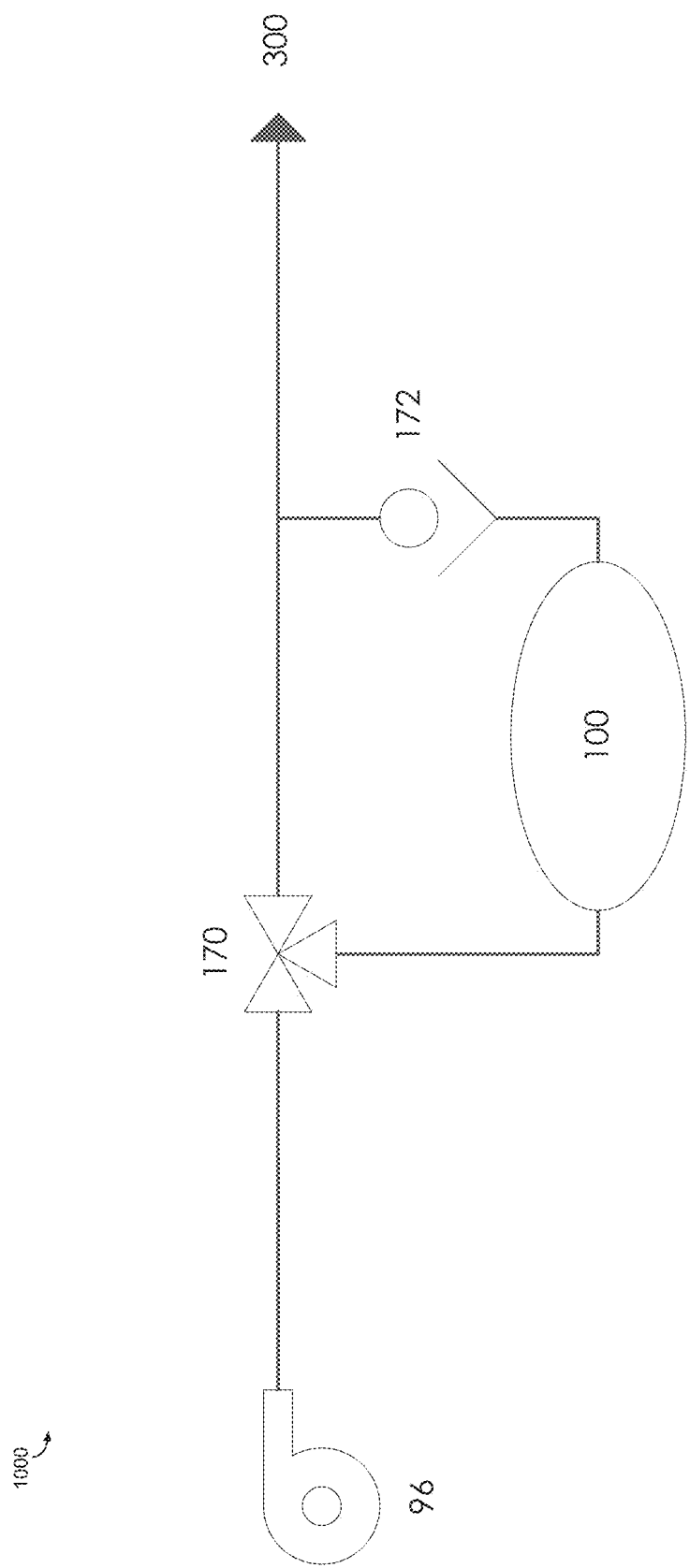

FIG. 37B shows an illustrative corrosion risk reduction system 1000 including a three-way valve 170 between the source of compressed air 96, the corrosion risk reduction module 100, and the rest of the system. A check valve 172 also separates the corrosion risk reduction module 100 from the rest of the system. As such, the corrosion risk reduction module 100 can be serviced (e.g., corrosion inhibitor can be replaced) while keeping the piping system 300 under pressure.

Additional Illustrative Embodiments

Figure 38A:
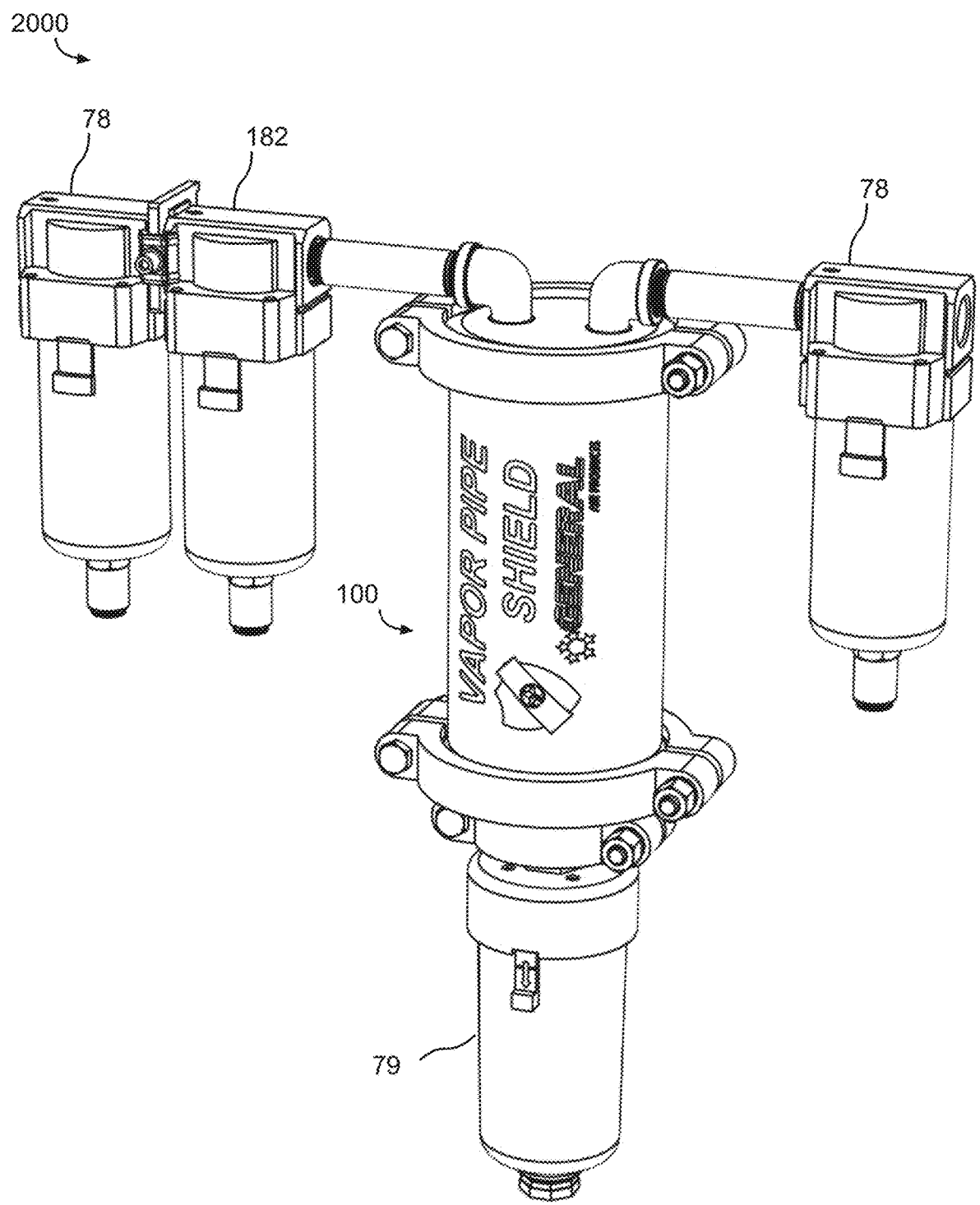
FIGS. 38A-38D are schematic representations of illustrative corrosion risk reduction apparatuses.
Figure 38B:
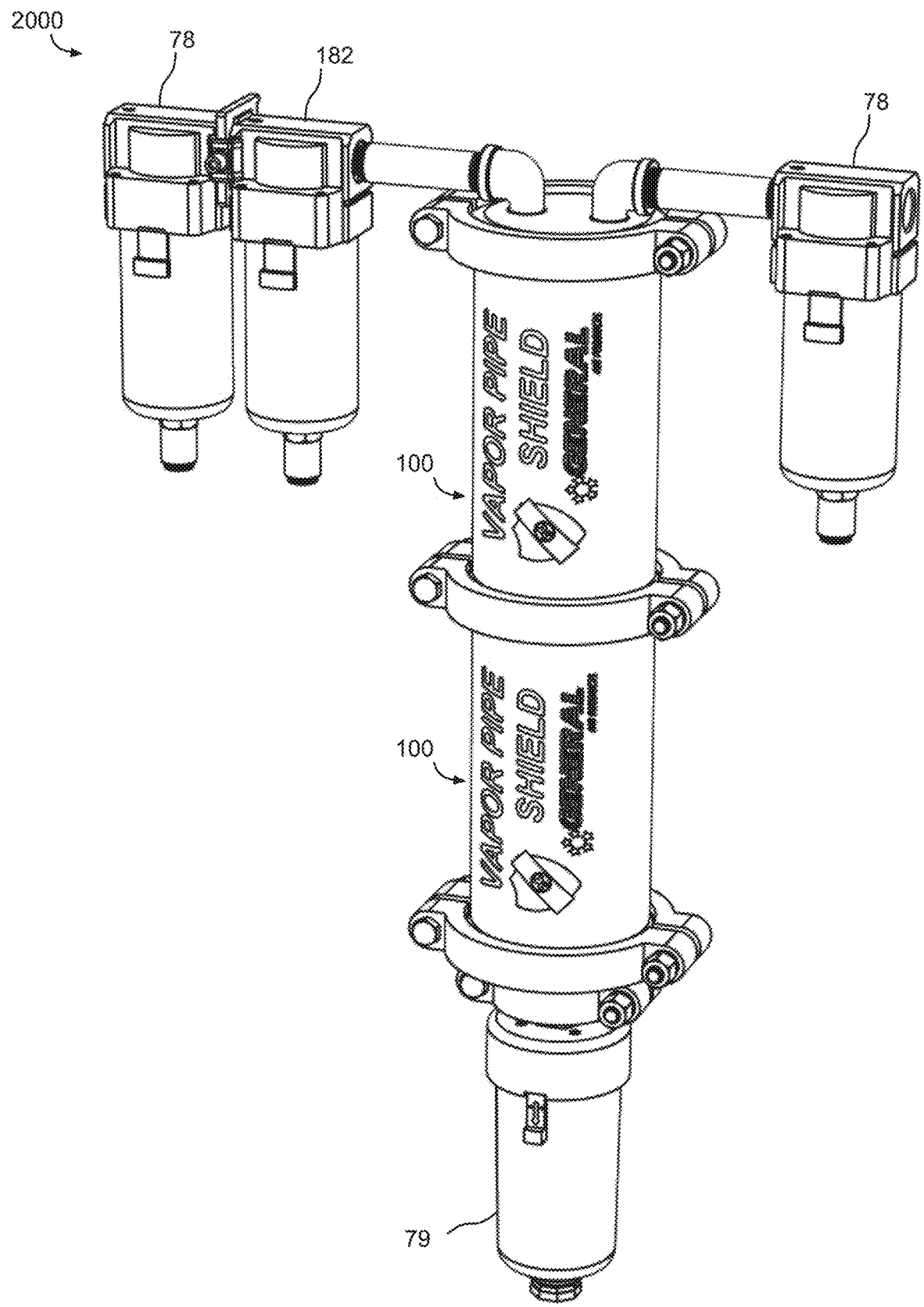
Figure 38C:
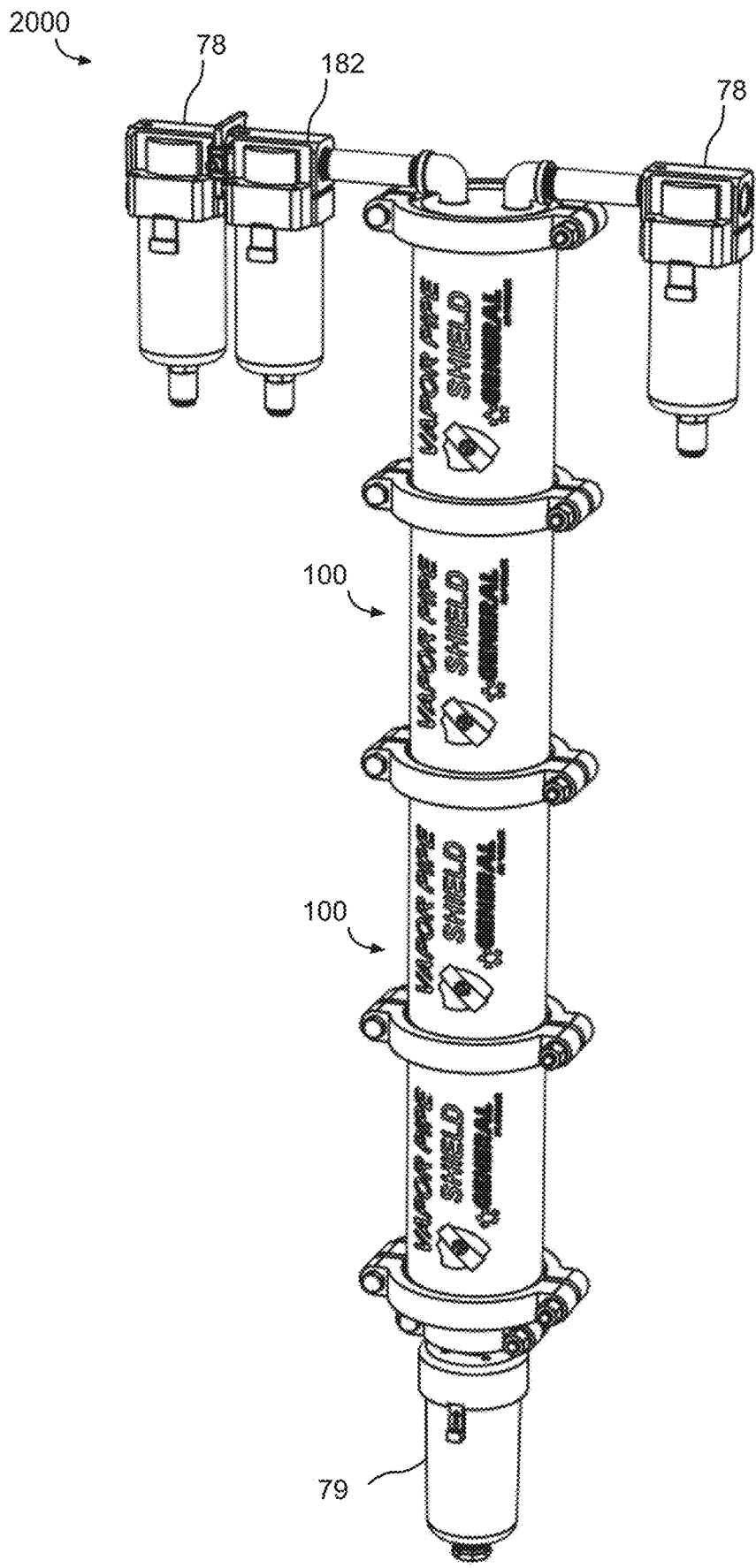
Figure 38D:
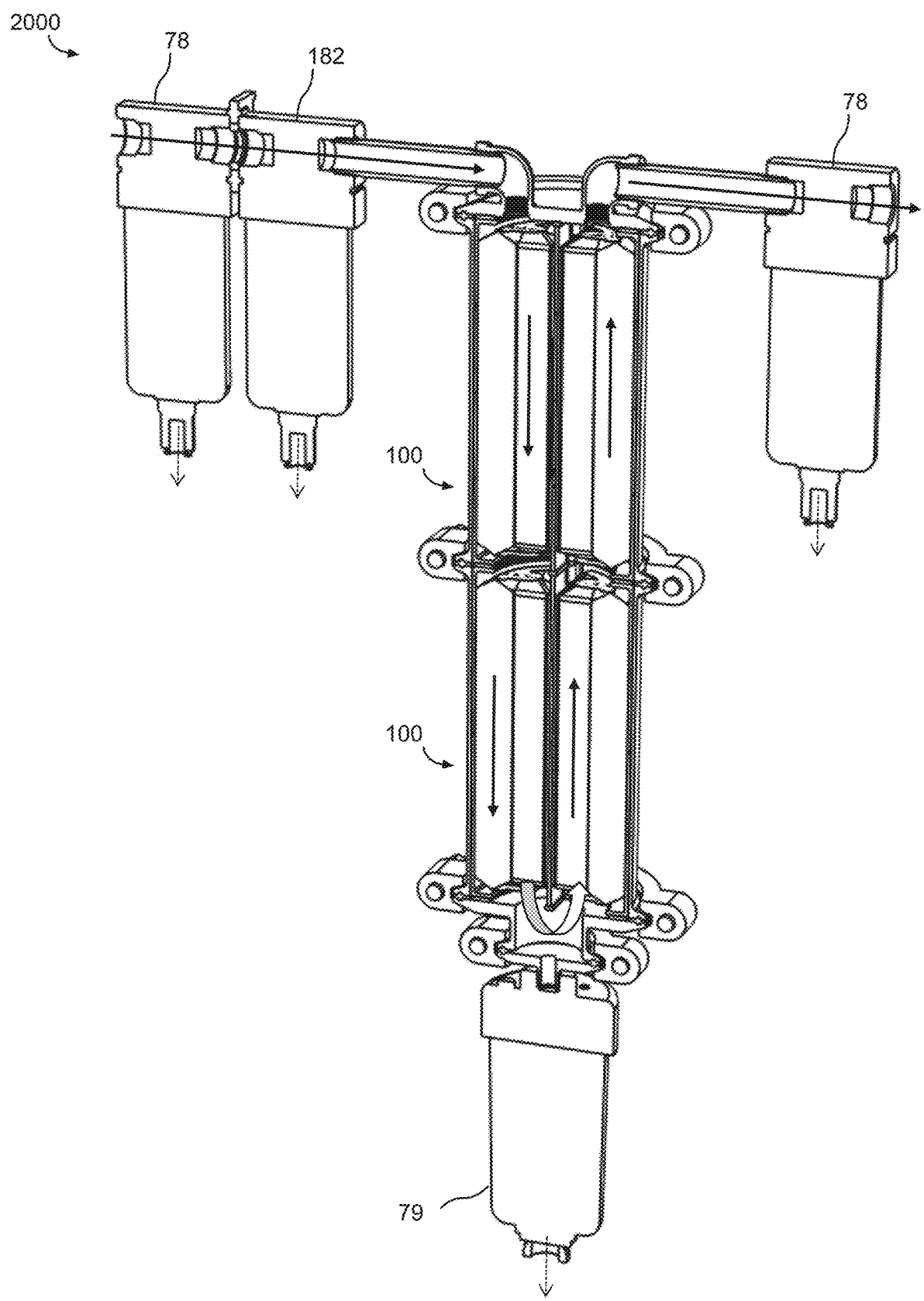

FIGS. 38A-38D show illustrative corrosion risk reduction apparatuses 2000 including one or more corrosion risk reduction modules 100. In particular, a corrosion risk reduction apparatus 2000 includes a single corrosion risk reduction module in FIG. 38A, two corrosion risk reduction modules in FIGS. 38B and 38D, and four corrosion risk reduction modules in FIG. 38C, in fluid communication with coalescing or particulate filters 78 upstream and downstream of the corrosion risk reduction module(s) 100, a coalescing mist separator 182 upstream of the corrosion risk reduction module(s) 100, and a drain baffle 79 at the bottom end of a lowermost corrosion risk reduction module 100. The cross-sectional view depicted in FIG. 38D shows an illustrative air flow pattern through a corrosion risk reduction apparatus 2000. Multiple modules of the apparatus may be positioned in series or in parallel without departing from the scope of the disclosure. It is to be understood that the coalescing or particulate filters 78 and the separator 182 need not be arranged in the manner illustrated in the exemplary figures of the present disclosure. These elements can be replaced with any number of separating or filtering components, and/or can be omitted, without departing from the present disclosure.

Figure 39A:
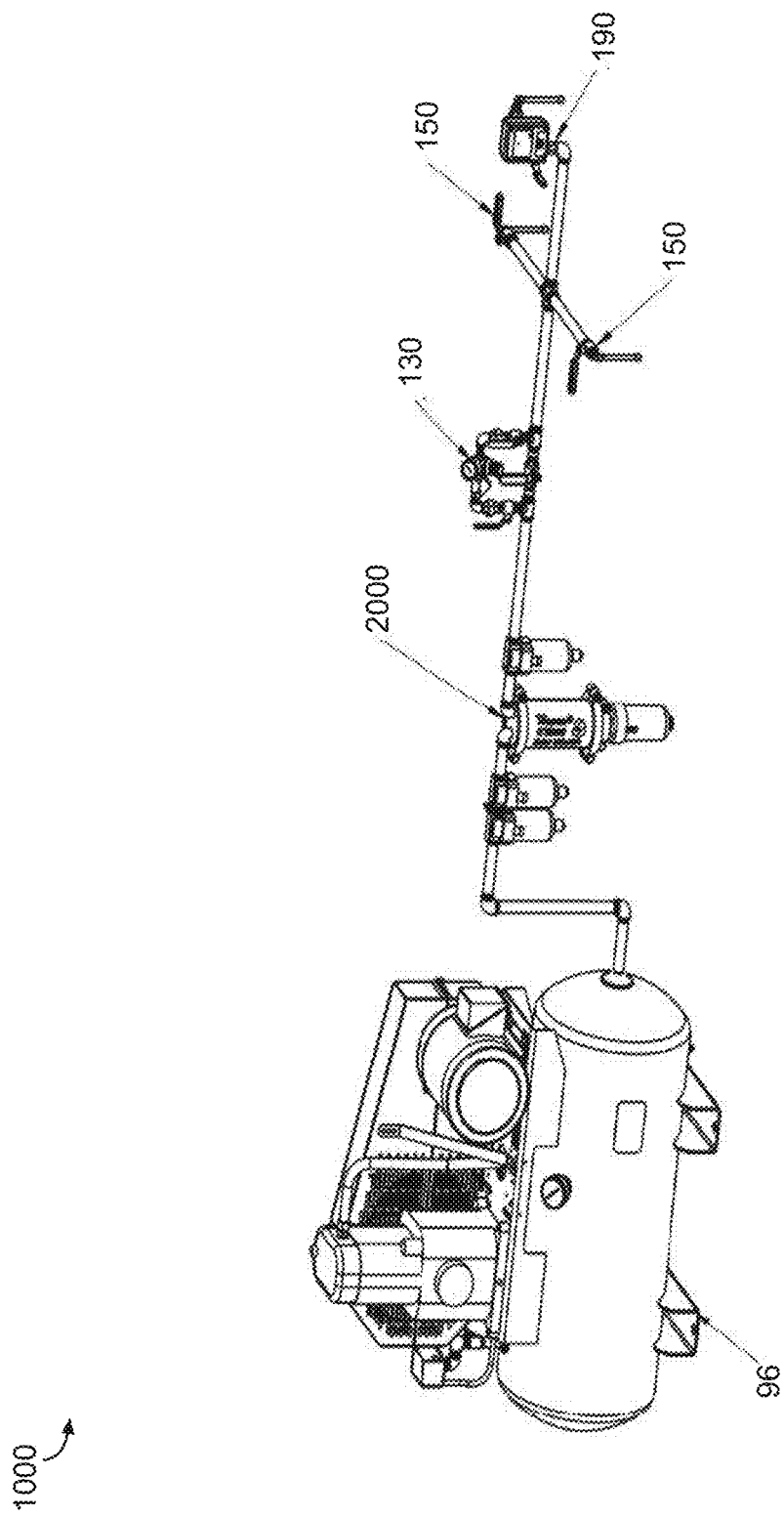
FIG. 39A is a schematic representation of an illustrative corrosion risk reduction system.
Figure 39B:
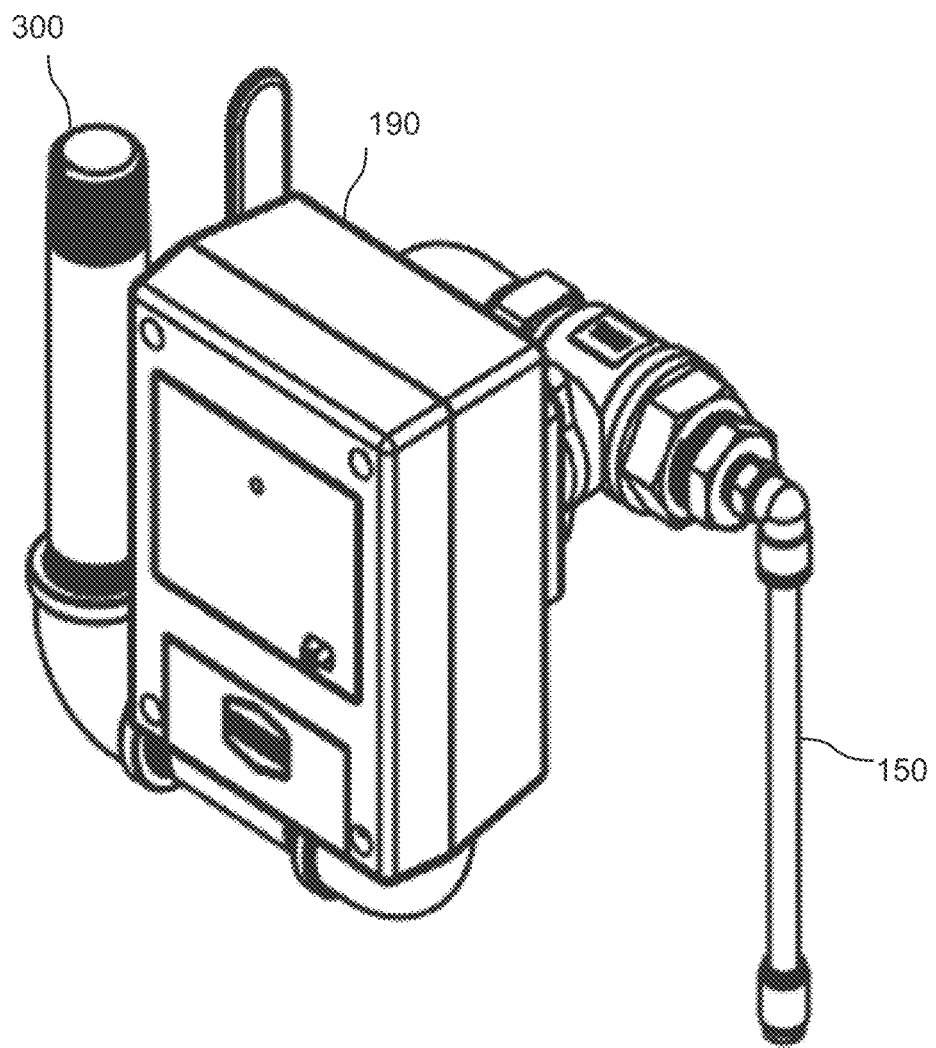
FIG. 39B is a schematic representation of an illustrative automatic purge valve coupled to a piping system.

FIG. 39A shows an illustrative corrosion risk reduction system 1000 including a source of compressed air 96, a corrosion risk reduction apparatus 2000, an air maintenance device 130, branch line detection devices 150, and a purge valve 190. In illustrative embodiments, the purge valve 190 can be an automatic purge valve (as shown in FIG. 39B) configured to automatically open at preset time intervals (e.g., a two-week purge valve). The purge valve 190 may be coupled to any connection to the piping system 300 that is downstream of the source of compressed air 96, and may be coupled to a detection device 150 as well. Alternatively, a manual operation of a purge valve may also be used without departing from the present disclosure.

Figure 40A:
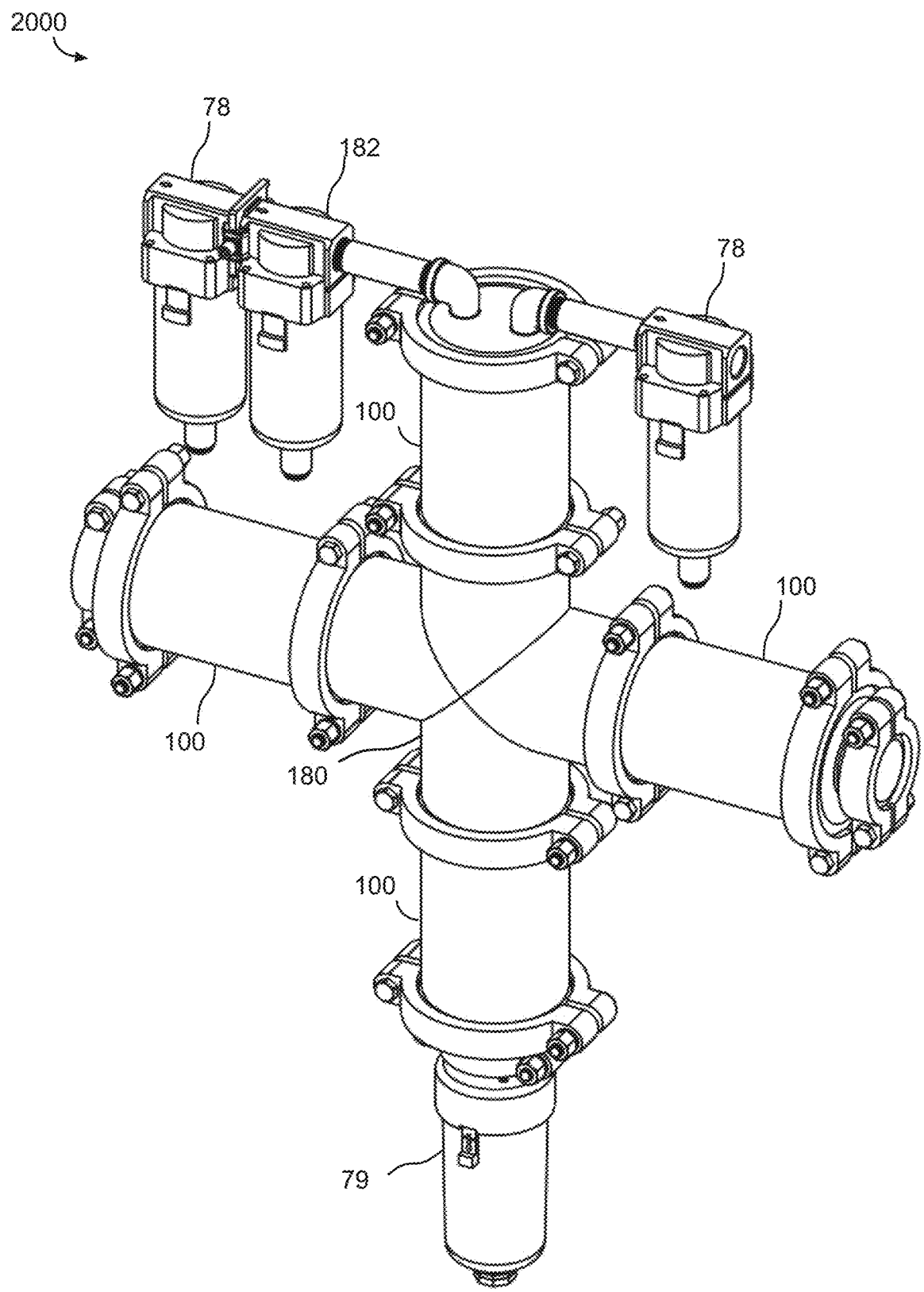
FIGS. 40A-40C are schematic representations of an illustrative corrosion risk reduction apparatus with a cross-like configuration.
Figure 40B:
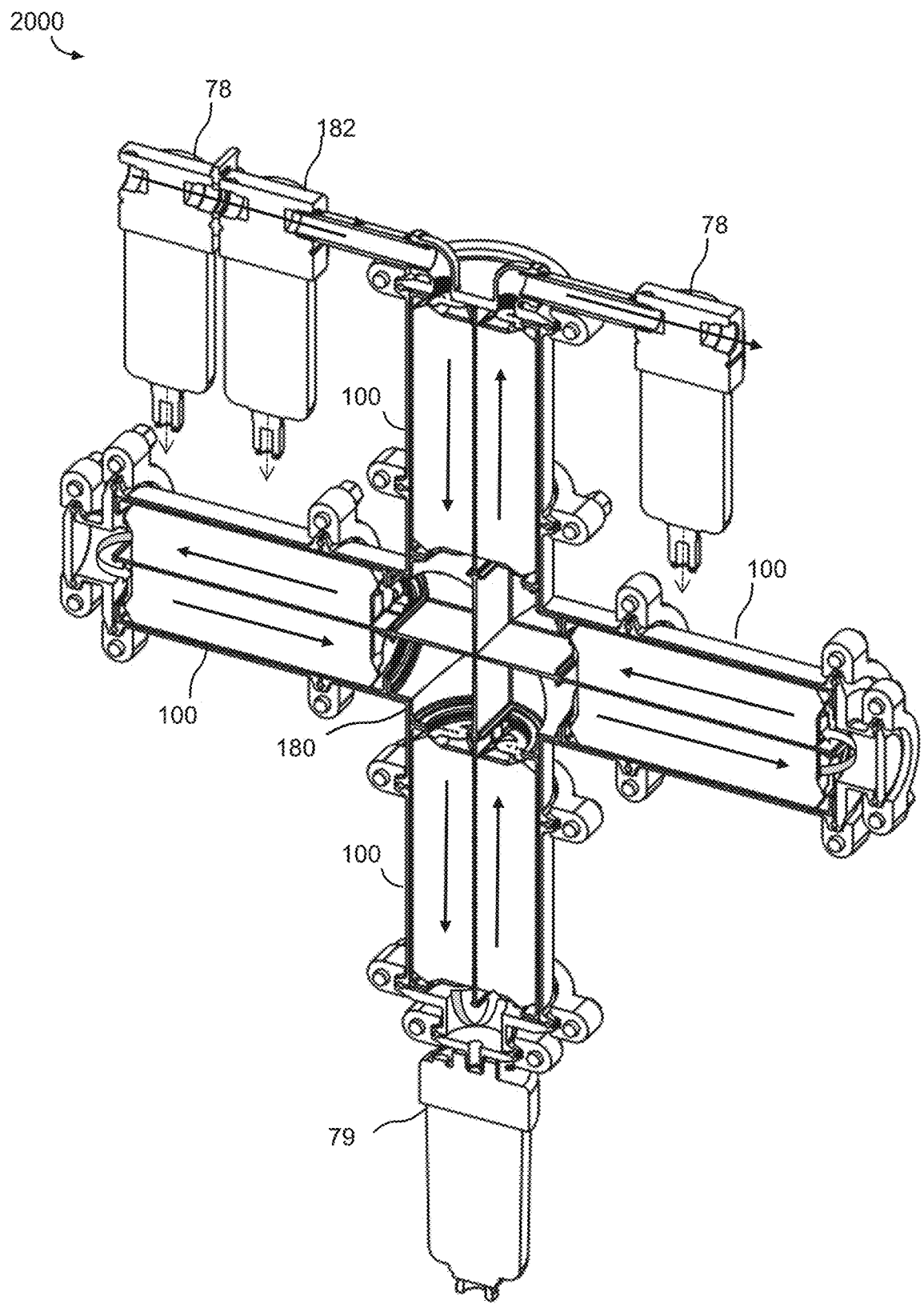
Figure 40C:
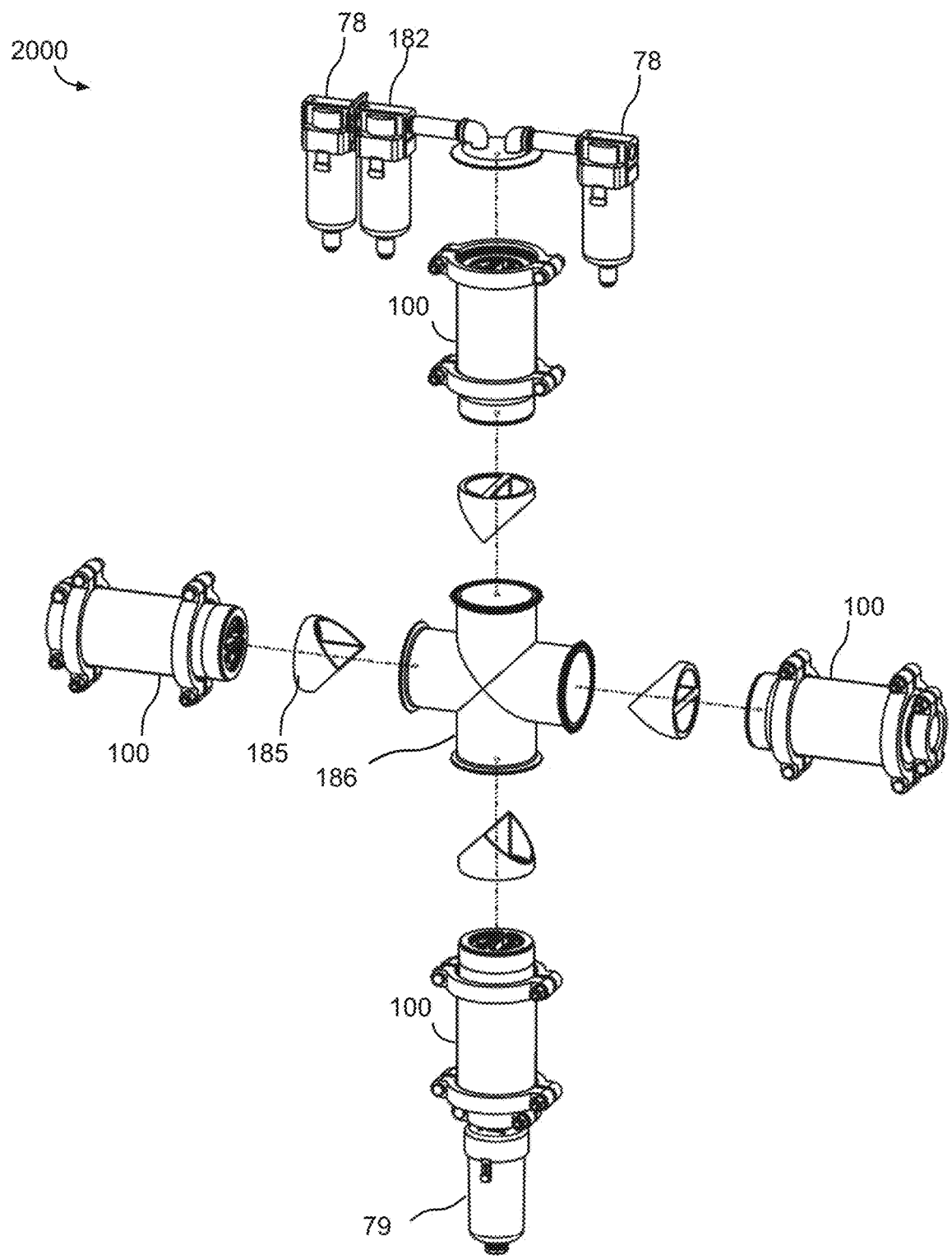
Figure 40D:
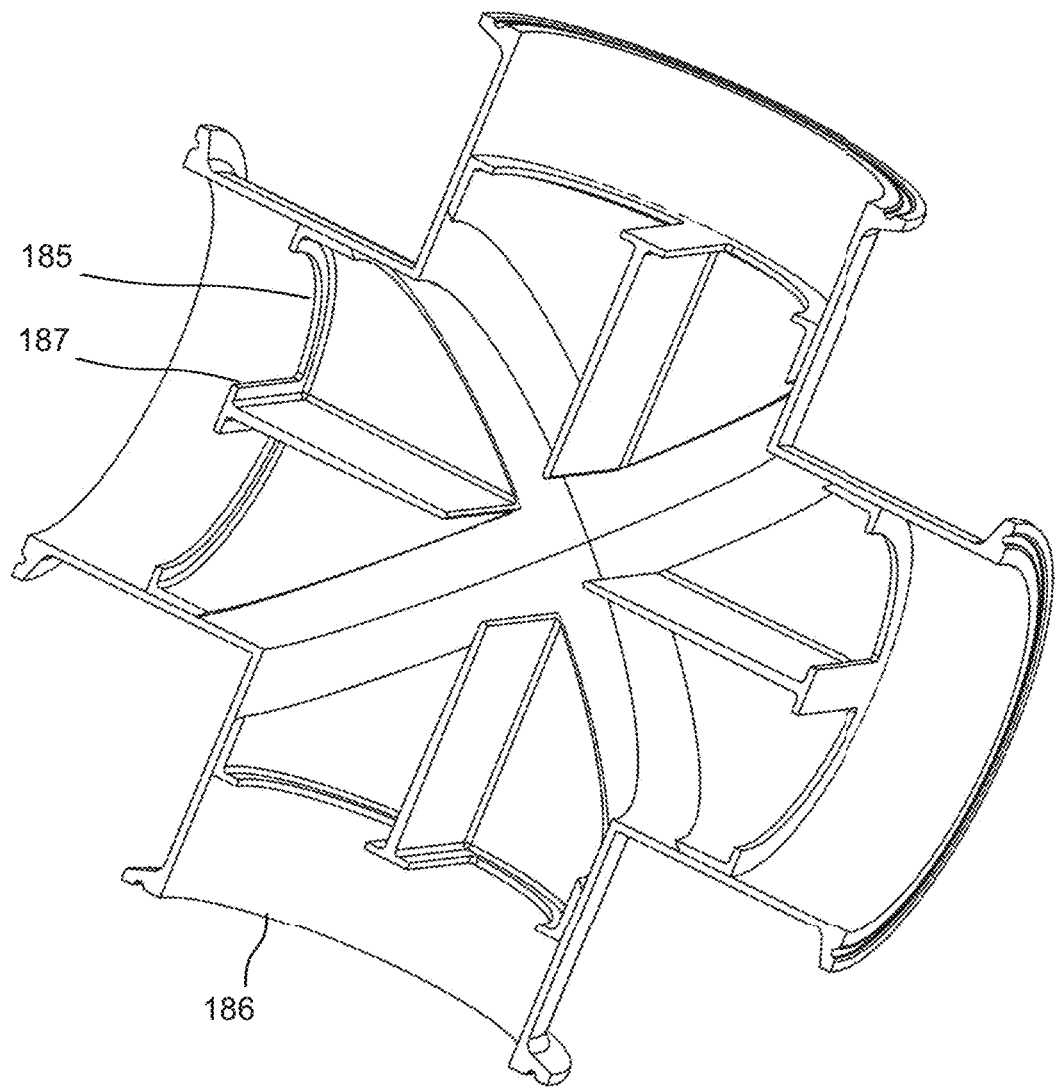
FIG. 40D is a schematic representation of a cross-sectional view of an illustrative flange arrangement for a corrosion risk reduction component with a cross-like configuration.
Figure 40E:
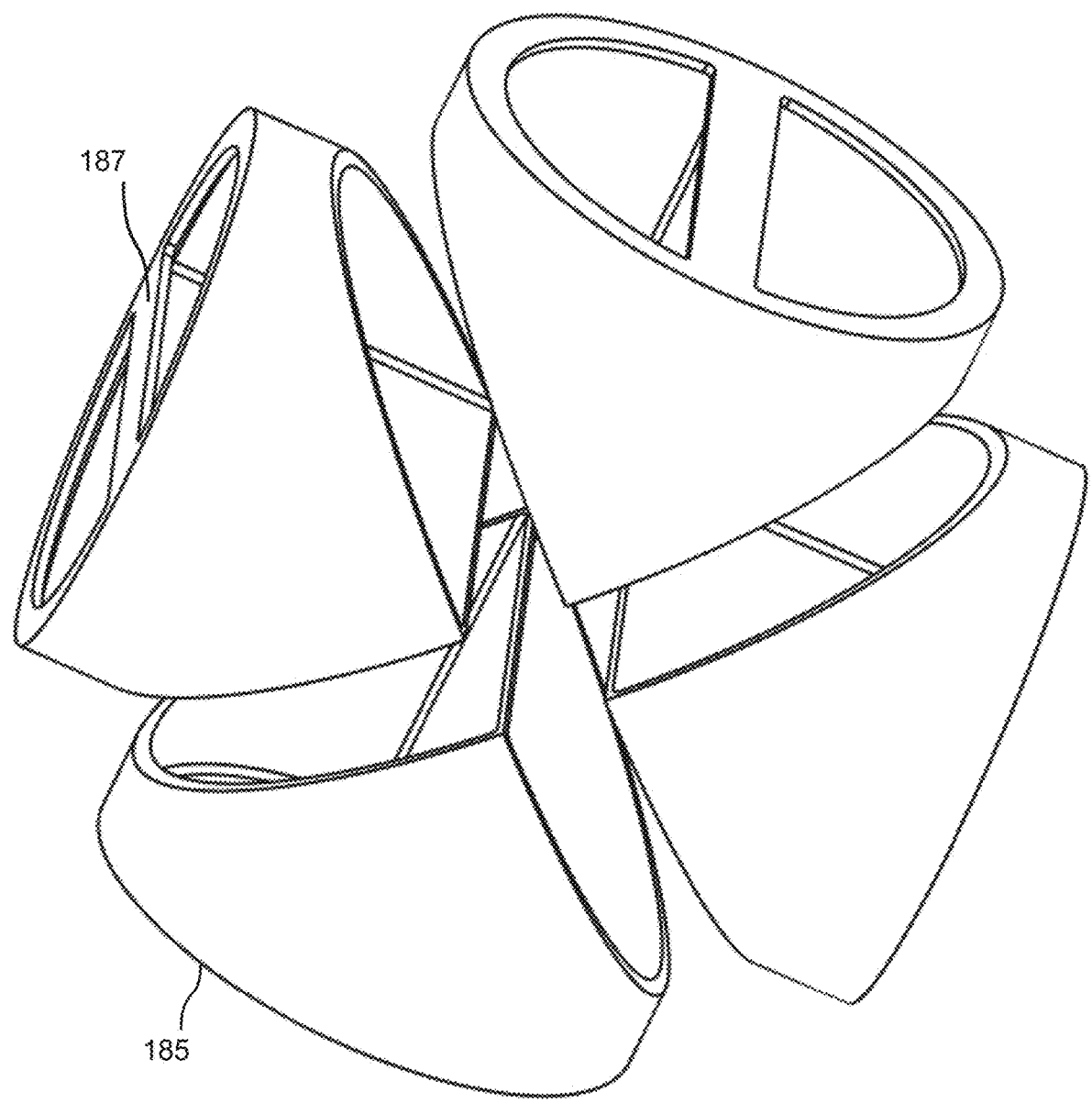
FIG. 40E is a schematic representation of an illustrative set of flange members for a corrosion risk reduction component with a cross-like configuration.

FIGS. 40A-40C show an illustrative corrosion risk reduction apparatus 2000 including plural (in the illustrated embodiment, four) corrosion risk reduction modules 100 arranged in a cross-like pattern, and in fluid communication with coalescing or particulate filters 78 upstream and downstream of the corrosion risk reduction modules 100, a coalescing mist separator 182 upstream of the corrosion risk reduction modules 100, and a drain baffle 79 at the bottom end of a lowermost corrosion risk reduction module 100. The cross-sectional view depicted in FIG. 40B shows an illustrative air flow pattern through the corrosion risk reduction apparatus 2000. FIG. 40C shows an exploded view of the corrosion risk reduction apparatus 2000. The corrosion risk reduction modules 100 arranged in a cross-like pattern are connected to one another via a flange arrangement 180. The flange arrangement 180 includes plural (in the illustrated embodiment, four) flange members 185 configured to fit into a cross-shaped pipe element 186 to form a cross-like pattern. FIGS. 40D-40E show that each flange member 185 includes a partition 187 for separating inflow and outflow passageways in and out of a corrosion risk reduction module 100.

Figure 41A:
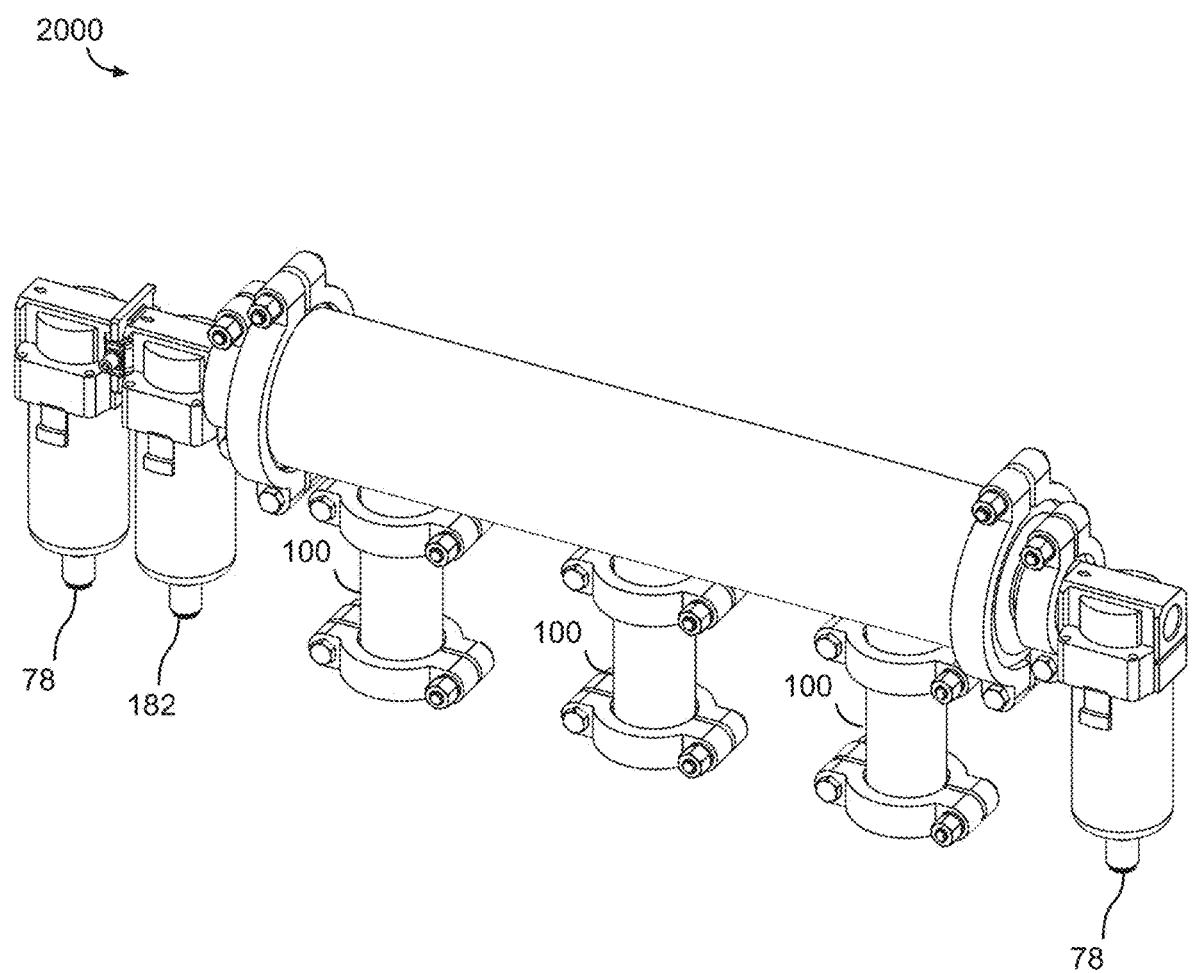
FIGS. 41A-41B are schematic representations of an illustrative corrosion risk reduction apparatus.
Figure 41B:
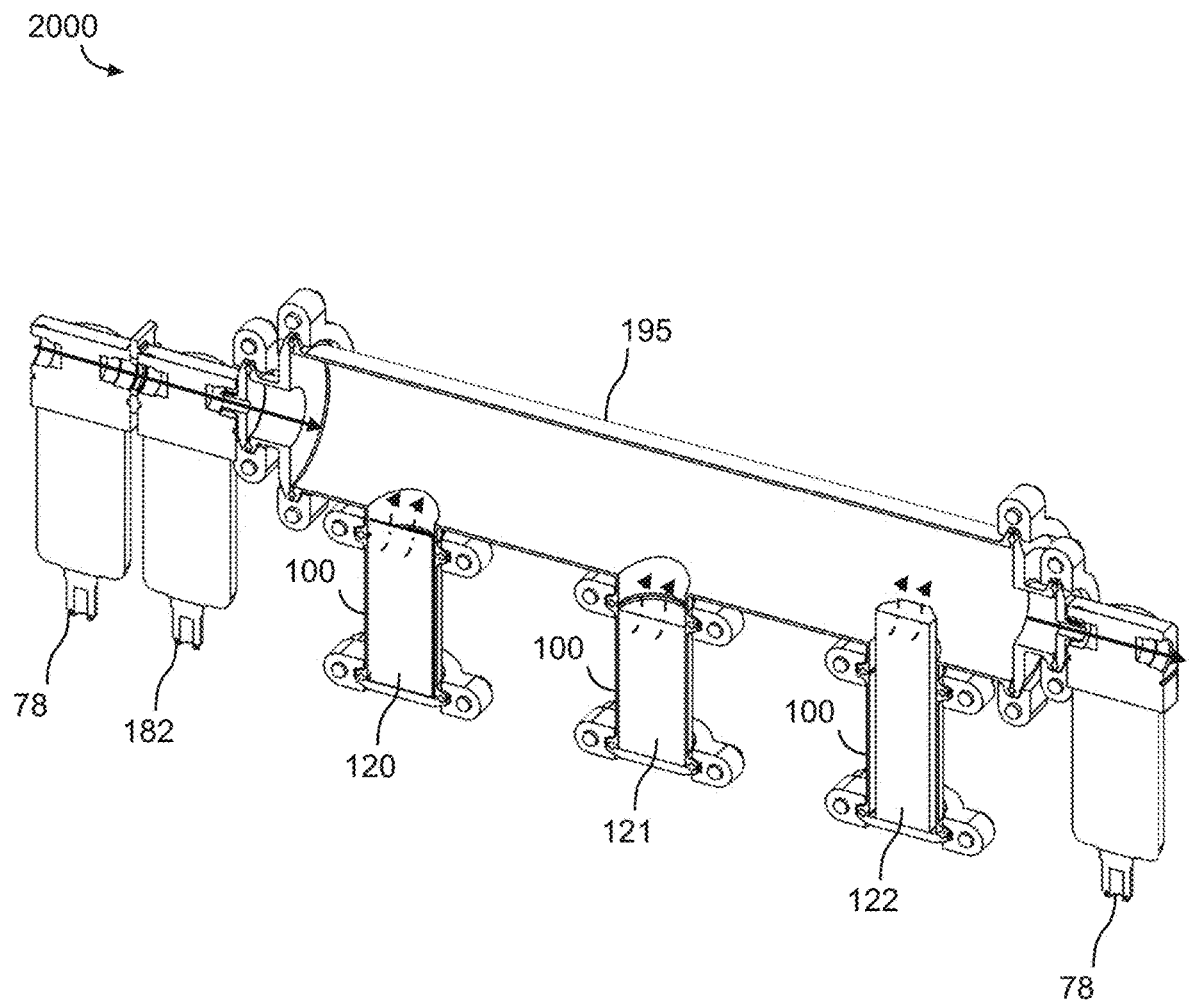
Figure 41C:
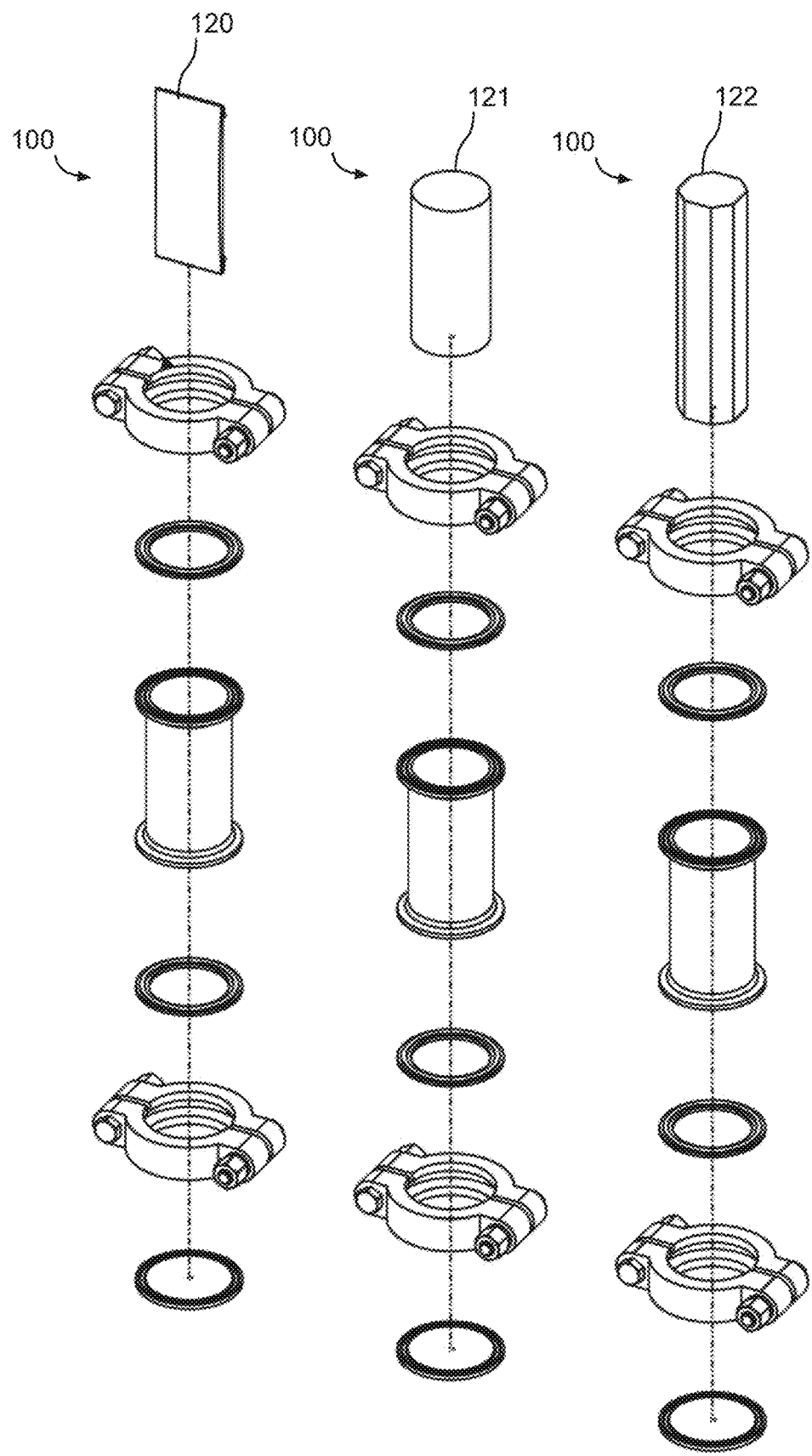
FIG. 41C is a schematic representation of various illustrative corrosion risk reduction modules.

FIGS. 41A-41C show an illustrative corrosion risk reduction apparatus 2000 including one or more (in the illustrated embodiment, three) corrosion risk reduction modules 100 in fluid communication with a central housing 195. The central housing 195 is in fluid communication with coalescing or particulate filters 78 upstream and downstream of the central housing 195, and a coalescing mist separator 182 upstream of the central housing 195. One or more corrosion risk reduction modules 100 can house corrosion inhibitor in various forms. For example, corrosion inhibitor can be housed in the form of a container 120 (e.g., a sachet or pouch containing a corrosion inhibitor), and/or raw powder 121 including corrosion inhibitor, and/or a porous solid mass or block 122 of corrosion inhibitor (e.g., but not limited to, a wafer or a brick). These are visible in the cross-sectional view of the illustrative corrosion risk reduction apparatus 2000 shown in FIG. 41B and the exploded view of corrosion risk reduction modules 100 in FIG. 41C. The cross-sectional view depicted in FIG. 41B also shows an illustrative air flow pattern through the corrosion risk reduction apparatus 2000. In the illustrative embodiments of FIGS. 41A-41C, the corrosion risk reduction modules 100 are open only at one end, and the corrosion inhibitor can be drawn into the central housing 195 by the air flowing through the central housing 195.

Figure 42A:
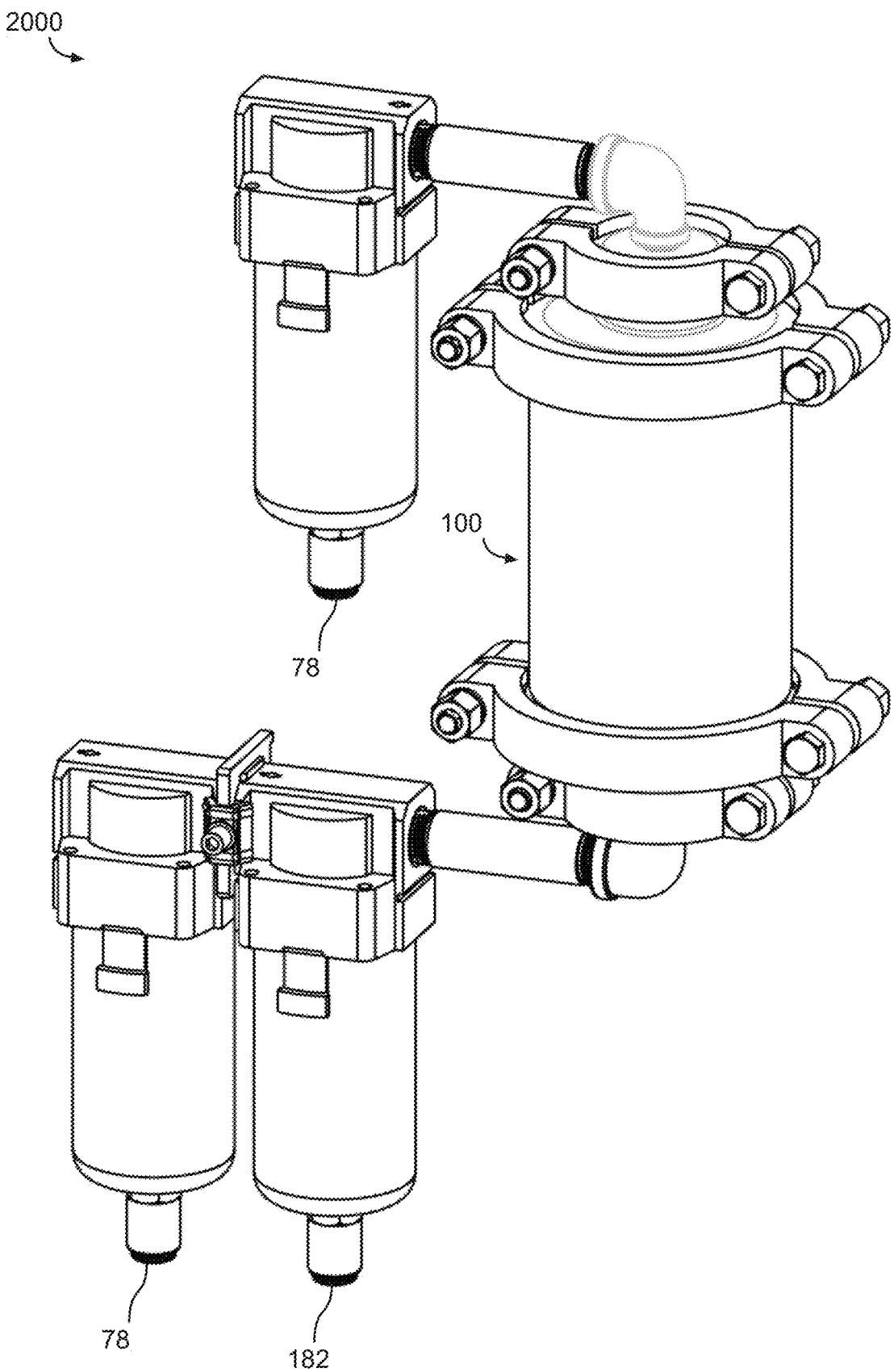
FIGS. 42A-42B are schematic representations of an illustrative corrosion risk reduction apparatus.
Figure 42B:
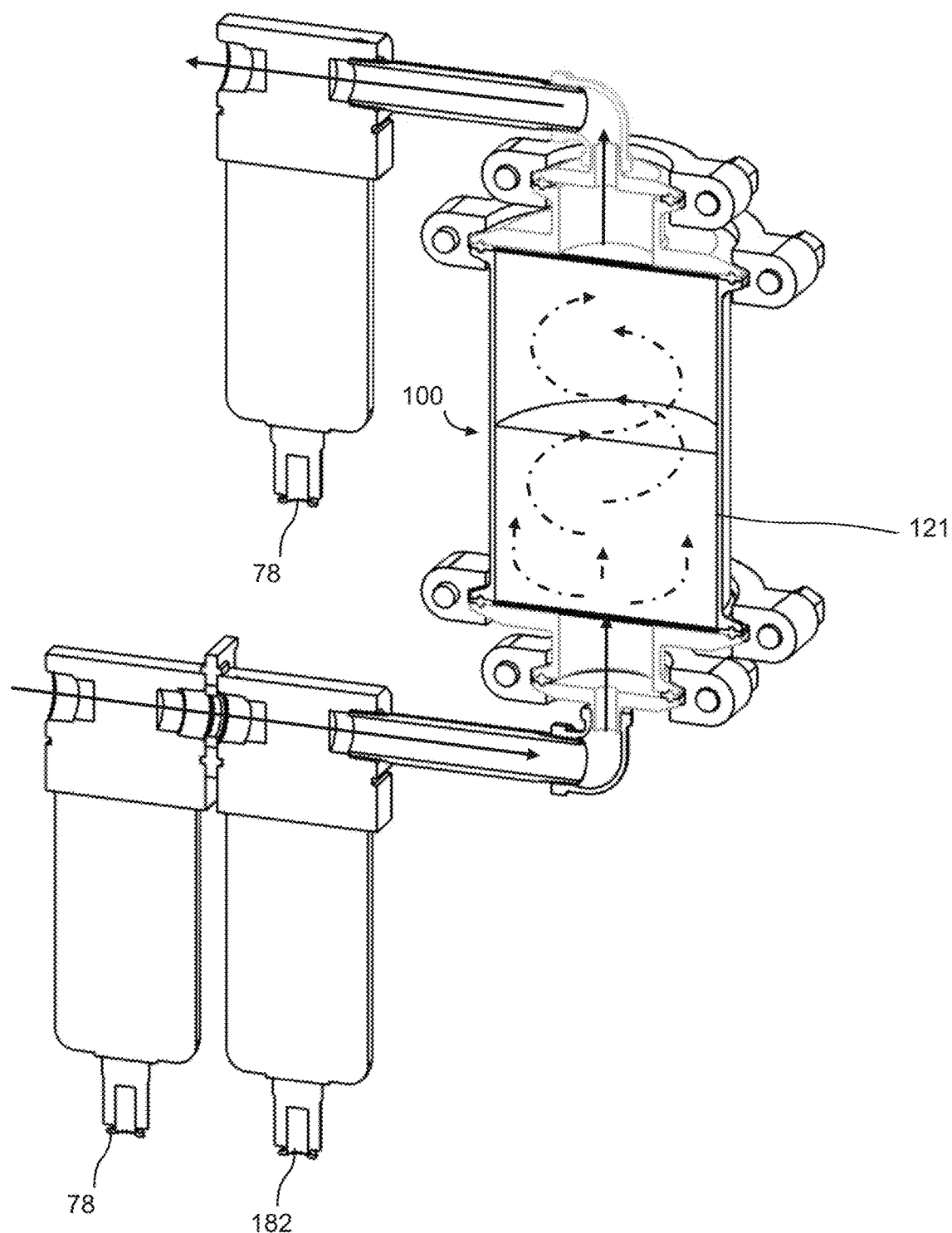

FIGS. 42A-42B show an illustrative corrosion risk reduction apparatus 2000 including a corrosion risk reduction module 100 in fluid communication with coalescing or particulate filters 78 upstream and downstream of the corrosion risk reduction module 100, and a coalescing mist separator 182 upstream of the corrosion risk reduction module 100. The cross-sectional view depicted in FIG. 42B shows that the corrosion risk reduction module 100 includes raw powder 121 including corrosion inhibitor, and also shows an illustrative air flow pattern through the corrosion risk reduction apparatus 2000 (including air flow through the raw powder 121). In the illustrative embodiments of FIGS. 42A-42B, the corrosion risk reduction module 100 has inlet and outlet openings at opposite longitudinal ends.

Figure 43A:
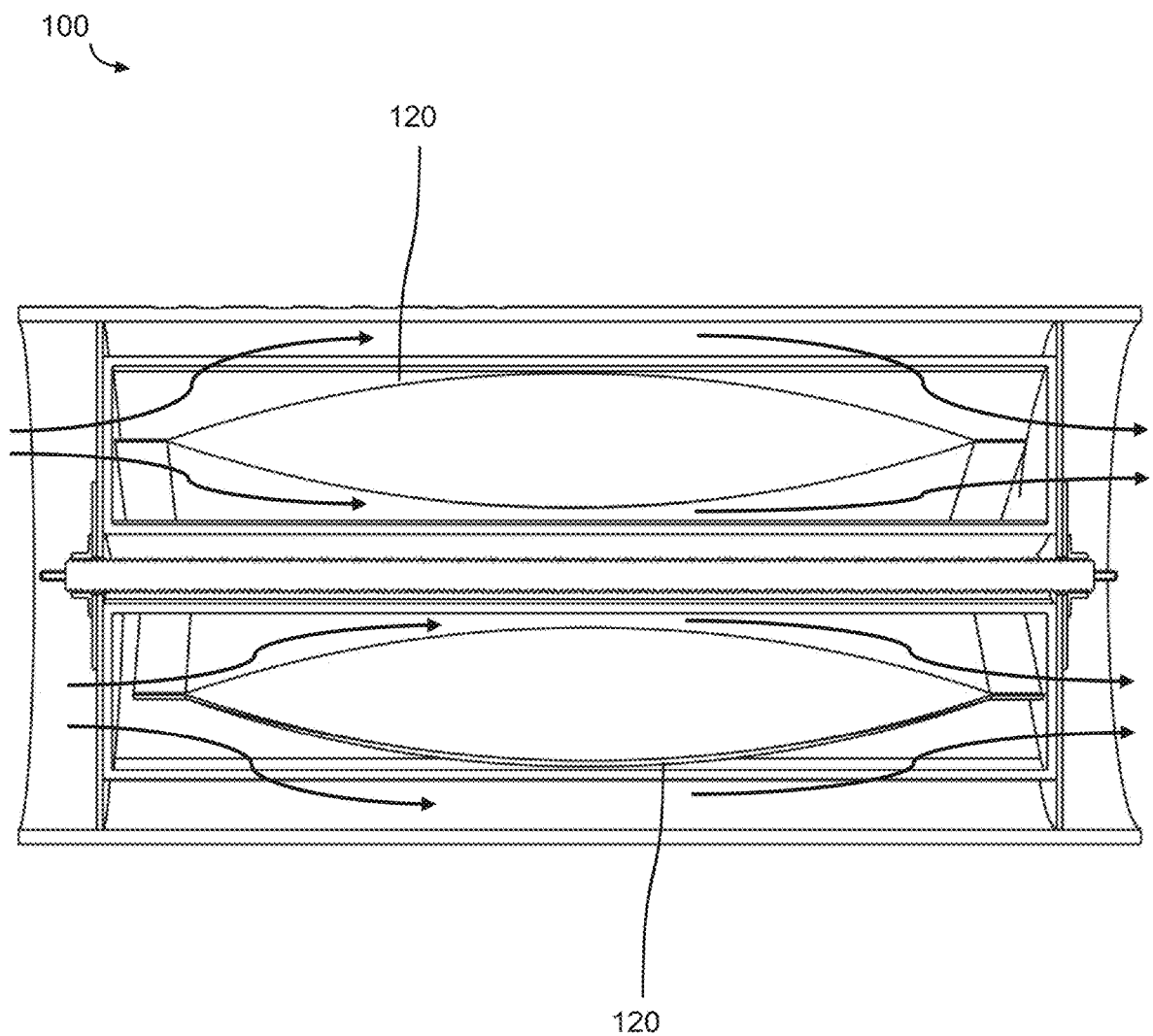
FIG. 43A is a schematic representation of a cross-sectional view of an illustrative corrosion risk reduction module configured for straight flow.
Figure 43B:
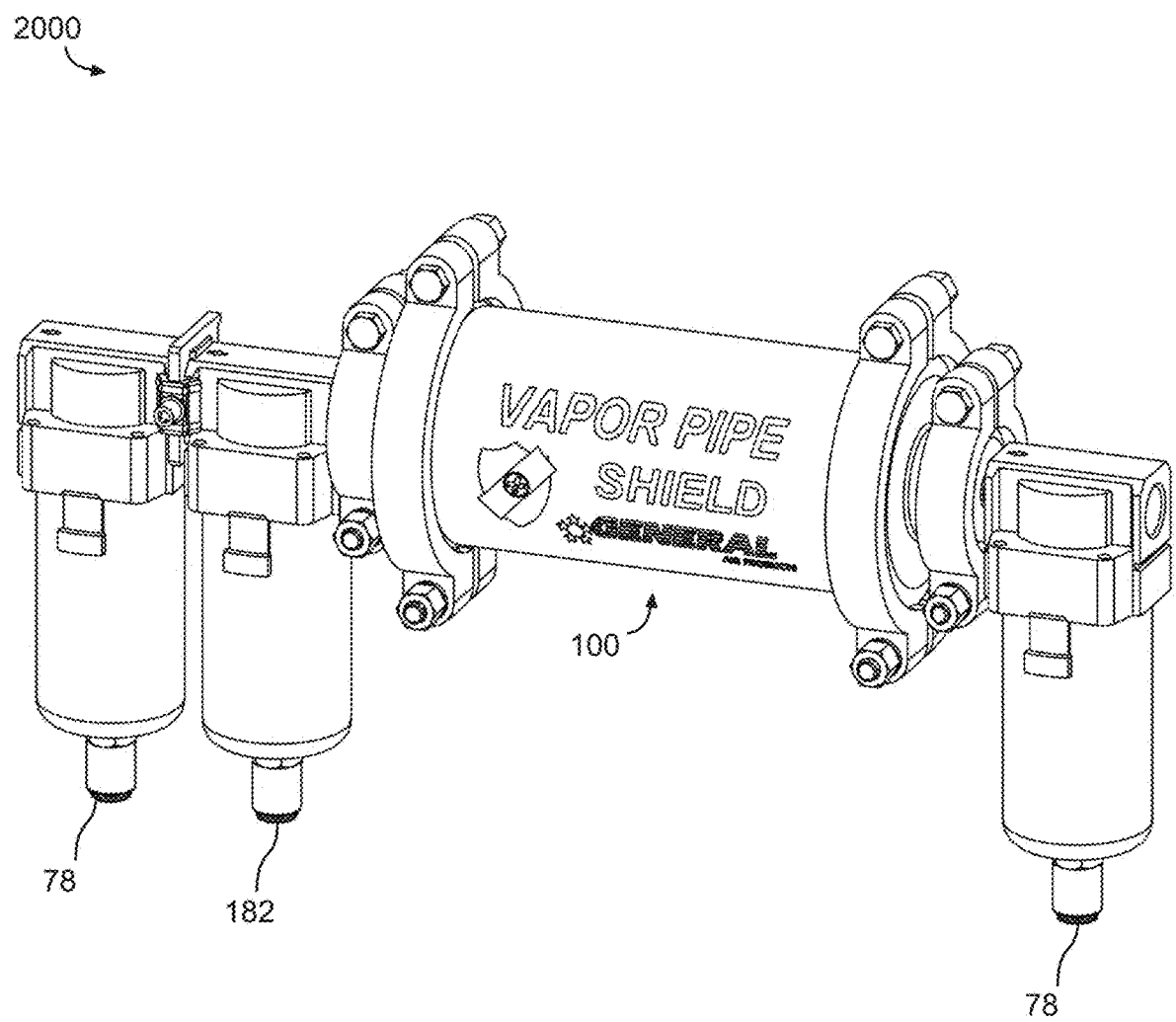
FIGS. 43B-43C are schematic representations of an illustrative corrosion risk reduction apparatus including a corrosion risk reduction module configured for straight flow.
Figure 43C:
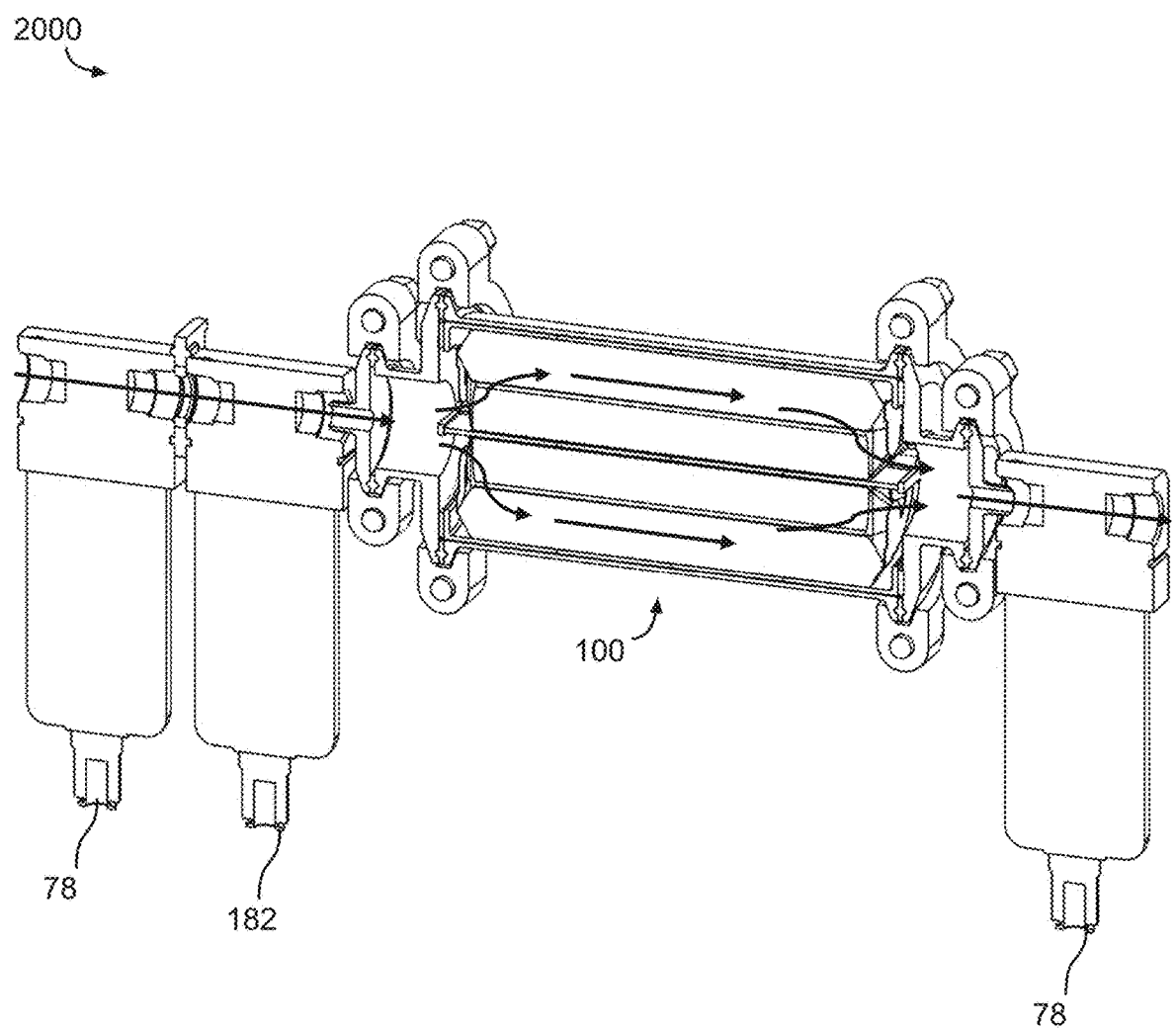

FIGS. 43A-43C show a straight flow configuration. As illustrated in FIGS. 43A and 43C, air flow can occur at least around containers 120 of corrosion inhibitor in a corrosion risk reduction module 100. FIGS. 43B and 43C show an illustrative corrosion risk reduction apparatus 2000 including a corrosion risk reduction module 100 configured for straight flow, in fluid communication with coalescing or particulate filters 78 upstream and downstream of the corrosion risk reduction module 100, and a coalescing mist separator 182 upstream of the corrosion risk reduction module 100.

Figure 44A:
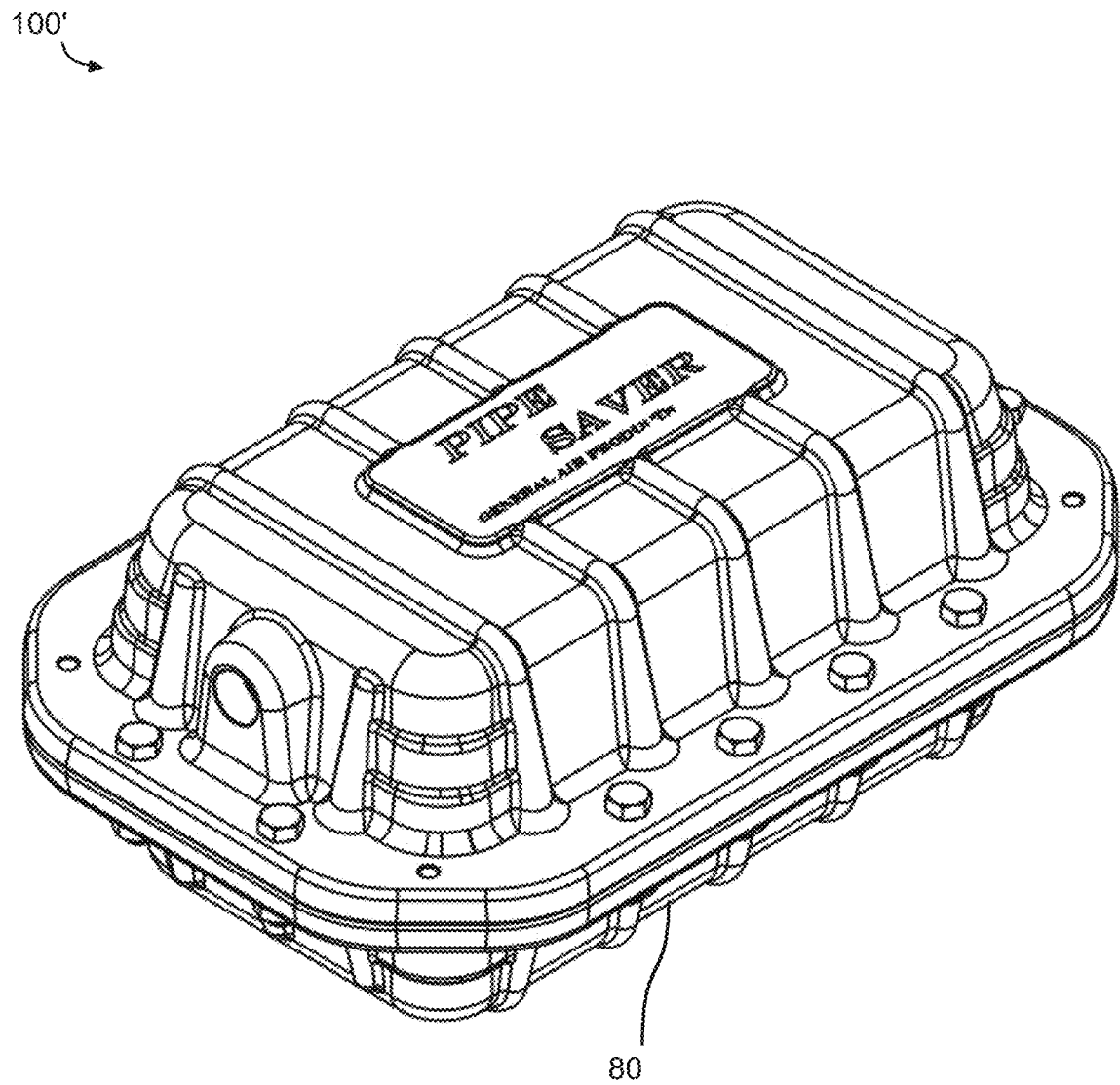
FIGS. 44A-44C are schematic representations of an illustrative corrosion risk reduction module with a clamshell configuration.
Figure 44B:
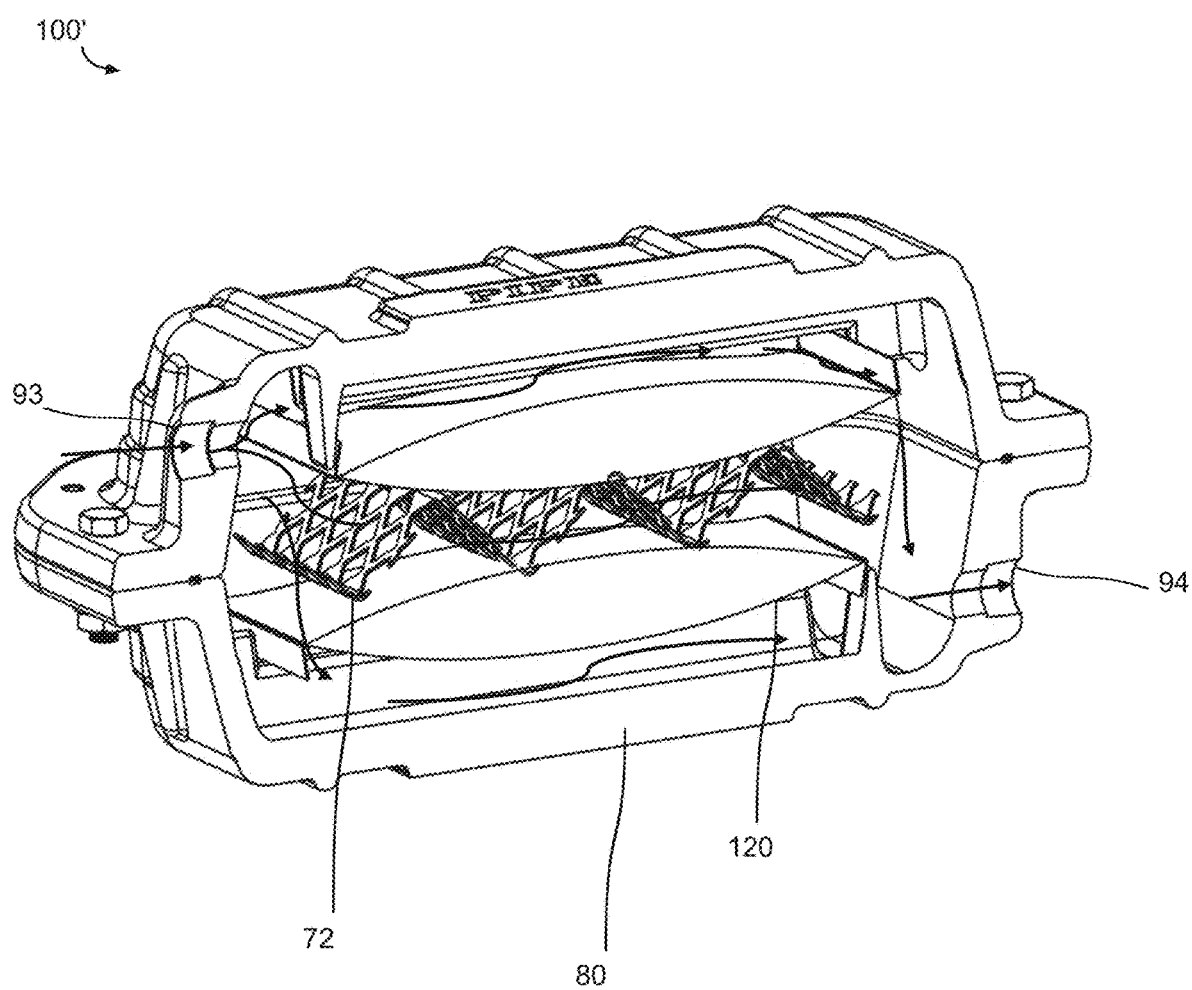
Figure 44C:
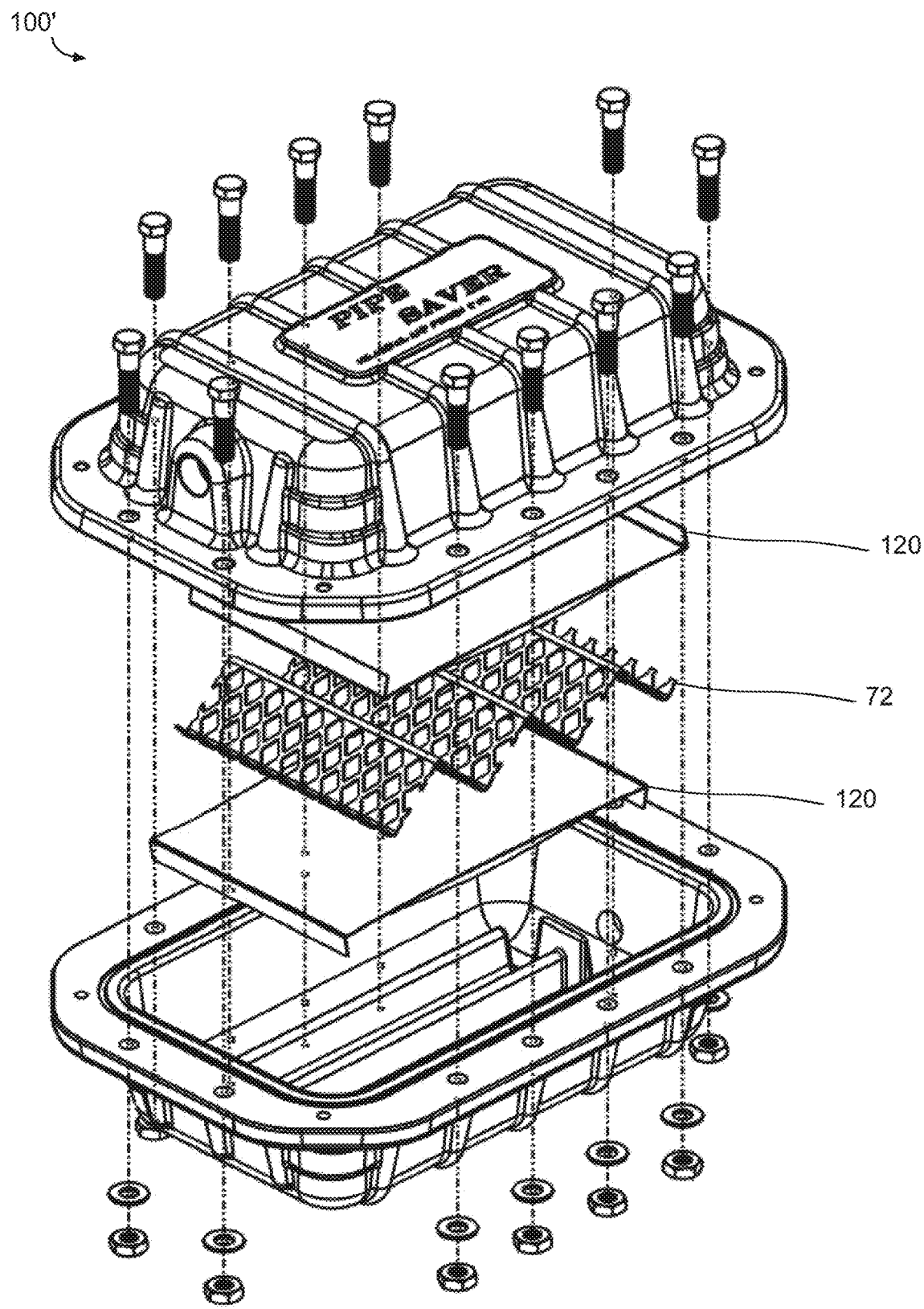

FIGS. 44A-44C show a corrosion risk reduction module 100' with a clamshell housing 80, in which containers 120 of corrosion inhibitor are held by a metal or plastic webbing or mesh 72. The metal or plastic webbing or mesh 72 is visible in the cross-sectional view shown in FIG. 44B and the exploded view shown in FIG. 44C. FIG. 44B also shows the air flow pattern through the corrosion risk reduction module 100', from an inlet port 93 to an outlet port 94.

Figure 45A:
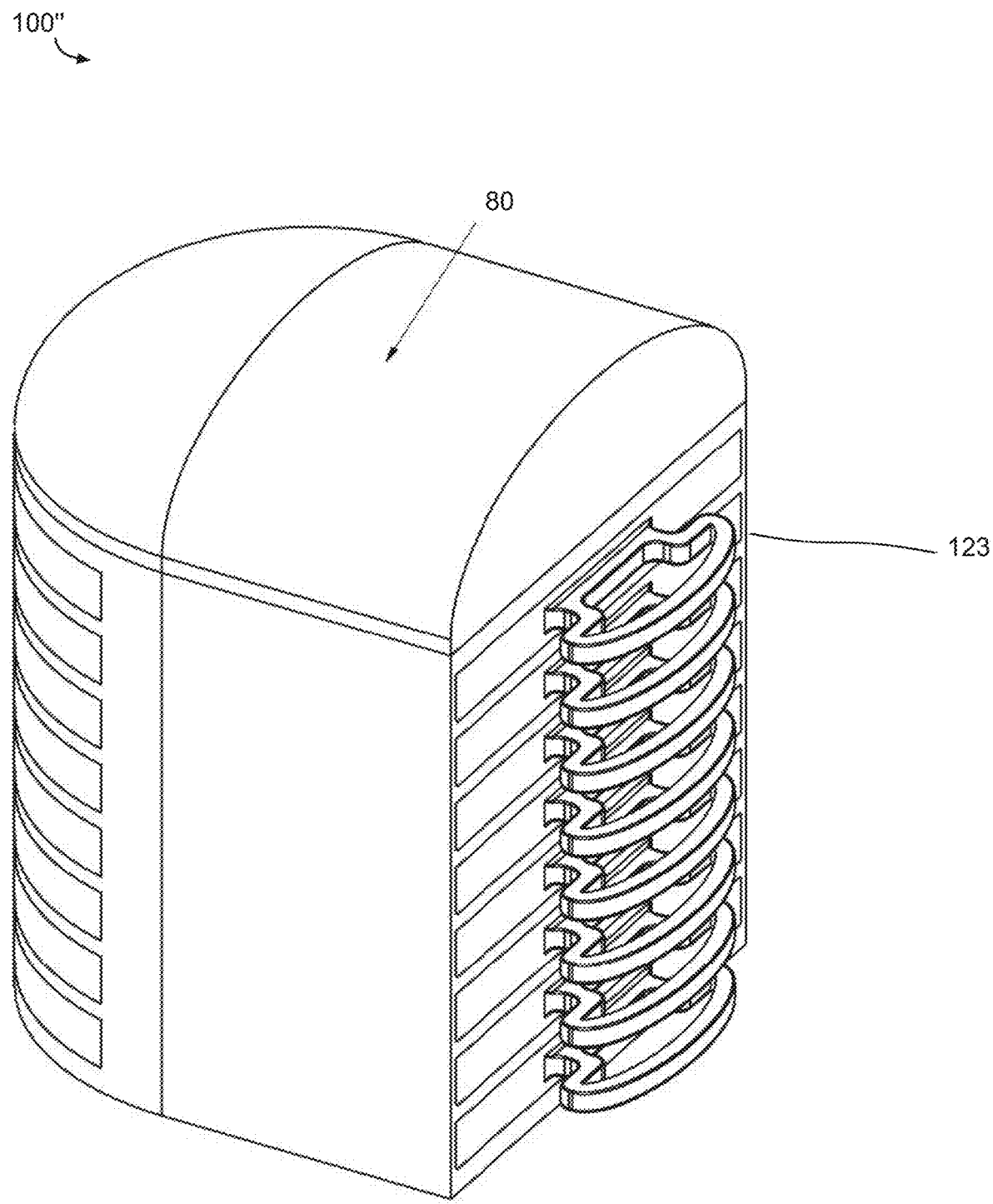
FIGS. 45A-45C are schematic representations of an illustrative corrosion risk reduction module with a stacked configuration of vapor-permeable containers of corrosion inhibitor.
Figure 45B:
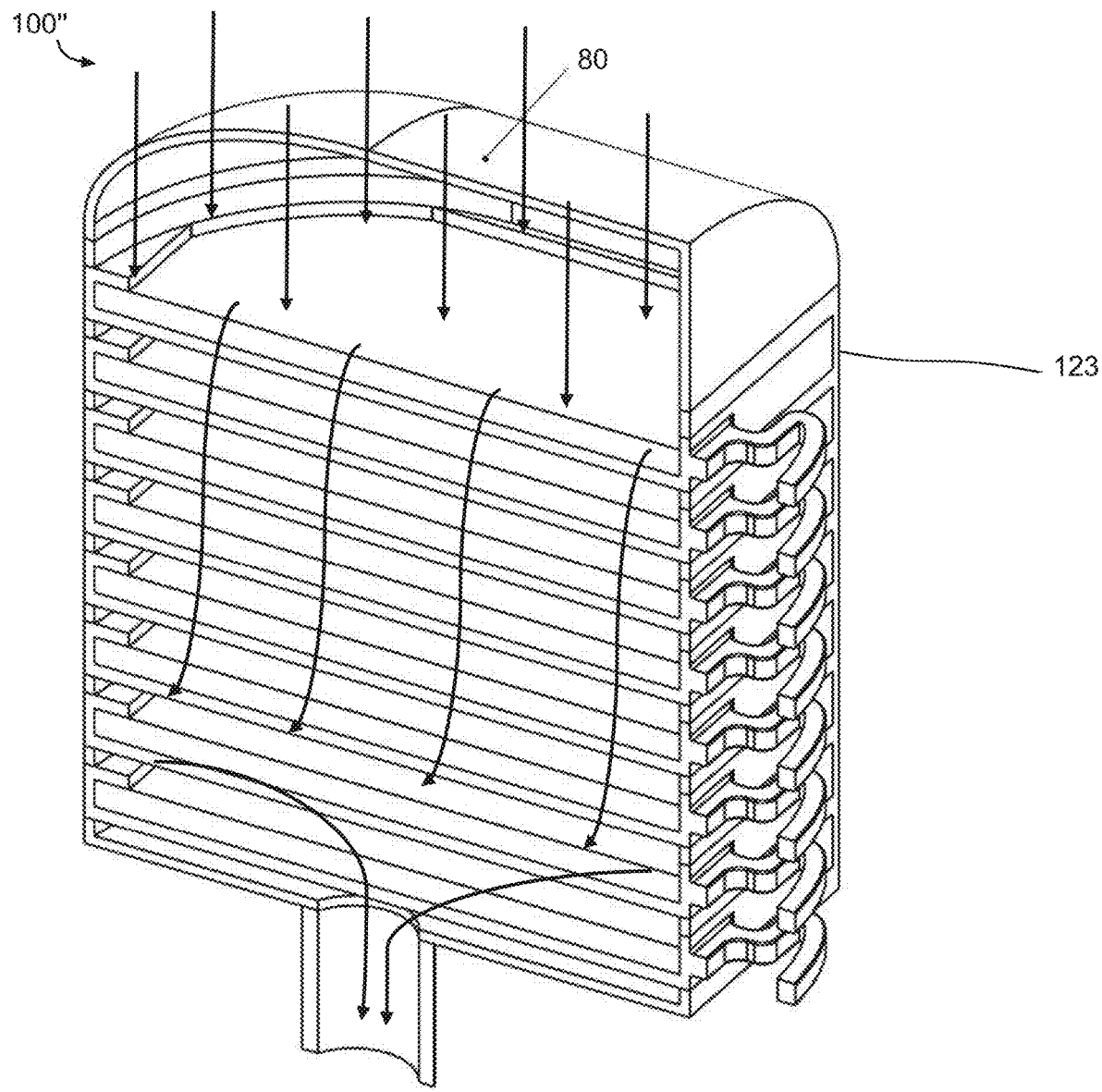
Figure 45C:
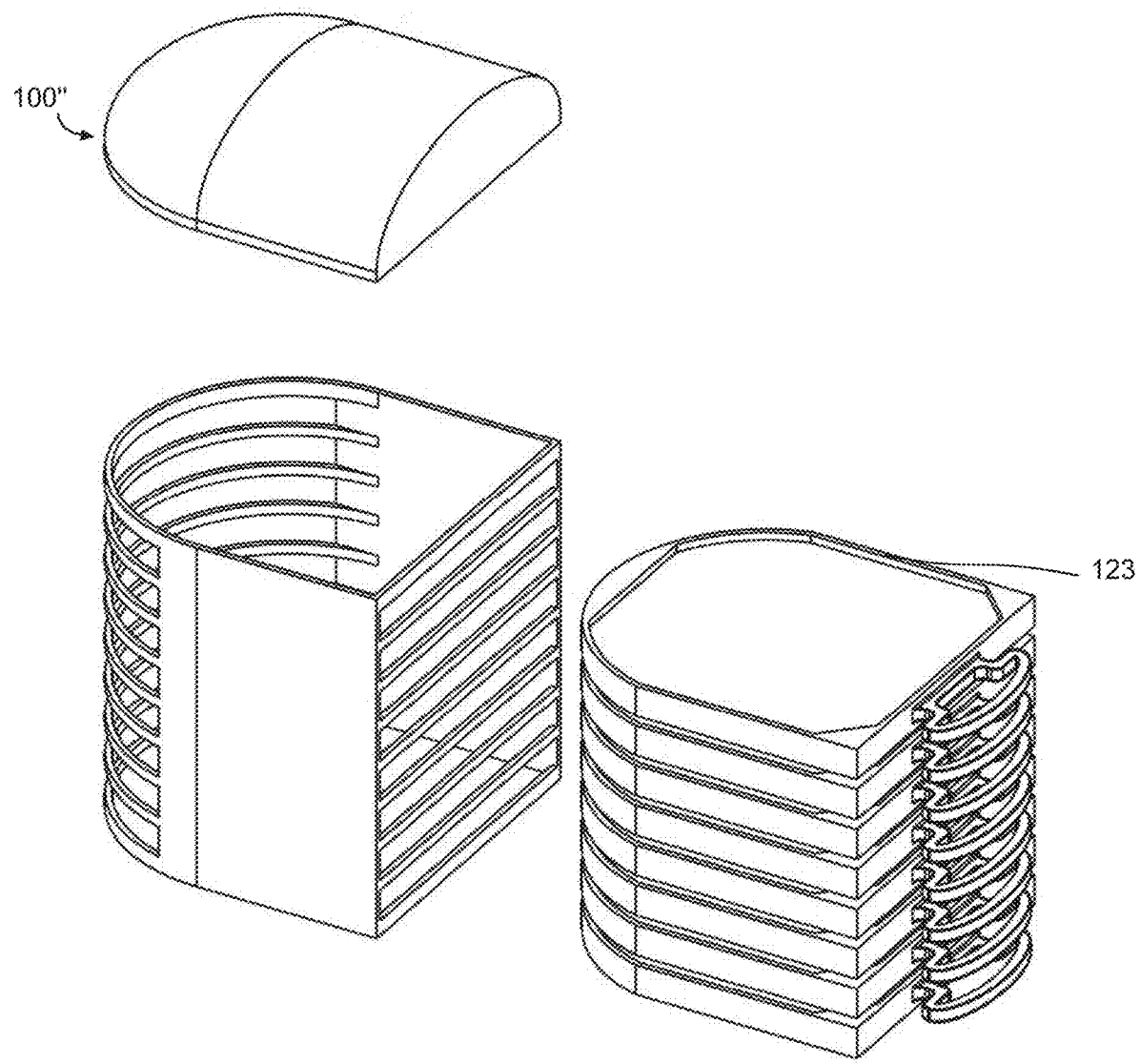
Figure 45D:
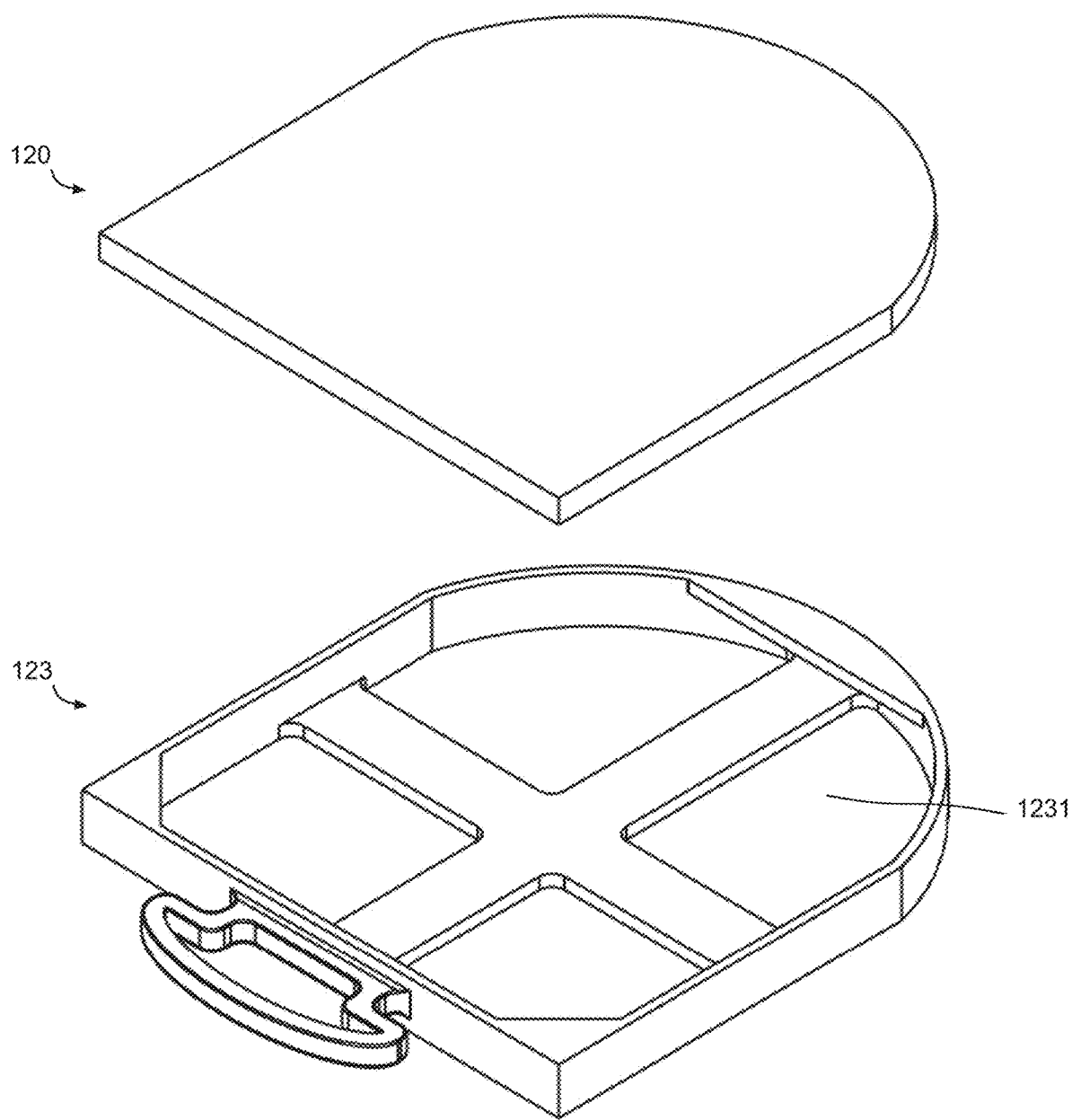
FIG. 45D is a schematic representation of an illustrative tray for use in a corrosion risk reduction module with a stacked configuration of vapor-permeable containers.
Figure 45E:
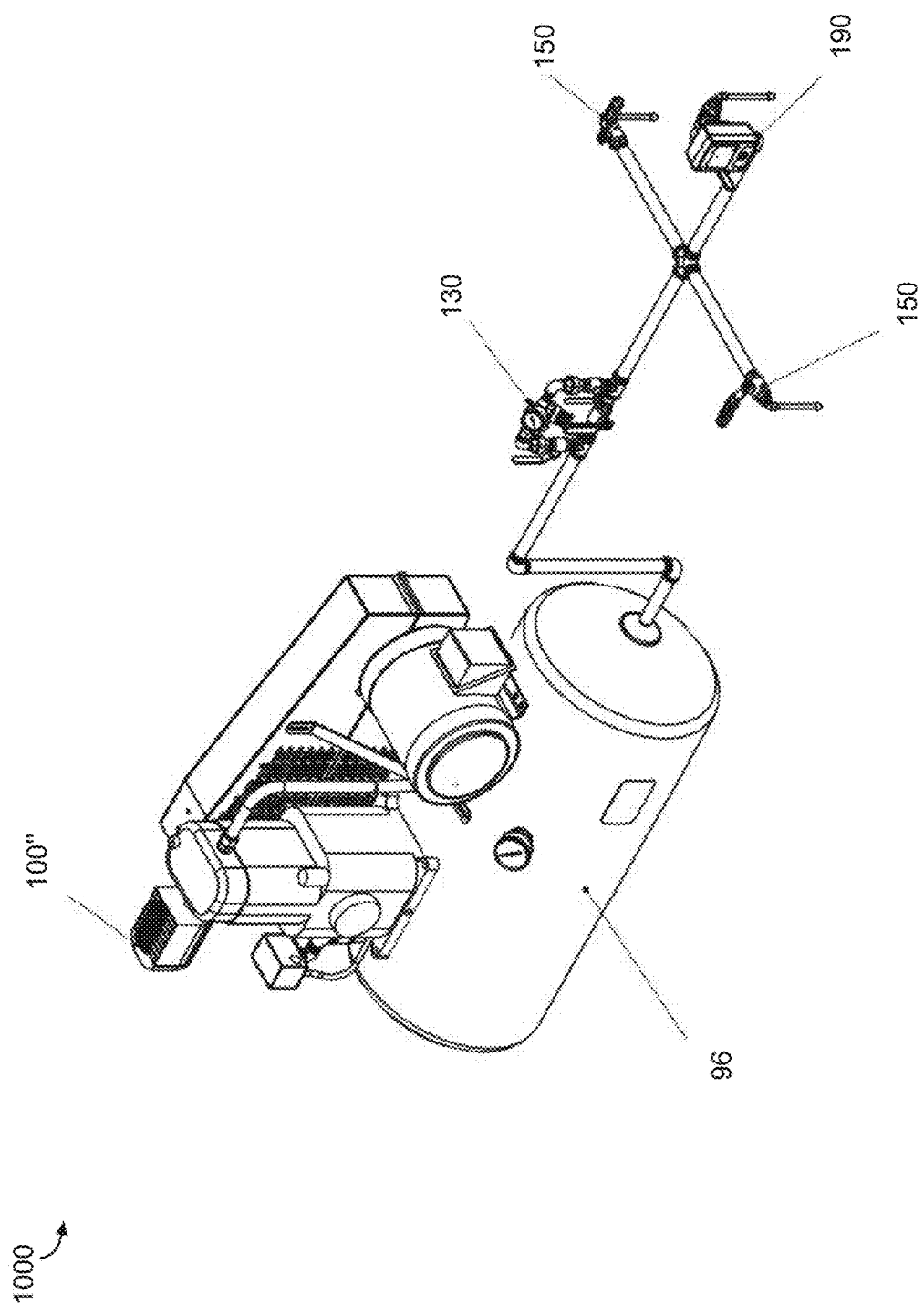
FIG. 45E is a schematic representation of an illustrative corrosion risk reduction system including a corrosion risk reduction module with a stacked configuration of vapor-permeable containers.

FIGS. 45A-45C show an illustrative corrosion risk reduction module 100" with a stacked configuration of vapor-permeable containers 120 of corrosion inhibitor. The top of the housing 80 can be louvered, and can be perforated or vented to facilitate vertical air flow through the corrosion risk reduction module 100", as illustrated in the cross-sectional view shown in FIG. 45B. Vapor-permeable containers 120 are arranged in a stacked configuration in a plurality of trays 123. An example of a tray 123 is illustrated in FIG. 45D, and includes openings 1231 at the bottom thereof to facilitate air flow through the stack. As shown in FIG. 45E, an illustrative corrosion risk reduction system 1000 can include a source of compressed air 96, the air inlet of which is fitted with, integrated into, or otherwise in fluid communication with, a corrosion risk reduction module 100" with a stacked configuration of vapor-permeable containers 120. The corrosion risk reduction system 1000 can further include an air maintenance device 130, branch line detection devices 150, and a purge valve 190.

Figure 46A:
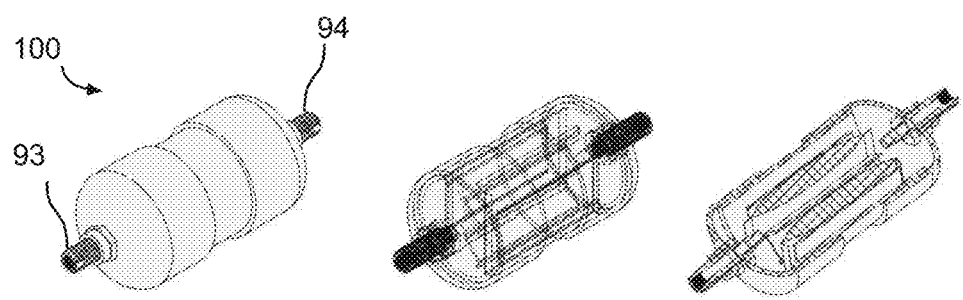
FIGS. 46A-46C are schematic representations of illustrative corrosion risk reduction modules with various air flow entry and exit points.
Figure 46B:
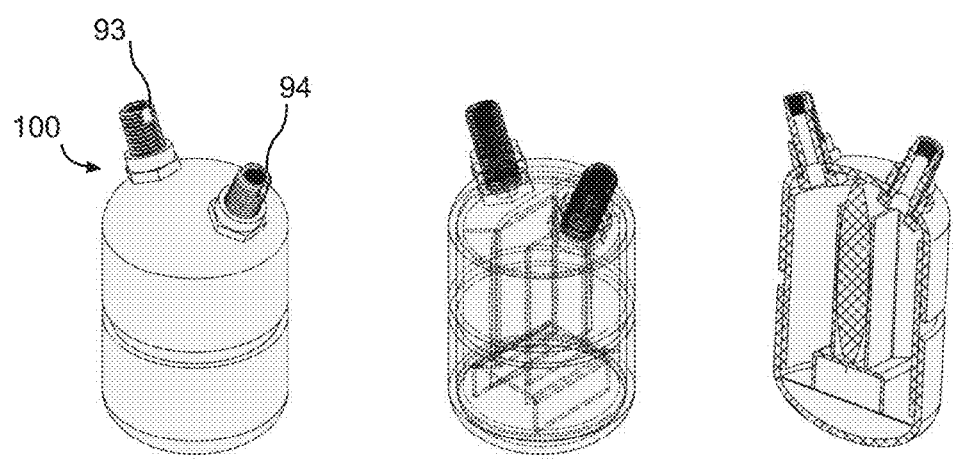
Figure 46C:
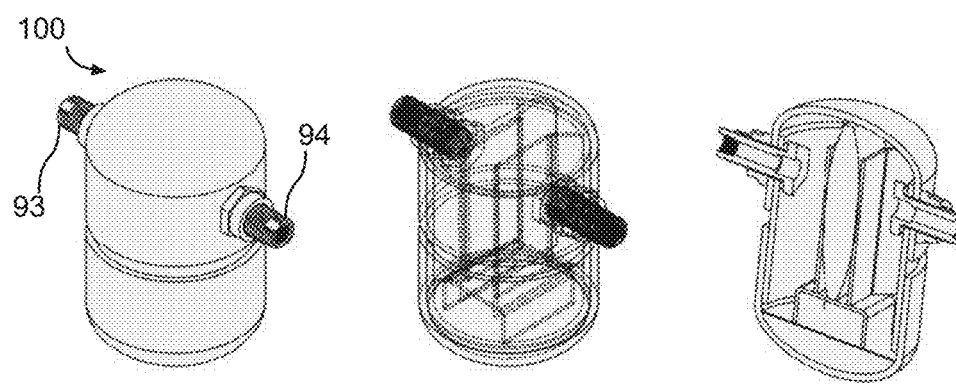

FIGS. 46A-46C show illustrative corrosion risk reduction modules 100 with various air flow entry and exit points. In FIG. 46A, the inlet port 93 and the outlet port 94 are located at opposite longitudinal ends of the corrosion risk reduction module 100. In FIG. 46B, the inlet port 93 and the outlet port 94 are located at the same longitudinal end of the corrosion risk reduction module 100, and are disposed at an angle relative to one another. In FIG. 46A, the inlet port 93 and the outlet port 94 are located at opposite lateral ends of the corrosion risk reduction module 100.

It will be appreciated by those skilled in the art that the disclosure herein can be embodied in other specific forms without departing from the spirit or essential characteristics thereof. The presently-disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A corrosion risk reduction system comprising:
   at least one corrosion risk reduction module, each corrosion risk reduction module comprising a housing including an inlet port and an outlet port which are each configured for fluid communication between an inside of the housing and an outside of the housing, the housing containing a replaceable cartridge in which are disposed a plurality of containers of volatile corrosion inhibitor,
   wherein the outlet port is configured for fluid communication with a piping system, and the outlet is configured to direct a gas from an air compressor, and the volatile corrosion inhibitor from the inside of the housing of the at least one corrosion risk reduction module, into the piping system; and
   at least one corrosion risk reduction module, the corrosion inhibitor detection device comprising:
   a coupling configured to couple the corrosion inhibitor detection device to the piping system;
   a coupling configured to couple to the corrosion inhibitor detection device to the piping system; and
   a housing in fluid communication with the coupling and containing an indicator element configured to visually change upon contact with the volatile corrosion inhibitor;
   wherein a bendable and crushable portion of the housing of the corrosion inhibitor detection device contains the indicator element and further contains an indicator capillary, wherein the indicator capillary contains indicator fluid, and
   wherein the indicator element and the indicator capillary are arranged such that, upon breaking of the indicator capillary by bending or crushing the bendable and crushable portion of the housing of the corrosion inhibitor detection device, the indicator fluid is released from the indicator capillary and reaches the indicator element to render the indicator element sensitive to the volatile corrosion inhibitor, thereby providing an indication upon contact with the volatile corrosion inhibitor.

2. The corrosion risk reduction system of claim 1, wherein the indicator element is in a form of an indicator strip.

3. The corrosion risk reduction system of claim 1, wherein the coupling is a pipe coupling.

4. The corrosion risk reduction system of claim 1, further comprising:
   a sight glass on the housing of the corrosion inhibitor detection device configured to provide a line of sight from an outside environment of the housing of the corrosion inhibitor detection device to the indicator element located inside the housing of the corrosion inhibitor detection device for observing a visual change of the indicator element when the volatile corrosion inhibitor is present in the housing of the corrosion inhibitor detection device.

5. The corrosion risk reduction system of claim 1, further comprising:
   an inlet valve configured to connect to the piping system containing the gas to pressurize the housing of the corrosion inhibitor detection device; and
   a pressure release valve configured for releasing pressure from the housing of the corrosion inhibitor detection device.

6. The corrosion risk reduction system of claim 1, wherein the replaceable cartridge comprises a plurality of stacked sections, each section defining a portion of an internal wall or a series of walls of the replaceable cartridge.

7. The corrosion risk reduction system of claim 1, wherein the replaceable cartridge is configured to be stacked and fluidly connected with an identical replaceable cartridge such that the airflow is directed around and through volatile corrosion inhibitor within the identical replaceable cartridge.

8. The corrosion risk reduction system of claim 1, wherein the replaceable cartridge includes a plurality of baffles configured to position the plurality of containers of volatile corrosion inhibitor within the replaceable cartridge.

9. A volatile corrosion inhibitor detection device comprising:
   a coupling configured to couple to a system configured to be closed; and
   a housing in fluid communication with the coupling and containing an indicator element configured to visually change upon contact with volatile corrosion inhibitor,
   wherein a bendable and crushable portion of the housing contains the indicator element and further contains an indicator capillary,
   wherein the indicator capillary contains indicator fluid, and
   wherein the indicator element and the indicator capillary are arranged such that, upon breaking of the indicator capillary by bending or crushing the bendable and crushable portion of the housing, the indicator fluid is released from the indicator capillary and reaches the indicator element to render the indicator element sensitive to the volatile corrosion inhibitor, thereby providing an indication upon contact with the volatile corrosion inhibitor.

10. The volatile corrosion inhibitor detection device of claim 9, wherein the indicator element is in a form of an indicator strip.

11. The volatile corrosion inhibitor detection device of claim 9, wherein the coupling is a pipe coupling and the system is a piping system.

12. The volatile corrosion inhibitor detection device of claim 9, further comprising:
   a sight glass on the housing configured to provide a line of sight from an outside environment of the housing to the indicator element located inside the housing for observing a visual change of the indicator element when the volatile corrosion inhibitor is present in the housing.

13. The volatile corrosion inhibitor detection device of claim 9, further comprising:
   an inlet valve configured to connect to the system containing gas to pressurize the housing; and a pressure release valve configured for releasing pressure from the housing.

14. The volatile corrosion inhibitor detection device of claim 9,
wherein a disposable housing portion contains the indicator element and is removable from the system.

15. A volatile corrosion inhibitor detection device comprising:
a coupling configured to couple to a system configured to be closed;
a housing in fluid communication with the coupling, the housing including an indicator chamber that contains an indicator element configured to visually change upon contact with volatile corrosion inhibitor, the indicator chamber having a proximal end and a distal end, wherein the proximal end and the distal end each include a brass orifice configured to control flow across the indicator element, and wherein each brass orifice is insulated from the indicator element by a negative catalyst.

* * * * *